US 8,265,635 B2

(12) United States Patent
Morisaki

(10) Patent No.: US 8,265,635 B2
(45) Date of Patent: Sep. 11, 2012

(54) METHOD FOR DETERMINING POSITIONING ACCURACY BASED ON ORIGINATION AND RECEIVING TERMINALS AND POSITIONING DEVICE AND PROGRAM THEREFOR

(75) Inventor: Mitsunori Morisaki, Tokyo (JP)

(73) Assignee: NEC Corporation, Tokyo (JP)

( * ) Notice: Subject to any disclaimer, the term of this patent is extended or adjusted under 35 U.S.C. 154(b) by 705 days.

(21) Appl. No.: 12/096,731

(22) PCT Filed: Dec. 7, 2006

(86) PCT No.: PCT/JP2006/324461
§ 371 (c)(1),
(2), (4) Date: Jun. 9, 2008

(87) PCT Pub. No.: WO2007/066727
PCT Pub. Date: Jun. 14, 2007

(65) Prior Publication Data
US 2009/0167598 A1  Jul. 2, 2009

(51) Int. Cl.
*H04W 40/00* (2009.01)
(52) U.S. Cl. .......... 455/446; 455/456.1; 455/456.5; 455/456.6
(58) Field of Classification Search .......... 455/466, 455/456.1, 456.5, 456.6
See application file for complete search history.

(56) References Cited

U.S. PATENT DOCUMENTS

| 7,295,119 | B2 * | 11/2007 | Rappaport et al. | 340/572.4 |
| 2002/0090979 | A1 * | 7/2002 | Sydor | 455/562 |
| 2003/0036409 | A1 * | 2/2003 | Sato et al. | 455/561 |
| 2004/0063467 | A1 * | 4/2004 | Shapira et al. | 455/561 |
| 2004/0127224 | A1 * | 7/2004 | Furukawa et al. | 455/446 |
| 2004/0248578 | A1 * | 12/2004 | Korpela et al. | 455/446 |
| 2006/0068805 | A1 * | 3/2006 | Rhemtulla et al. | 455/452.2 |
| 2006/0154628 | A1 * | 7/2006 | Mochizuki | 455/134 |
| 2008/0194265 | A1 * | 8/2008 | Engstrom | 455/446 |

FOREIGN PATENT DOCUMENTS
JP   2001-204082 A   7/2001
* cited by examiner

*Primary Examiner* — Rafael Pérez-Gutiérrez
*Assistant Examiner* — Allahyar Kasraian
(74) *Attorney, Agent, or Firm* — Sughrue Mion, PLLC

(57) ABSTRACT

In a method of designing the positioning system for positioning a reference point from a required positioning accuracy and a required positioning area by using a radio appliance, a maximum value and a minimum value of a plurality of fluctuation factors, which cause the positioning system to fluctuate, are set, a communication characteristic of the fixed radio appliance is calculated from the minimum value of the fluctuation factor and the required positioning accuracy, and a characteristic of the fixed radio appliance and an installation position of the fixed radio appliance are calculated from the calculated characteristic of the installed appliance, the maximum value of the fluctuation factor, and the required positioning area.

46 Claims, 54 Drawing Sheets

FIG. 17

| INSTALLATION ENVIRONMENT INFORMATION | | NOISE QUANTITY | |
|---|---|---|---|
| | | WORST | BEST |
| OFFICE | WITH WINDOW | | |
| | WITHOUT WINDOW | | |
| | RAPID START | | |
| | INVERTER | | |
| | TELEVISION | | |
| | ..... | | |
| WAREHOUSE | WITH WINDOW | | |
| | WITHOUT WINDOW | | |
| | ..... | | |

| INSTALLATION ENVIRONMENT INFORMATION | INSTALLATION HEIGHT |
|---|---|
| OFFICE | |
| WAREHOUSE | |

| USAGE METHOD | | INCLINATION OF RECEIVER |
|---|---|---|
| NOTE PC | UNCONSCIOUSLY | |
| HANDY TERMINAL | UNCONSCIOUSLY | |
| | CONSCIOUSLY | |
| CART | UNCONSCIOUSLY | |
| FORKLIFT | UNCONSCIOUSLY | |

| USAGE METHOD | HEIGHT OF RECEIVER | |
| --- | --- | --- |
| | MAXIMUM | MINIMUM |
| NOTE PC | | |
| HANDY TERMINAL | | |
| CART | | |
| FORKLIFT | | |

| INSTALLATION ENVIRONMENT INFORMATION | | DELAY QUANTITY 4161 | |
|---|---|---|---|
| | | WORST | BEST |
| OFFICE | SMALL NUMBER OF STRUCTURES | | |
| | LARGE NUMBER OF STRUCTURES | | |
| | ..... | | |
| WAREHOUSE | SMALL NUMBER OF STRUCTURES | | |
| | LARGE NUMBER OF STRUCTURES | | |
| | ..... | | |

RELATED ART

FIG. 44

| USAGE METHOD | | INCLINATION OF TRANSMITTER |
|---|---|---|
| NOTE PC | UNCONSCIOUSLY | |
| HANDY TERMINAL | UNCONSCIOUSLY | |
| | CONSCIOUSLY | |
| CART | UNCONSCIOUSLY | |
| FORKLIFT | UNCONSCIOUSLY | |

| USAGE METHOD | HEIGHT OF TRANSMITTER | |
| --- | --- | --- |
| | MAXIMUM | MINIMUM |
| NOTE PC | | |
| HANDY TERMINAL | | |
| CART | | |
| FORKLIFT | | |

6111

METHOD FOR DETERMINING POSITIONING ACCURACY BASED ON ORIGINATION AND RECEIVING TERMINALS AND POSITIONING DEVICE AND PROGRAM THEREFOR

APPLICABLE FIELD IN THE INDUSTRY

The present invention relates to a positioning method, and more particularly to a method of positioning a reference point, being a position of a fixed radio appliance that is on a footing of being able to position a mobile radio appliance by transmitting or receiving a radio signal.

BACKGROUND ART

In recent years, as a necessity for high-precision positional information has been highly enhanced, the positioning technology of specifying a position of a mobile radio appliance, which is typified by a positioning technology employing a GPS satellite, is now being studied/developed vigorously.

As one of the positioning techniques, there exists the technique of positioning a reference point, being a position of a fixed radio appliance that is on a footing of being able to position a mobile radio appliance by transmitting or receiving a radio signal. For this, the positioning technique of the reference point can be easily introduced because a usual relation with a wireless communication system can be utilized. For this reason, in recent years, the reference point positioning system has been introduced as one of value-added services of a cellular net or a wireless LAN.

On the other hand, as a high-precision positioning system employing the positioning of the reference point, there exist the systems described in Non-patent documents 1 to 3. Each of theses system is a system aiming for the positioning for which an infrastructure is laid out.

As a general condition required for the positioning system, there exist a positioning accuracy and a positioning area. One example of the positioning accuracy and the positioning area is shown in FIG. 36 and FIG. 37, respectively. The so-called positioning accuracy, which is a precision of a position of the mobile radio appliance that is specified by the positioning system, is an area size 1053 of an area 1052 in which a radio signal is transmittable to, or receivable from, or transmittable/receivable to/from one fixed radio appliance 1051, as shown in an example of FIG. 36. Further, the so-called positioning area, which is an area in which a radio signal is transmittable to, or receivable from, or transmittable/receivable to/from at least one fixed radio appliance or more, and yet a position of the mobile radio appliance can be specified, is an area 1057 in which a signal is transmittable to, or receivable from, or transmittable/receivable to/from at least one fixed radio appliance or more (three fixed radio appliances 1054 to 1056 in the figure) as shown in an example of FIG. 37.

Conventionally, the design of the communication system as disclosed in patent document 1 has been applied for the system for positioning the reference point introduced as an added value of a communication infrastructure. In the design of the communication system, its system is designed so that no non-covered area is generated also in a case where noise or interference becomes maximized and yet a communication distance becomes minimized because it is of importance to two-dimensionally cover the area in which the communication service is provided. For this reason, the system for positioning the reference point introduced into a cellular net or a wireless LAN, of which the area is identical to the communication area of the cellular net or the wireless LAN, is extremely bad in terms of the positioning accuracy because it is designed with a concept of the communication area that desirably covers the area as widely as possible.

[Patent document 1] JP-3515457B "A method of designing an arrangement of base stations of a radio communication system"

[Non-Patent document 1] Ishii et al.; "A Proposal of Hybrid Wireless LAN positioning system (2);" Proceedings of the 2004 IEICE General Conference, B-5-225

[Non-Patent document 2] Tsubaki et al.; "Tracking System using RFID Tags;" Proceedings of the 2003 IEICE General Conference, B-15-11

[Non-Patent document 3] Yoneyama et al.; "Allocating system in Doors in the Use of Bluetooth;" Proceedings of the 2003 IEICE General Conference, B-15-9

DISCLOSURE OF THE INVENTION

Problems to be Solved by the Invention

On the other hand, upon taking a side view of the positioning system, it is important that no non-covered area is generated at the time that the noise and the interference increase, whereas simultaneously therewith, a point as to whether the positioning accuracy that is required can be satisfied becomes important. In the positioning of the reference point, the positioning accuracy depends upon the maximum commutable distance between the fixed radio appliance and the mobile radio appliance, and it is when the noise or the interference becomes minimum that the positioning accuracy fluctuates most largely. For this, the point that even though an instruction of designing the communication area described in Patent document 1 is applied for designing the positioning system, the positioning system satisfying the required positioning accuracy cannot be realized in some cases is a subject of discussion.

The present invention has an object of providing a technology relating to the positioning system design for deciding positions of an originating terminal and a receiving terminal so that each of them can be positioned over all of the to-be-positioned region while satisfying the required positioning accuracy.

Means for Solve the Problem

The first invention for solve the above-mentioned problems, which is a method of positioning originating terminals in a positioning method, which position of a receiving terminal is decided to position of to be positioned the originating terminal that transmitted an information that was received at the receiving terminal in to-be-position region, is characterized in including:

an origination characteristic deciding step that obtain a characteristic of the originating terminal satisfying a required positioning accuracy when a communication quality is estimated to be best; and an installation position deciding step that obtain a positioning-possible region by the obtained characteristic of the originating terminal when the communication quality is estimated to be worst, and decide an installation position of the originating terminal based upon this positioning-possible region.

The second invention for solve the above-mentioned problems is characterized in that in the above-mentioned first invention, the characteristic of the originating terminal is an origination intensity.

The third invention for solve the above-mentioned problems is characterized in that in one of the above-mentioned first and second inventions, the characteristic of the originating terminal is an angle gain.

The fourth invention for solve the above-mentioned problems is characterized in that in one of the above-mentioned first to third inventions, a factor causing the communication quality to fluctuate is noise.

The fifth invention for solve the above-mentioned problems is characterized in that in one of the above-mentioned first to fourth inventions, a factor causing the communication quality to fluctuate is one of a receiver sensitivity of the receiving terminal and an angle gain of the receiving terminal.

The six invention for solve the above-mentioned problems is characterized in that in one of the above-mentioned first to fifth inventions, a factor causing the communication quality to fluctuate is an inclination of the receiving terminal.

The seventh invention for solve the above-mentioned problems is characterized in that in one of the above-mentioned first to sixth inventions, a factor causing the communication quality to fluctuate is a height of the receiving terminal.

The eighth invention for solve the above-mentioned problems is characterized in that in one of the above-mentioned first to seventh inventions, a factor causing the communication quality to fluctuate is a delay.

The ninth invention for solve the above-mentioned problems is characterized in, in one of the above-mentioned first to eighth inventions, deciding the installation position of the originating terminal so that the positioning-possible region covers the to-be-positioned region.

The tenth invention for solve the above-mentioned problems, which is a method of positioning receiving terminals in a positioning method, which position of an originating terminal is decided to position of to be positioned the receiving terminal that received an information from the originating terminal in to-be-positioned region, is characterized in including:

a reception characteristic deciding step that obtain a characteristic of the receiving terminal satisfying a required positioning accuracy when a communication quality is estimated to be best; and an installation position deciding step that obtain a positioning-possible region by the obtained characteristic of the receiving terminal when the communication quality is estimated to be worst, and deciding an installation position of the receiving terminal based upon this positioning-possible region.

The eleventh invention for solve the above-mentioned problems is characterized in that in the above-mentioned tenth invention, the characteristic of the receiving terminal is receiver sensitivity.

The twelfth invention for solve the above-mentioned problems is characterized in that in one of the above-mentioned tenth and eleventh inventions, the characteristic of the receiving terminal is an angle gain.

The thirteenth invention for solve the above-mentioned problems is characterized in that in one of the above-mentioned tenth to twelfth inventions, a factor causing the communication quality to fluctuate is noise.

The fourteenth invention for solve the above-mentioned problems is characterized in that in one of the above-mentioned tenth to thirteenth inventions, a factor causing the communication quality to fluctuate is one of an origination intensity of the originating terminal and an angle gain of the originating terminal.

The fifteenth invention for solve the above-mentioned problems is characterized in that in one of the above-mentioned tenth to fourteenth inventions, a factor causing the communication quality to fluctuate is an inclination of the originating terminal.

The sixteenth invention for solve the above-mentioned problems is characterized in that in one of the above-mentioned tenth to fifteenth inventions, a factor causing the communication quality to fluctuate is a height of the originating terminal.

The seventeenth invention for solve the above-mentioned problems is characterized in that in one of the above-mentioned tenth to sixteenth inventions, a factor causing the communication quality to fluctuate is a delay.

The eighteenth invention for solve the above-mentioned problems is characterized in, in one of the above-mentioned tenth to seventeenth inventions, deciding the installation position of the receiving terminal so that the positioning-possible region covers the to-be-positioned region.

The nineteenth invention for solve the above-mentioned problems, which is a device for positioning originating terminals in a positioning system, which position of a receiving terminal is decided to position of to be positioned the originating terminal that transmitted an information that was received at the receiving terminal to-be-positioned region, is characterized in including:

an origination characteristic deciding means that obtain a characteristic of the originating terminal satisfying a required positioning accuracy when a communication quality is estimated to be best; and an installation position deciding means that obtain a positioning-possible region by the obtained origination characteristic when the communication quality is estimated to be worst, and decide an installation position of the originating terminal based upon this positioning-possible region.

The twentieth invention for solve the above-mentioned problems is characterized in that in the above-mentioned nineteenth invention, the origination characteristic deciding means obtains an origination intensity of the originating terminal satisfying a required positioning accuracy when the communication quality is estimated to be best.

The twenty-first invention for solve the above-mentioned problems is characterized in that in one of the above-mentioned nineteenth and twentieth inventions, the origination characteristic deciding means obtains an angle gain of the originating terminal satisfying the required positioning accuracy at the time that the communication quality is estimated to be worst.

The twenty-second invention for solve the above-mentioned problems is characterized in that in one of the above-mentioned nineteenth to twenty-first inventions, a factor causing the communication quality to fluctuate is noise.

The twenty-third invention for solve the above-mentioned problems is characterized in that in one of the above-mentioned nineteenth to twenty-second inventions, a factor causing the communication quality to fluctuate is one of a receiver sensitivity of the receiving terminal and an angle gain of the receiving terminal.

The twenty-fourth invention for solve the above-mentioned problems is characterized in that in one of the above-mentioned nineteenth to twenty-third inventions, a factor causing the communication quality to fluctuate is an inclination of the receiving terminal.

The twenty-fifth invention for solve the above-mentioned problems is characterized in that in one of the above-mentioned nineteenth to twenty-fourth inventions, a factor causing the communication quality to fluctuate is a height of the receiving terminal.

The twenty-sixth invention for solve the above-mentioned problems is characterized in that in one of the above-mentioned nineteenth to twenty-fifth inventions, a factor causing the communication quality to fluctuate is a delay.

The twenty-seventh invention for solve the above-mentioned problems is characterized in that, in one of the above-mentioned nineteenth to twenty-sixth inventions, the installation position deciding means decides the installation position of the originating terminal so that the positioning-possible region covers the to-be-positioned region.

The twenty-eighth invention for solve the above-mentioned problems, which is a device for positioning a receiving terminal in a positioning system, which position of an originating terminal is decided to position of to be positioned the receiving terminal that received an information from the originating terminal in to-be-positioned region, is characterized in including:

a reception characteristic deciding means that obtain a characteristic of the receiving terminal satisfying a required positioning accuracy when a communication quality is estimated to be best; and an installation position deciding means that obtain a positioning-possible region by the obtained reception characteristic when the communication quality is estimated to be worst, and decide an installation position of the receiving terminal based upon this positioning-possible region.

The twenty-ninth invention for solve the above-mentioned problems is characterized in that in the above-mentioned twenty-eighth invention, the reception characteristic deciding means obtains a receiver sensitivity of the receiving terminal satisfying the required positioning accuracy when the communication quality is estimated to be best.

The thirtieth invention for solve the above-mentioned problems is characterized in that in one of the above-mentioned twenty-eighth and twenty-ninth invention, the reception characteristic deciding means obtains an angle gain of the receiving terminal satisfying the required positioning accuracy when the communication quality is estimated to be worst.

The thirty-first invention for solve the above-mentioned problems is characterized in that in one of the above-mentioned twenty-eighth to thirtieth inventions, a factor causing the communication quality to fluctuate is noise.

The thirty-second invention for solve the above-mentioned problems is characterized in that in one of the above-mentioned twenty-eighth to thirty-first inventions, a factor causing the communication quality to fluctuate is one of an origination sensitivity of the originating terminal and an angle gain of the originating terminal.

The thirty-third invention for solve the above-mentioned problems is characterized in that in one of the above-mentioned twenty-eighth to thirty-second inventions, a factor causing the communication quality to fluctuate is an inclination of the originating terminal.

The thirty-fourth invention for solve the above-mentioned problems is characterized in that in one of the above-mentioned twenty-eighth to thirty-third inventions, a factor causing the communication quality to fluctuate is a height of the originating terminal.

The thirty-fifth invention for solve the above-mentioned problems is characterized in that in one of the above-mentioned twenty-eighth to thirty-fourth inventions, a factor causing the communication quality to fluctuate is a delay.

The thirty-sixth invention for solve the above-mentioned problems is characterized in that, in one of the above-mentioned twenty-eighth to thirty-fifth inventions, the installation position deciding means decides the installation position of the receiving terminal so that the positioning-possible region covers the to-be-positioned region.

The thirty-seventh invention for solve the above-mentioned problems, which is a program for positioning originating terminals in a positioning method, which position of a receiving terminal is decided to position of to be positioned the originating terminal that transmitted an information that was received at the receiving terminal in to-be-positioned region, is characterized in causing a computer to execute:

an origination characteristic deciding process that obtain a characteristic of the originating terminal satisfying a required positioning accuracy when a communication quality is estimated to be best; and an installation position deciding process that obtain a positioning-possible region by the obtained characteristic of the originating terminal when the communication quality is estimated to be worst, and decide an installation position of the originating terminal based upon this positioning-possible region.

The thirty-eighth invention for solve the above-mentioned problems, which is a program for positioning a receiving terminal in a positioning method, which position of an originating terminal is decided to position of to be positioned the receiving terminal that received an information from the originating terminal in to-be-positioned region, is characterized in causing a computer to execute:

a reception characteristic deciding process that obtain a characteristic of the receiving terminal satisfying a required positioning accuracy when a communication quality is estimated to be best; and an installation position deciding process that obtain a positioning-possible region by the obtained characteristic of the receiving terminal when the communication quality is estimated to be worst, and decide an installation position of the receiving terminal based upon this positioning-possible region.

In the present invention, at first, the characteristic of the originating terminal such as the origination intensity is obtained so that the required positioning accuracy is satisfied under the situation in which the communication quality is estimated to be best, next, the positioning-possible region by the obtained characteristic of the originating terminal is obtained under the situation in which the communication quality is estimated to be worst, and the installation position of the originating terminal is decided based upon this positioning-possible region so that the to-be-positioned region is covered. Thereby, installing the originating terminal onto the position decided in accordance with the present invention enables the positioning satisfying the required positioning accuracy in all of the to-be-positioned region to be implemented under any situation of the communication quality.

An Advantageous Effect of the Invention

The present invention makes it possible to make the positioning system design with an excellent efficiency in which the positioning accuracy and the positioning area have been taken into consideration.

BRIEF DESCRIPTION OF THE DRAWINGS

FIG. 17 is a view of an example of a noise quantity for each piece of installation environment information that is preserved in a DB unit.

FIG. 18 is a view of an example of an installation height for each piece of installation environment information that is preserved in the DB unit.

FIG. 23 is a view of an example of an inclination of a receiver for each usage method that is preserved in the DB unit.

FIG. 30 is a view of an example of a height of the receiver for each usage method that is preserved in the DB unit.

FIG. 34 is a view of an example of a delay quantity for each piece of the installation environment information that is preserved in the DB unit.

FIG. 44 is a view of an example of an inclination of the transmitter for each usage method that is preserved in the DB unit.

FIG. 51 is a view of an example of a height of the transmitter for each usage method that is preserved in the DB unit.

DESCRIPTION OF NUMERALS 1051 fixed radio appliance
1052 area in which a radio signal from one fixed radio appliance is transmittable or receivable or transmittable/receivable
1053 positioning accuracy
1054 to 1056 fixed radio appliances 1057 positioning area
1061 to 1063 fixed radio appliances
1064 and 1065 mobile radio appliances
1066 positioning area
2001 to 2003 transmitters
2004 cart
2005 receiver
2021 required positioning area
2022 area in which an infrared signal from one transmitter is receivable
2023 transmitter installation position
2024 positioning area
2031 required positioning area
2032 area in which an infrared signal from one transmitter is receivable
2033 transmitter installation position
2034 positioning area
2041 required positioning area
2042 area in which an infrared signal from one transmitter is receivable
2043 transmitter installation position
2044 positioning area
2021 required positioning area
2022 area in which an infrared signal from one transmitter is receivable
2023 transmitter installation position
2024 positioning area
2051 to 2053 transmitters
2004 receiver
2061 to 2063 transmitters
2064 forklift
2065 receiver
2071 to 2073 transmitters
2074 cart
2075 receiver
2076 and 2077 structures
3021 required positioning area
3022 area in which an infrared signal from one transmitter is receivable
3023 transmitter installation position
3024 positioning area
3031 floor
3032 to 3034 structures
3035 required positioning area
3061 inputting unit
3062 controlling unit
3063 DB unit
3064 operating unit
3065 communication characteristic operating unit of a fixed radio appliance
3066 fixed radio appliance installation position operating unit
3067 outputting unit
5001 to 5003 receivers
5004 cart
5005 transmitter
6001 to 6003 receivers
6004 transmitter
6081 to 6083 receivers
6084 forklift
6085 transmitter
6121 to 6123 receivers
6124 cart
6125 transmitter
6126 and 6127 structures

BEST MODE FOR CARRYING OUT THE INVENTION

Figure 1:
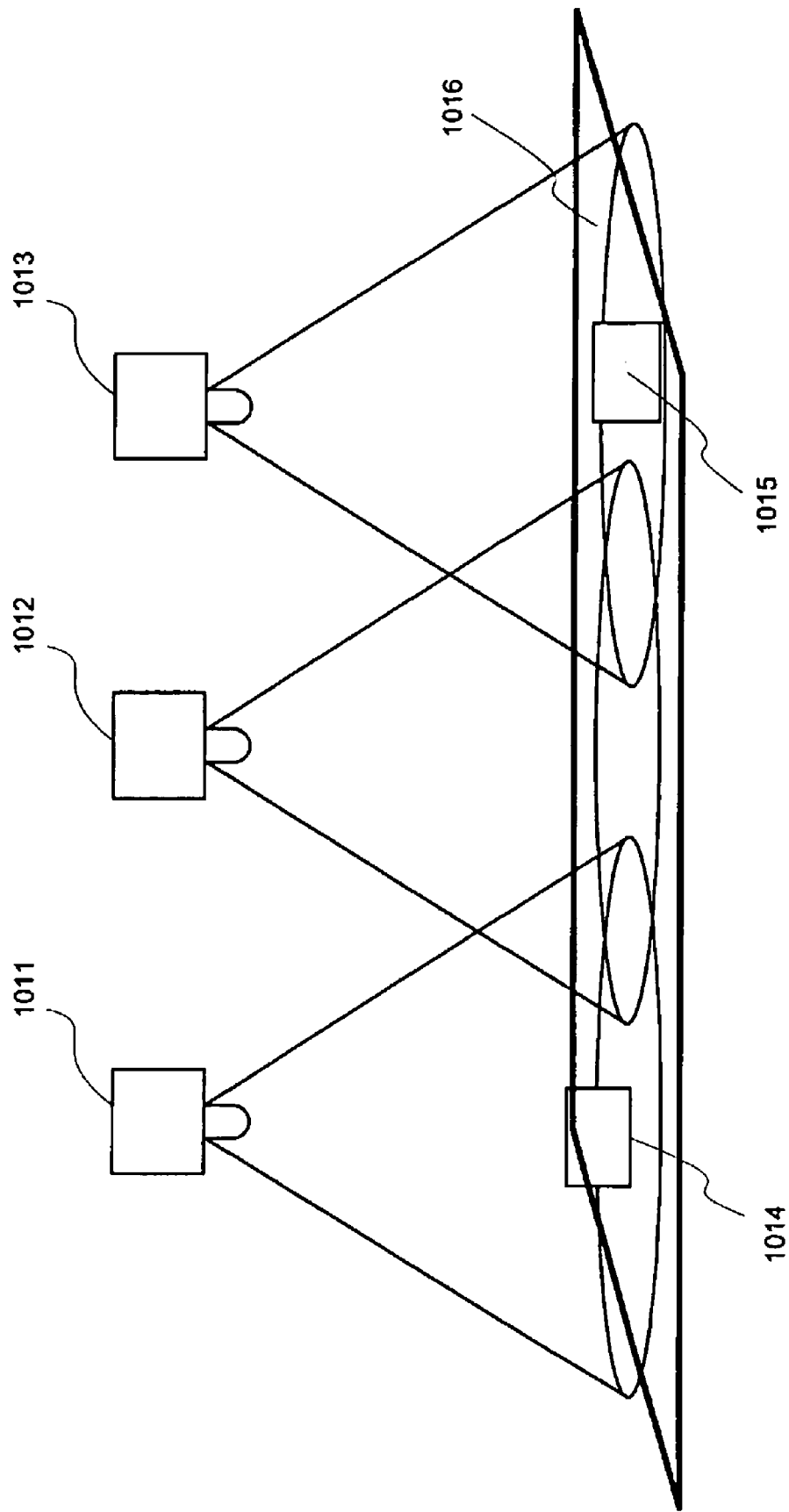
FIG. 1 is a system configuration view illustrating a summary of the present invention.
Figure 2:
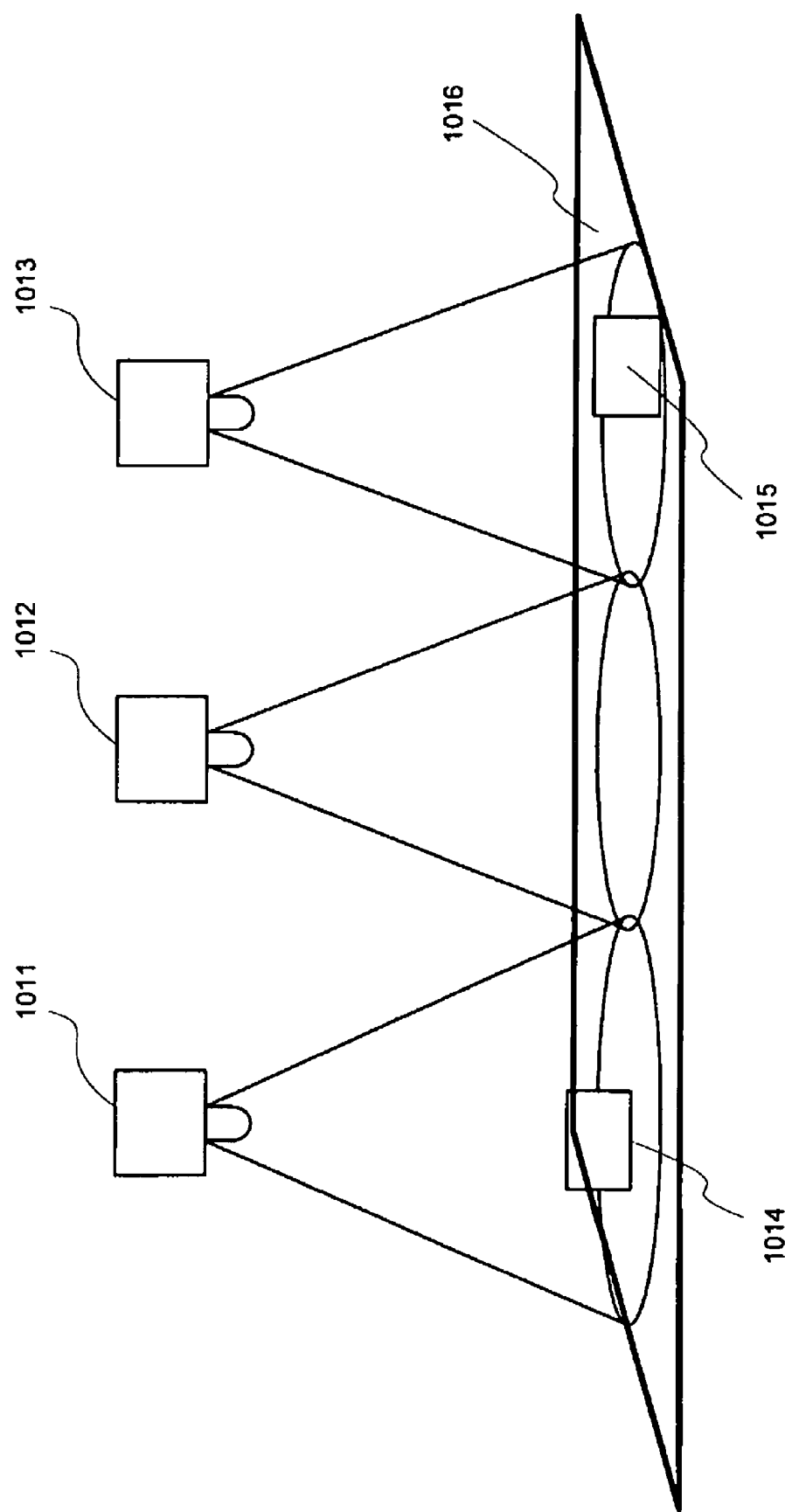
FIG. 2 is a system configuration view illustrating a summary of the present invention.
Figure 3:
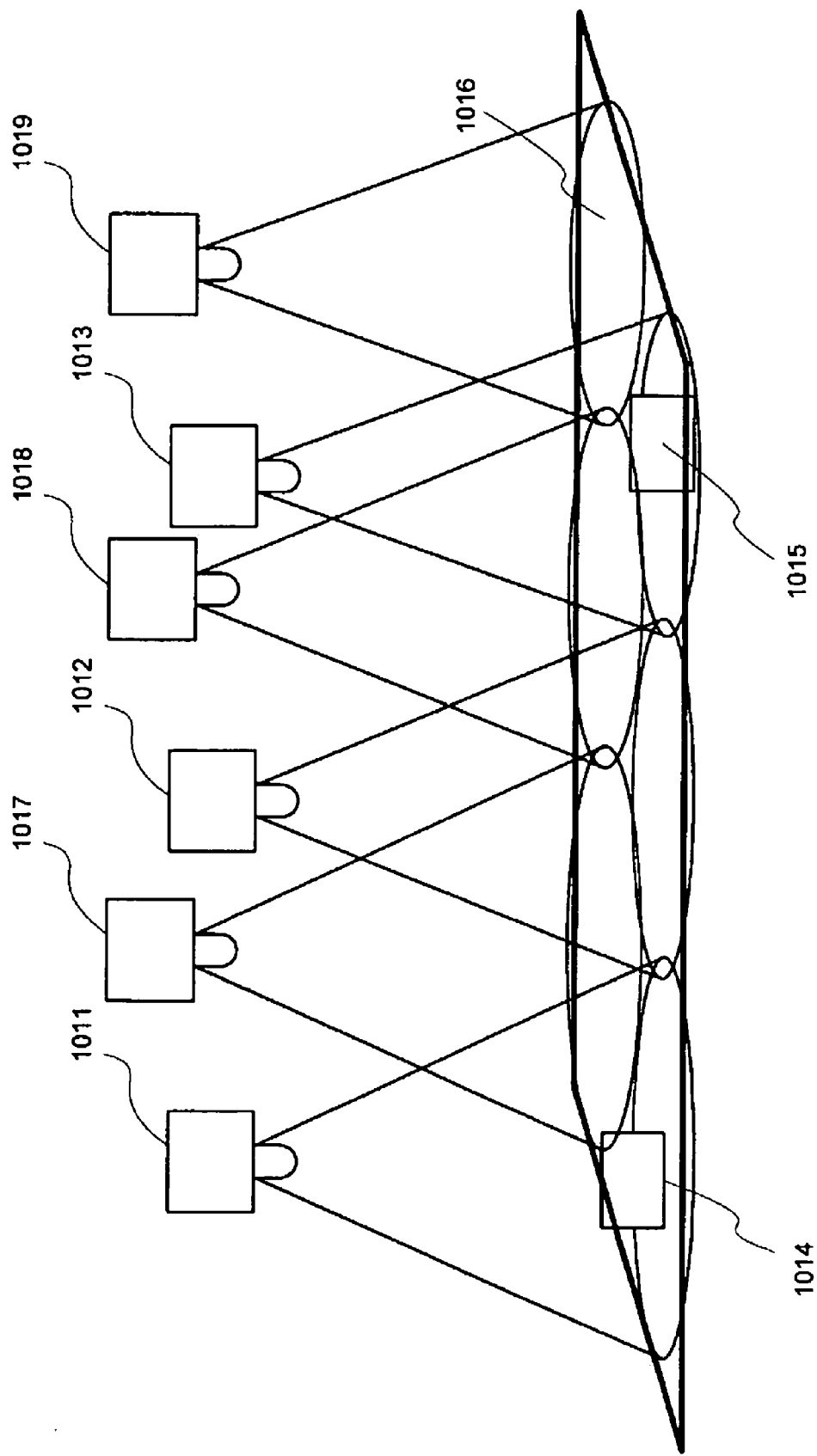
FIG. 3 is a system configuration view illustrating a summary of the present invention.

A summary of the present invention will be explained by employing FIG. 1 to FIG. 3.

The present invention has an object of, in a positioning system for positioning mobile radio appliances 1014 and 1015 each of which is a receiving terminal existing within a predetermined to-be-positioned region 1016, deciding an installation position of fixed radio appliances 1011 to 1013 each of which is an originating terminal (transmitter) that is installed for a purpose of positioning the mobile radio appliances 1014 and 1015.

One example of the method of positioning the mobile radio appliances 1014 and 1015 is as follows. Each of the fixed radio appliances 1011 to 1013, being an originating terminal of FIG. 1, allows a different ID to originate by employing a radio wave, infrared-rays, or the like, and each of the mobile radio appliances 1014 and 1015 positions its own appliance by receiving the ID that originates from the originating terminal. For example, in an example of FIG. 1, the mobile radio appliance 1014 receives an inherent ID that originates from the fixed radio appliance 1011, whereby it can recognize that its own position exists within a region at which a radio wave, infrared-rays, or the like from the fixed radio appliance 1011 arrives.

A general requisite at the moment of performing the positioning is a positioning accuracy and a to-be-positioned region.

At first, the positioning accuracy will be explained. As a rule, it is understood that when an intensity of a radio wave, infrared-rays, or the like that originates from the originating terminal is week, an angle gain of the originating terminal is small, or noise is much and an S/N ratio is low (these statuses are defined to be "a status in which a communication quality is bad"), the positioning accuracy is enhanced all the more. The reason is that when an intensity of a radio wave etc. becomes week, an angle gain becomes small, or noise is much and an S/N ratio becomes low, that is, when a communication quality becomes bad, the area on a to-be-positioned region 1016 at which a radio wave etc. from one originating terminal arrives becomes narrow. When the area at which a radio wave etc. from one originating terminal arrives becomes narrow, the position at which the receiving terminal exists can be pinpointed to that extent, which enables the positioning accuracy to be enhanced. FIG. 2 shows an arrival status of a radio wave etc. in the case that the communication quality is worse than that of FIG. 1. It can be said safely that as apparent from this figure, the area at which a radio wave etc. from one originating terminal arrives is narrowed with the status of FIG. 2 in which the communication quality is worse, and the positioning accuracy is enhanced to that extent.

Thus, if the required positioning accuracy is satisfied at the time that the origination intensity of a radio wave etc. is estimated to be strongest, that is, the area at which a radio wave etc. from the originating terminal arrives is widest, the required positioning accuracy is satisfied at any time because the area at which a radio wave etc. from the originating terminal arrives shifts to a direction of being narrowed in a case where the origination intensity has declined.

Further, the status of the communication quality, as a rule, fluctuates, and noise such as sunlight is thinkable as a factor causing the communication quality to fluctuate, for example, in the case that the originating terminal allows the ID to originate with the infrared-rays as a carrier wave. With the sunlight, it can be easily estimated that its intensity is strong in the day and is week at night, so the intensity of sunlight in the to-be-positioned region can be estimated to a certain extent. Further, as a specific example of the factor other than it that causes the communication quality to fluctuate, a receiver sensitivity of the receiving terminal, an inclination of the receiving terminal, or the like is thinkable.

Next, the to-be-positioned region will be mentioned. In FIG. 1, radio waves etc. that originate from the originating terminals 1011 to 1013 arrive at an almost region of the to-be-positioned region 1016, whereas in FIG. 2, the region at which radio waves etc. that originate from the originating terminals do not arrive is increased as compared with the case of FIG. 1. This signifies that, with the case of FIG. 2, the region in which the position of the receiving terminal cannot be decided is increased within the to-be-positioned region 1016 as compared with that of FIG. 1.

All that can be said from the above-mentioned points is that when the S/N ratio of a radio wave etc. arriving at the to-be-positioned region 1016 is low due to the bad communication quality, the precision at which the position is decided is enhanced, and the positioning-possible region is narrowed. So as to eliminate this demerit that the positioning-possible region is narrowed, an additional installation of the originating terminal is thinkable. It is in FIG. 3 that this state of things is illustrated. FIG. 3 illustrates the state in which radio waves etc. from the originating terminals arrive at all of the to-be-positioned region with the precision at which the position of the receiving terminal is decided kept at a level of the required precision or more.

The present invention has been accomplished by employing the character of the matter as mentioned above. That is, at first, the characteristic (a signal transmission power, a transmitter angle gain, or the like) of the originating terminal is obtained so that the required positioning accuracy is satisfied under the communication quality that is estimated to be best (the status of FIG. 1). Next, the positioning-possible region at the time that a radio wave, infrared-rays, or the like has originated with the previously obtained characteristic of the originating terminal is obtained under the communication quality that is estimated to be worst (the status of FIG. 2), and the number and the position of the originating terminal are decided so that this positioning-possible region covers all of the to-be-positioned region (the status of FIG. 3). Deciding the installation position of the originating terminal with the procedure above makes it possible to position the mobile terminal so that the required precision is satisfied over all of the to-be-positioned region even though the characteristic of the originating terminal (an intensity etc. of a radio wave or infrared-rays), or the status of the communication quality changes.

Additionally, when one receiving terminal can receive radio waves etc. from a plurality of the originating terminals, for example, the position of the receiving terminal can be estimated on the premise that the receiving terminal exists within the region at which a radio wave etc. of the originating terminal having a strongest reception power arrives.

A First Embodiment

A first embodiment of the present invention will be explained by employing FIG. 4.

Figure 4:
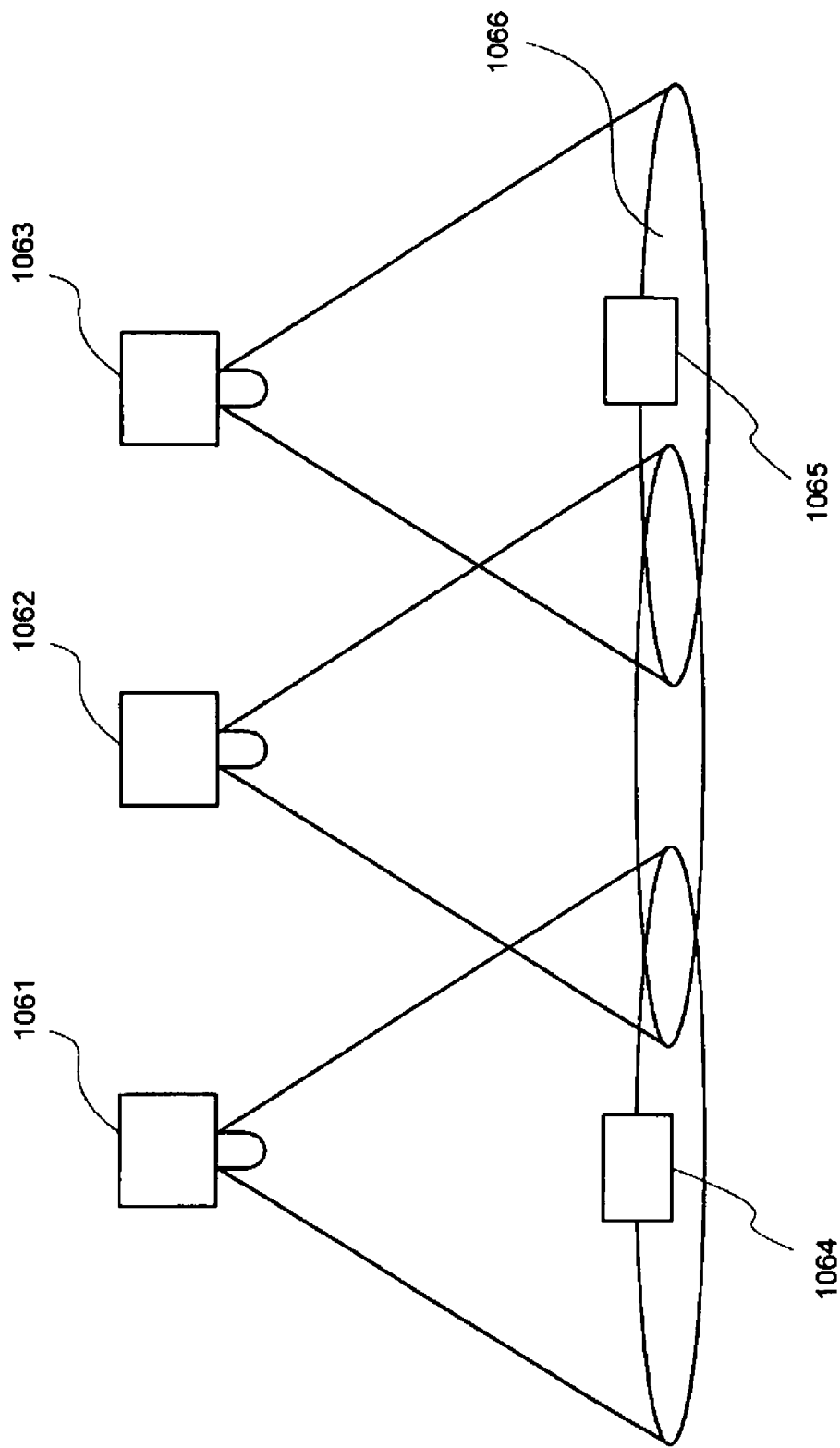
FIG. 4 is a system configuration view for explaining a first embodiment and a second embodiment.

A system configuration is shown in FIG. 4. This system is configured by constructing a positioning area 1066 of at least one fixed radio appliance or more 1061 to 1063, and at least one mobile radio appliance or more 1064 and 1065. In the present invention, the characteristic of the fixed radio appliances 1061 to 1063 is designed based upon the characteristic of the mobile radio appliances 1064 and 1065, and the factor causing the communication quality to fluctuate (hereinafter, simply referred to as a fluctuation factor), and the installation position of the fixed radio appliances 1061 to 1063 is designed. Additionally, in this specification, the technical term "a fixed radio appliance" is employed for an originating terminal; however, the originating terminal does not always need to be fixed and it may be movable.

Herein, the communication characteristic of the fixed radio appliance could be at least one of a signal transmission power of the transmitter and a transmitter angle gain, and the communication characteristic of the mobile radio appliance could be at least one of a receiver sensitivity of the receiver and a receiver angle gain. Further, the communication characteristic of the fixed radio appliance could be at least one of a receiver sensitivity of the receiver and a receiver angle gain, and the communication characteristic of the mobile radio appliance could be at least one of a signal transmission power of the transmitter and a transmitter angle gain. Further, as a fluctuation factor, noise that gets mixed from the outside, an inclination of the mobile radio appliance being utilized, a height of the mobile radio appliance being utilized, the characteristic of the mobile radio appliance, a delay of a signal, or the like is envisaged.

Figure 5:
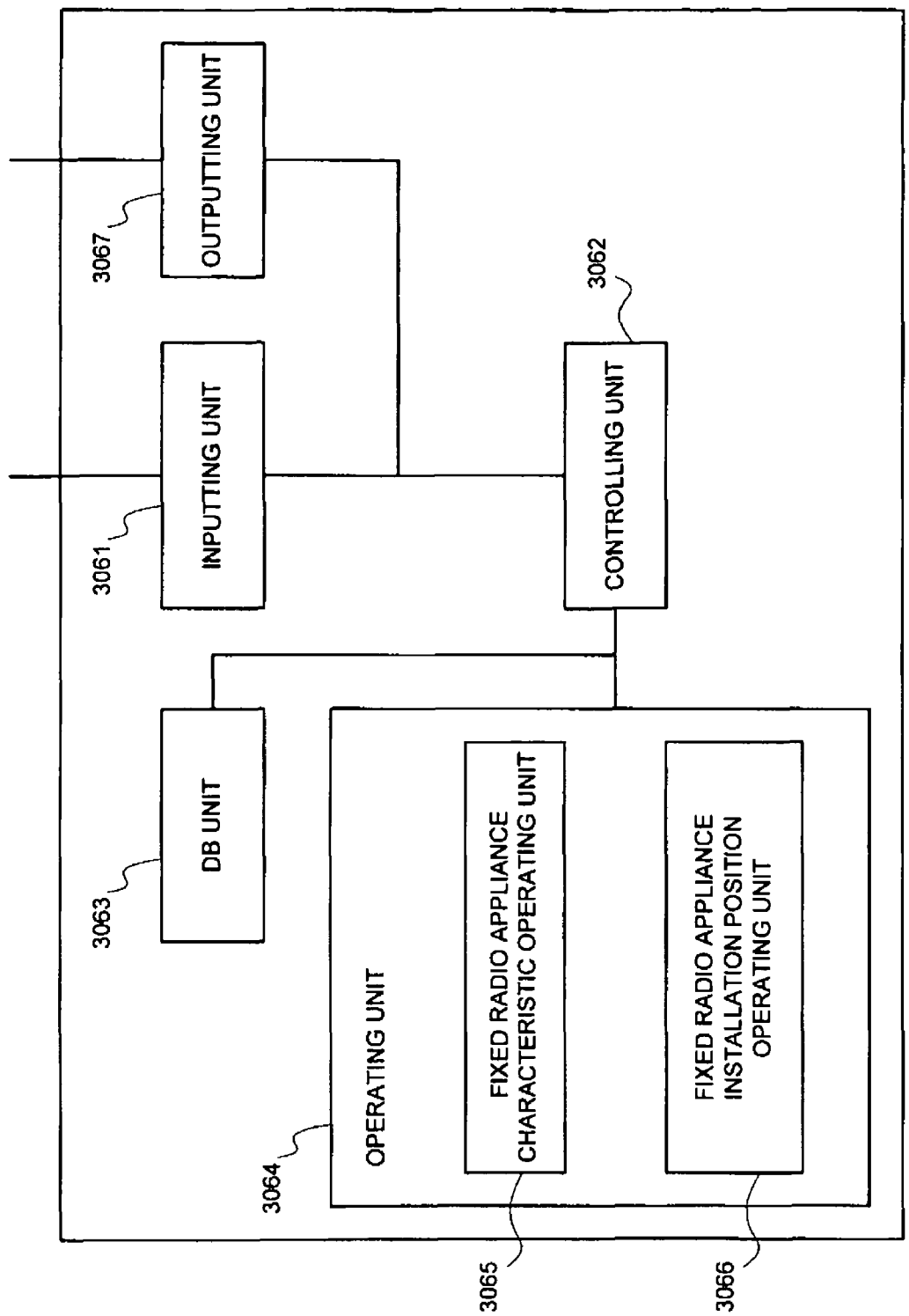
FIG. 5 is a functional block diagram of the positioning system design in the first embodiment and the second embodiment.

At first, a functional block of the function necessary for designing the positioning system that is proposed is shown in FIG. 5.

The present invention is comprised of an inputting unit 3061 for receiving an outside's request or information, a controlling unit 3062 for taking the control ranging from the outside's request received by the inputting unit 3061 to the design of the positioning system, a DB unit 3063 for preserving information necessary for designing the positioning system caused to correspond to the outside's information received by the inputting unit 3061, an operating unit 3064 for operating a calculation for the positioning system design by employing the outside's request received by the inputting unit 3061 and the information necessary for designing the positioning system received from the DB unit 3063, and an outputting unit 3067 for outputting a result of the positioning system designed in the operating unit 3064 to the outside. Further, the positioning system design is made by calculating at least one of the communication characteristic of the fixed radio appliance and the installation position of the fixed radio appliance, and the operating unit 3064 is comprised of a communication characteristic operating unit 3065 of the fixed radio appliance for calculating the communication characteristic of the fixed radio appliance and a fixed radio appliance installation position operating unit 3066 for calculating the installation position of the fixed radio appliance.

Figure 6:
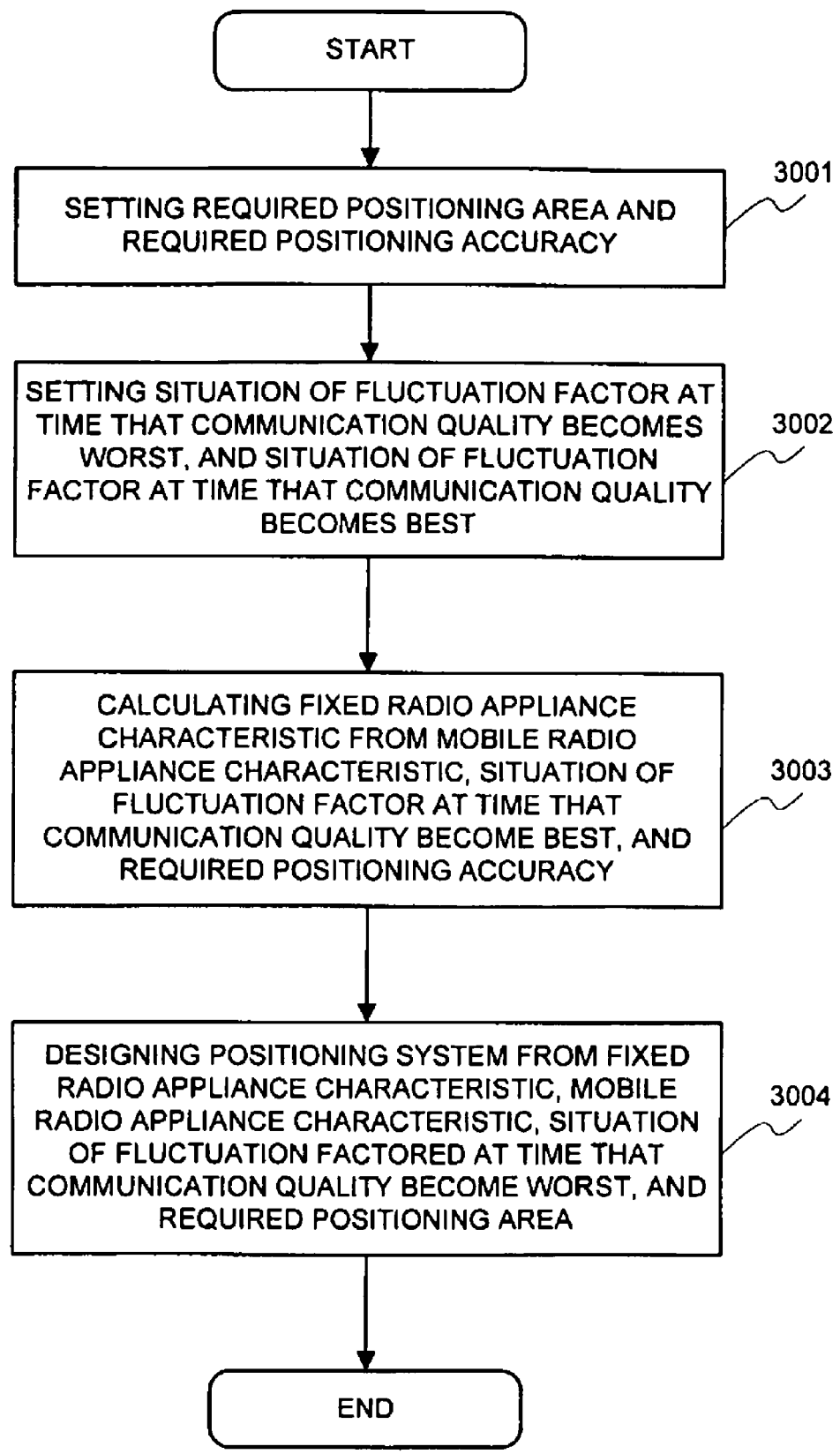
FIG. 6 is a flowchart of the positioning system design in the first embodiment and the second embodiment.

Next, a design flow of the positioning system design employing the functional block of FIG. 5 that is proposed is shown in FIG. 6.

The present invention is comprised of a process (step 3001) of setting a to-be-positioned region (hereinafter, referred to as a required positioning area) that is required of the positioning system by a user, and a positioning accuracy (hereinafter, referred to as a required positioning accuracy) that is required of the positioning system by a user, a process (step 3002) of setting a situation of the fluctuation factor (magnitude of noise, interference, an angle, a delay, or the like) at the time that an influence of the fluctuation factor is estimated to be large and the communication quality is estimated to be worst, and a situation of the fluctuation factor (magnitude of noise, interference, an angle, a delay, or the like) at the time that an influence of the fluctuation factor is estimated to be small and the communication quality is estimated to be best, a process (step 3003) of calculating the communication characteristic of the fixed radio appliance from the communication characteristic (a receiver sensitivity or the like) of the mobile radio appliance, the situation of the fluctuation factor at the time that the communication quality is estimated to be best, and the required positioning accuracy, and a process (step 3004) of designing the positioning system from the communication characteristic (a transmission power or the like) of the fixed radio appliance, the communication characteristic (a receiver sensitivity or the like) of the mobile radio appliance, the situation of the fluctuation factor at the time that the communication quality is estimated to be worst, and the required positioning area.

Figure 7:
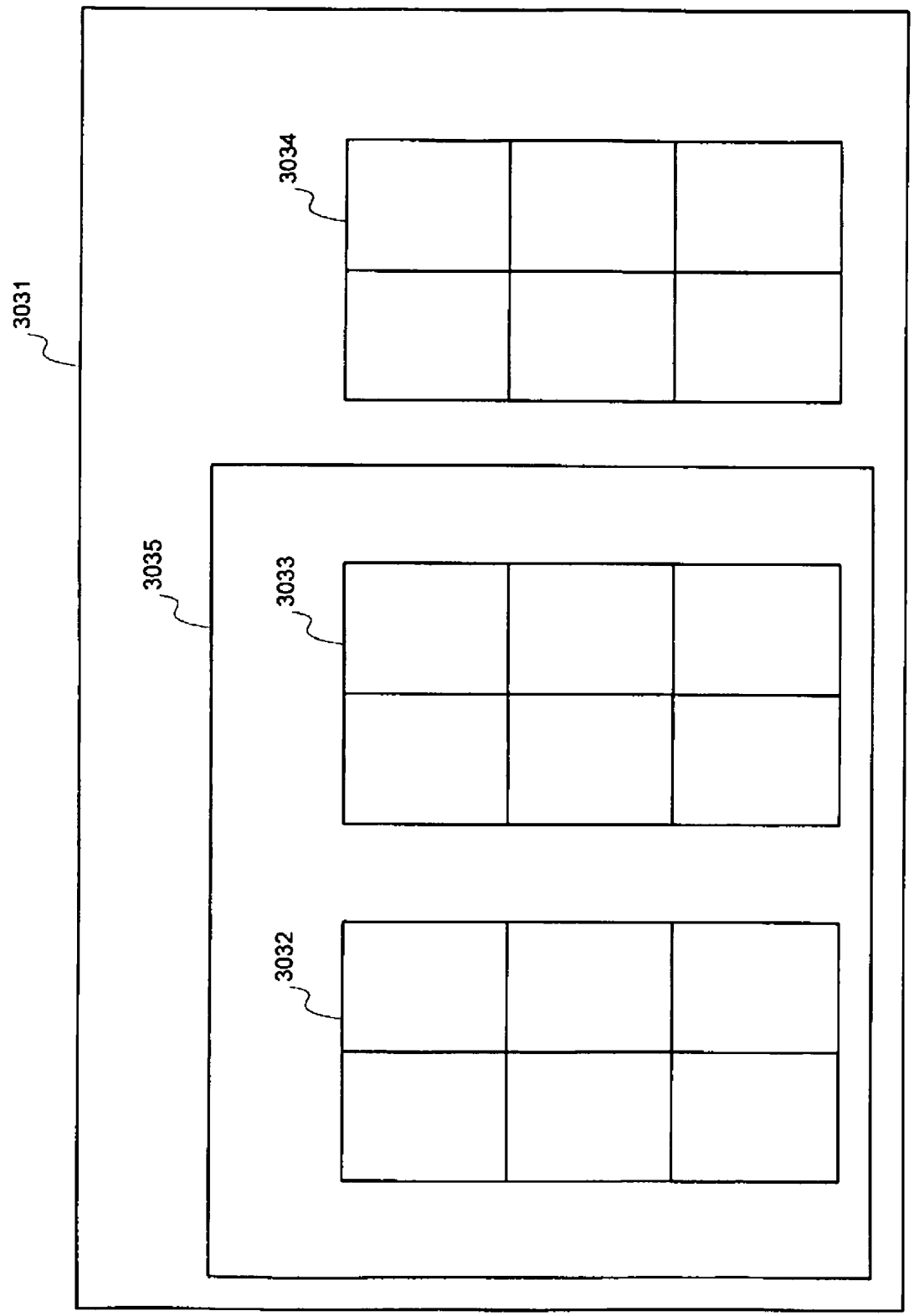
FIG. 7 is a view of one example of a relation between a floor into which the positioning system is introduced and a required positioning area.

In the step 3001, the required positioning area and the required positioning accuracy are set, by employing the inputting unit 3061. Additionally, as shown in FIG. 7, the required positioning area, which has structures 3032 to 3034 arranged within a certain floor 3031, is given as a positioning area 3035 so that a positional coordinate and a space can be judged. At this time, the required positioning area is desirably given by taking information of structures existing within an identical floor into consideration. Herein, as an example of the structure information, a size, a position, a material or the like of a wall, a door, a desk, a shelf, or the like, respectively, are listed. In addition hereto, the required positioning area may exists in plural within an identical floor. Further, with required positioning accuracy, it is envisaged that an allowable maximum distance of the positioning accuracy is given.

In the step 3002, in an environment in which the positioning system is utilized, the situation of the fluctuation factor at the time that the communication quality is estimated to be worst, and the situation of the fluctuation factors at the time that the communication quality is estimated to be best are set by employing the inputting unit 3061 and information from the DB unit 3063.

In the step 3003, the communication characteristic operating unit 3065 of the fixed radio appliance of the operating unit 3064 calculates the communication characteristic (transmission power or the like) of the fixed radio appliance, which is introduced as a positioning system, from the communication characteristic (receiver sensitivity or the like) of the mobile radio appliance, the situation of the fluctuation factors set in the step 3002 at the time that the communication quality is estimated to be best, and the required positioning accuracy set in the step 3001. The situation in which the positioning accuracy is estimated to be worst occurs when the area in which the signal being employed for the positioning is receivable becomes widest, that is, when the fluctuation factor is estimated to be best. For this, so as to satisfy the required positioning accuracy under any situation, it is necessary to take into consideration such a communication characteristic of the fixed radio appliance that satisfies the required positioning accuracy also at a level of the value in which the fluctuation factor is estimated to be best.

This calculation of the communication characteristic of the fixed radio appliance in the communication characteristic operating unit 3065 of the fixed radio appliance may be carried out by employing an equation signifying a relation between each of a transmitter/receiver characteristic, a propagation loss characteristic, a noise characteristic, a delay time characteristic, etc. and a reception probability that is generally employed for designing a link of communication. Further, the calculation of the propagation loss characteristic may be carried out, by employing a general analyzing means called a raytracing technique.

Herein, one example of how to obtain the transmission power, being the above-mentioned communication characteristic of the fixed radio appliance, will be explained. Further, for simplifying explanation, it is assumed that the fluctuation factor is a noise power, and the mobile radio appliance characteristic is a receiver sensitivity. Additionally, how to obtain the transmission power is a well-known technology, so its technology will be simply explained herein.

At first, the area at which a radio wave arrives is obtained from a ratio (S/N ratio) of a power (S) of the received signal, and a received noise power (N). In other word, a radio wave arrives at the region of which the S/N ratio is equal to or more than a constant. And, the received signal power (S) is obtained from an origination intensity (Ps) of the fixed radio appliance, and attenuation (L) accompanied by a propagation distance.

Next, a receiver sensitivity (Pr) of the mobile radio appliance indicates the reception signal power (S) necessary for communication at the time that the noise power (N) is zero.

From the foregoing, it follows that the limit position at which a radio wave arrives is a position at which the reception signal power (S) equals a value obtained by multiplying the receiver sensitivity (Pr) by the noise power (N), and the area nearer to the fixed radio appliance than its position is a area at which a radio wave arrives.

That is, in the step 3003, the transmission power (Ps) of the fixed radio appliance necessary for keeping the receiver sensitivity of the received signal power (S), which is attenuated by an attenuation quantity (L) as the signal is communicated in a distance equivalent to the required positioning accuracy, at a level of the receiver sensitivity (Pr) can be obtained from Ps=Pr×N×L because the receiver sensitivity (Pr) of the mobile radio appliance, the noise power (N), and the required positioning accuracy are known.

Next, in the step 3004, the fixed radio appliance installation position operating unit 3066 of the operating unit 3064 designs the positioning system, i.e. the installation position of the fixed radio appliance from the communication characteristic (transmission power or the like) of the fixed radio appliance calculated in the step 3003, the communication characteristic (receiver sensitivity or the like) of the mobile radio appliance, the situation of the fluctuation factor (the noise power or the like at the time that the noise level is estimated to be maximum) set in the step 3002 at the time that the communication quality becomes worst, and the required positioning area set in the step 3001.

Figure 8:
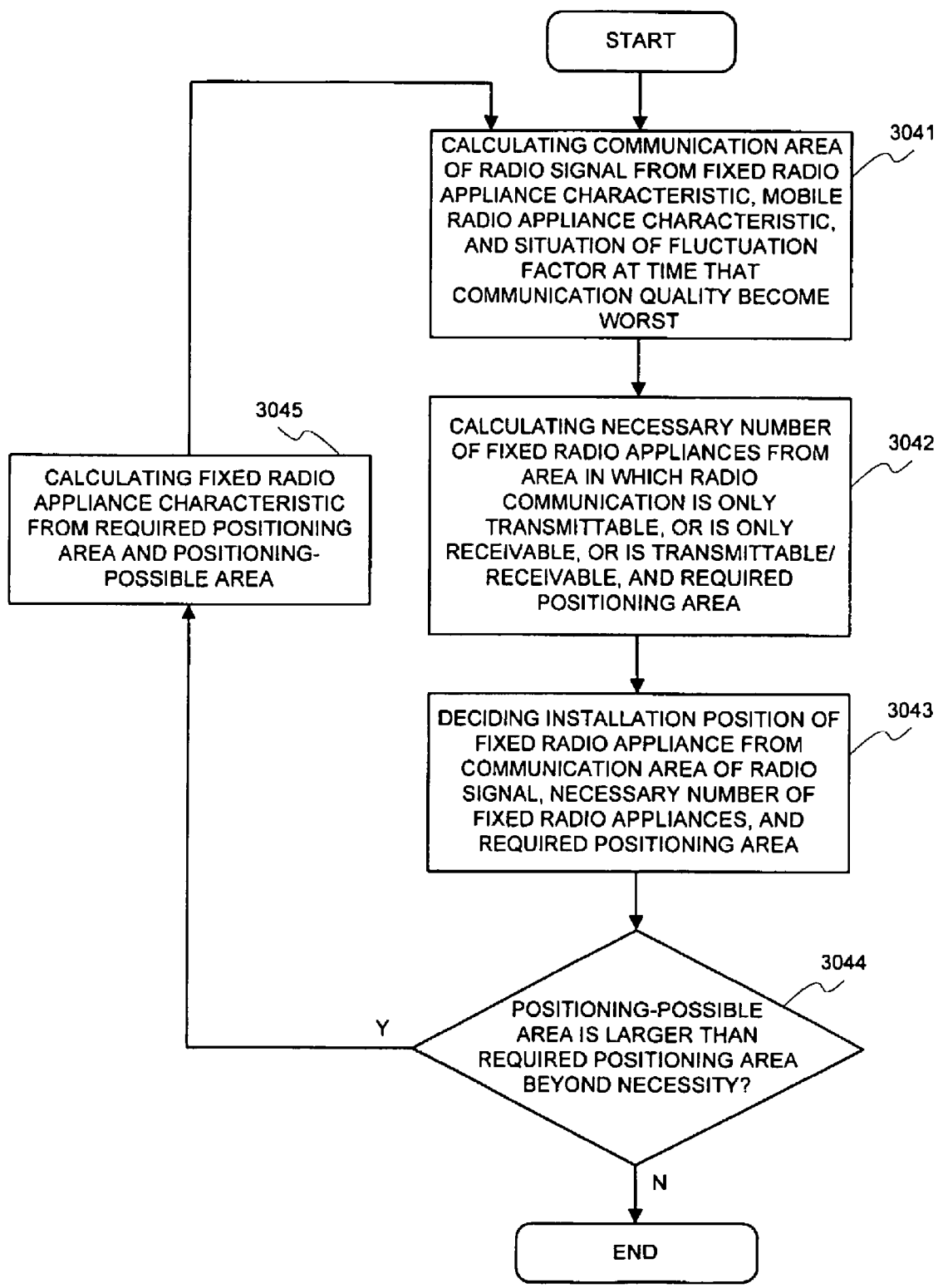
FIG. 8 is a view of a detailed process of the positioning system design in the first embodiment.

Herein, the details of the operation in the fixed radio appliance installation position operating unit 3066 are shown in FIG. 8.

This process is comprised of a process (step 3041) of calculating an area in which the radio signal is only transmittable, or is only receivable, or is transmittable/receivable from the communication characteristic (transmission power or the like) of the fixed radio appliance, the communication characteristic (receiver sensitivity or the like) of the mobile radio appliance, and the situation of the fluctuation factor (the noise power or the like at the time that the noise level is estimated to be maximum) at the time that the communication quality is estimated to be worst, a process (step 3042) of calculating the necessary number of the fixed radio appliances from the area in which the radio communication is only transmittable, or is only receivable, or is transmittable/receivable, and the required positioning area, a process (step 3043) of deciding the installation position of the fixed radio appliances from the area in which the radio signal is only transmittable, or is only receivable, or is transmittable/receivable, the necessary number of the fixed radio appliances, and the required positioning area, a process (step 3044) of determining whether the positioning-possible area is larger than the required positioning area beyond necessity, and a process (step 3045) of calculating the communication characteristic (transmission power or the like) of the fixed radio appliance from the required positioning area and the positioning-possible area.

Figure 9:
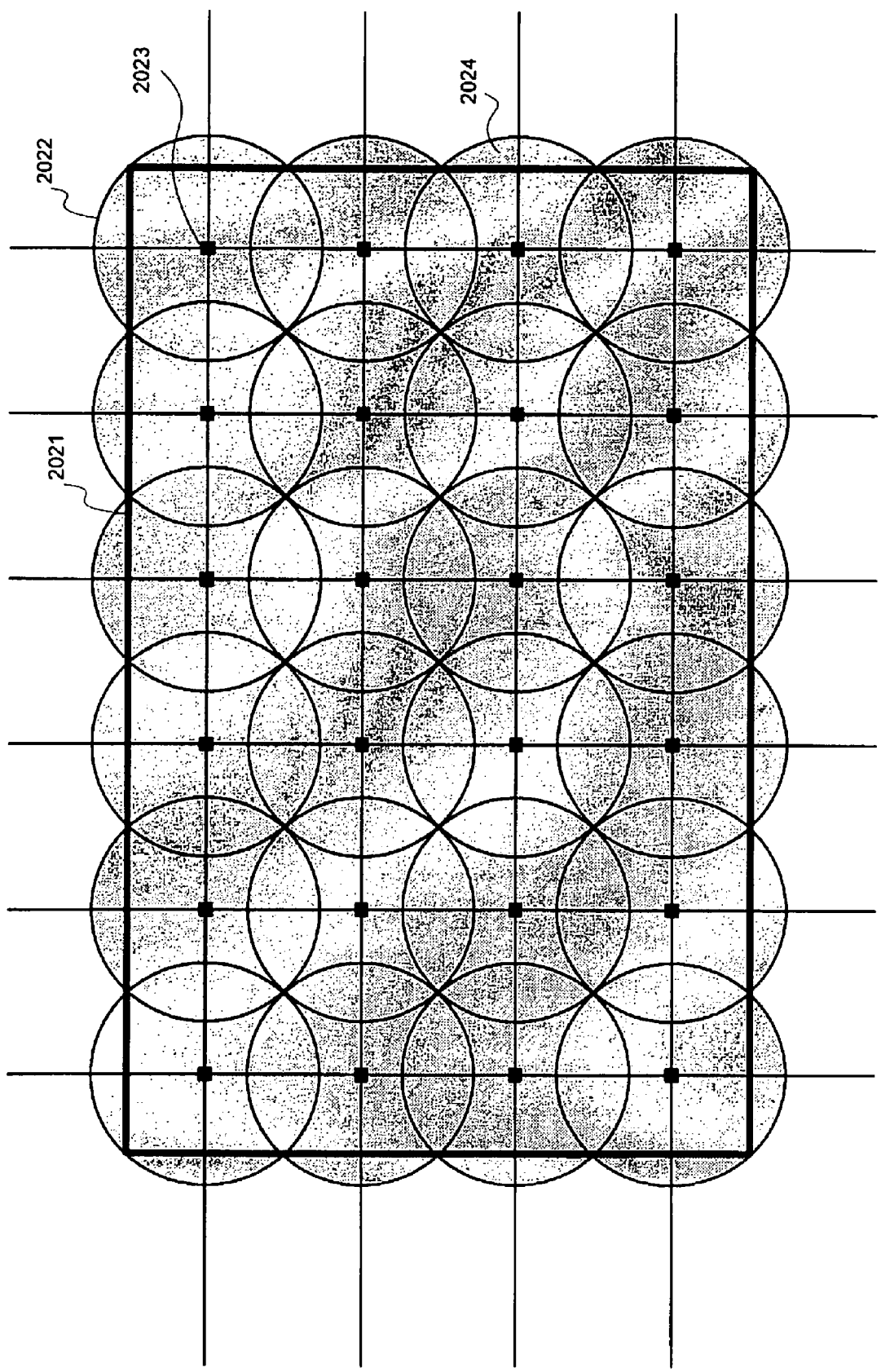
FIG. 9 is a view of a required positioning area and a designed positioning area.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the communication characteristic (transmission power or the like) of the fixed radio appliance and the installation position of the fixed radio appliance.

At first, in the step 3041, the area in which the radio signal is only transmittable, or is only receivable, or is transmittable/receivable is calculated from the communication characteristic (transmission power or the like) of the fixed radio appliance calculated in the step 3003, and the communication characteristic (receiver sensitivity or the like) of the mobile radio appliance, and the situation of the fluctuation factor (the noise power or the like at the time that the noise level is estimated to be maximum) set in the step 3002 at the time that the communication quality is estimated to be worst. It is desirable that the positioning is surely possible within the required positioning area. To the end that the position is possible, it is necessary that the radio signal is only transmittable, or is only receivable, or is transmittable/receivable. For this, it is necessary that the radio signal is only transmittable, or is only receivable, or is transmittable/receivable within the required positioning area 2021 also in the situation in which the area in which the radio signal is only transmittable, or is only receivable, or is transmittable/receivable is estimated to be narrowest, that is, also in the situation in which the fluctuation factor is estimated to be worst (under the noise power at the time that the noise level is estimated to be maximum, or the like).

The calculation in this step of the communication characteristic (transmission power or the like) of the fixed radio appliance may be implemented by employing an equation signifying a relation between each of a transmitter/receiver characteristic, a propagation loss characteristic, a noise characteristic, a delay time characteristic, etc. and a reception probability that is generally used for designing a link of communication. Further, the propagation loss characteristic may be calculated by employing a general analyzing means called a raytracing technique.

Next, in the step 3042, the necessary number of the fixed radio appliances is calculated from the area calculated in the step 3041, in which the radio communication is only transmittable, or is only receivable area, or is transmittable/receivable, and the required positioning area 2021 set in the step 3001. The necessary number of the fixed radio appliances is obtained by calculating the minimum number of the transmitters necessary for covering the required positioning area with the positioning-possible areas from the area in which the radio communication is only transmittable, or is only receivable, or is transmittable/receivable.

In the calculation of the necessary number of the fixed radio appliances, a space between the fixed radio appliances is calculated by employing a radius r_min of the area in which the radio signal from one fixed radio appliance is only transmittable, or is only receivable, or is transmittable/receivable, and the minimum number of the transmitters necessary for covering the required positioning area with the positioning-possible areas in a calculated space between the fixed radio appliances is calculated. With the calculation of the space between the fixed radio appliances, as one example, the space in a longitudinal direction between the fixed radio appliances may be calculated by multiplying r_min by sin(a), and a space in a traverse direction between the fixed radio appliances may be calculated by multiplying r_min by cos(a), where a is angle of 0 to 90°. Further, as another example of calculating the minimum number of the fixed radio appliance necessary for covering the required positioning area, the minimum number may be calculated by multiplying each of the values obtained by adding 1 (one) to the values obtained by dividing the lengths in respective directions of the required positioning area by the spaces in respective directions between the fixed radio appliances by the other.

Thereafter, in the step 3043, the installation position of the fixed radio appliance is decided from the area calculated in the step 3041, in which the radio signal is only transmittable, or is only receivable, or is transmittable/receivable, the necessary number of the fixed radio appliances calculated in the step 3042, and the required positioning area set in the step 3001.

In the process above, the installation position of the fixed radio appliance can be decided in the first place. However, as is often the case, this decided position is not always the best suited one. In such a case, the following process is performed in succession to the above-mentioned process.

In the step 3044, it is determined whether the positioning-possible area, which is calculated from the area calculated in the step 3041, in which the radio communication is only transmittable, or is only receivable, or is transmittable/receivable, and the installation position of the fixed radio appliance calculated in the step 3043, is larger than the required positioning area set in the step 3001 beyond necessity. As one example of a criteria for determining whether it is larger beyond necessity, the determination may be made based upon whether a difference between a length in each direction of the positioning-possible area and a length in each direction of the required positioning area exceeds a threshold. In a case where it has not been determined that the positioning-possible area is larger than the required positioning area beyond necessity, a design result (the installation position of the fixed radio appliance) is output from the outputting unit 3067, and the positioning system design is finished.

In a case where the positioning-possible area is larger than the required positioning area beyond necessity, in the step 3045, the communication characteristic (transmission power or the like) of the fixed radio appliance is calculated from the required positioning area set in the step 3001, and the positioning-possible area that is calculated from the area calculated in the step 3041, in which the radio communication is only transmittable, or is only receivable, or is transmittable/receivable, and the installation position of the fixed radio appliance calculated in the step 3043. As one example of calculating the communication characteristic of the fixed radio appliance, a radius r_min2 of the area in which the radio signal from one fixed radio appliance is only transmittable, or is only receivable, or is transmittable/receivable at the time that the length in each direction of the positioning-possible area is equalized with the length in each direction of the required positioning area is calculated, and the communication characteristic (transmission power or the like) of the fixed radio appliance for satisfying the radius r_min2 of the area in which the radio signal from one fixed radio appliance is only transmittable, or is only receivable, or is transmittable/ receivable is calculated. When this step is finished, the operation returns to the step 3041.

The processes after it are similar to the foregoing processes.

A Second Embodiment

A second embodiment of the present invention will be explained by employing the following figures. The second embodiment, which is basically similar to the first embodiment, slightly differs in the method of deciding the communication characteristic (transmission power or the like) of the fixed radio appliance and the method of deciding the installation position of the fixed radio appliance. Thus, in the following explanation, the part of the process different from that of the first embodiment will be mainly explained.

[Explanation of a Configuration]

A system configuration is shown in FIG. 4. This system is configured by constructing a positioning area 1066 of at least one fixed radio appliance or more 1061 to 1063, and at least one mobile radio appliance or more 1064 and 1065. In the present invention, the characteristic of the fixed radio appliances 1061 to 1063 is designed based upon the characteristic of the mobile radio appliances 1064 and 1065, and the fluctuation factors and the installation position of the fixed radio appliances 1061 to 1063 is designed.

At first, a functional block of the function necessary for designing the positioning system that is proposed is shown in FIG. 5.

The present invention is comprised of an inputting unit 3061 for receiving an outside's request or information, a controlling unit 3062 for taking the control ranging from the outside's request received by the inputting unit 3061 to the design of the positioning system, a DB unit 3063 for preserving information for necessary for designing the positioning system caused to correspond to the outside's information received by the inputting unit 3061, an operating unit 3064 for operating a calculation for the positioning system design by employing the outside's request received by the inputting unit 3061 and the information for necessary for designing the positioning system received from the DB unit 3063, and an outputting unit 3067 for outputting a result of the positioning system designed in the operating unit 3064 to the outside. Further, the operating unit 3064 is comprised of a communication characteristic operating unit 3065 of the fixed radio appliance for calculating the communication characteristic of the fixed radio appliance and a fixed radio appliance installation position operating unit 3066 for calculating the installation position of the fixed radio appliance.

Next, a design flow of the positioning system design employing the functional block of FIG. 5 that is proposed is shown in FIG. 6.

The present invention is comprised of a process (step 3001) of setting a to-be-positioned region (hereinafter, referred to as a required positioning area) that is required of the positioning system by a user, and a positioning accuracy (hereinafter, referred to as a required positioning accuracy) that is required of the positioning system by a user, a process (step 3002) of setting a situation of the fluctuation factor (magnitude of noise or the like) at the time that an influence of the fluctuation factor is estimated to be large and the communication quality is estimated to be worst, and a situation of the fluctuation factor (magnitude of noise or the like) at the time that an influence of the fluctuation factor is estimated to be small and the communication quality is estimated to be best, a process (step 3003) of calculating the communication characteristic of the fixed radio appliance from the communication characteristic (a receiver sensitivity or the like) of the mobile radio appliance, the situation of the fluctuation factor at the time that the communication quality is estimated to be best, and the required positioning accuracy, and a process (step 3004) of designing the positioning system from the communication characteristic (transmission power or the like) of the fixed radio appliance, the communication characteristic (receiver sensitivity or the like) of the mobile radio appliance, the situation of the fluctuation factor at the time that the communication quality is estimated to be worst, and the required positioning area.

In the step 3001, the required positioning area and the required positioning accuracy are set, by employing the inputting unit 3061.

In the step 3002, in an environment in which the positioning system is utilized, the situation of the fluctuation factor at the time that the communication quality is estimated to be worst, and the situation of the fluctuation factor at the time that the communication quality is estimated to be best are set by employing the inputting unit 3061 and information from the DB unit 3063.

In the step 3003, the communication characteristic operating unit 3065 of the fixed radio appliance of the operating unit 3064 calculates the communication characteristic (transmission power or the like) of the fixed radio appliance, which is introduced as a positioning system, from the communication characteristic (receiver sensitivity or the like) of the mobile radio appliance, the situation of the fluctuation factor set in the step 3002 at the time that the communication quality is estimated to be best, and required positioning accuracy set in the step 3001.

This calculation of the communication characteristic of the fixed radio appliance in the communication characteristic operating unit 3065 of the fixed radio appliance may be carried out by employing an equation signifying a relation between each of a transmitter/receiver characteristic, a propagation loss characteristic, a noise characteristic, a delay time characteristic, etc. and a reception probability that is generally employed for designing a link of communication.

In the step 3004, the fixed radio appliance installation position operating unit 3066 of the operating unit 3064 designs the positioning system, i.e. the installation position of the fixed radio appliance from the communication characteristic (transmission power or the like) of the fixed radio appliance calculated in the step 3003, the communication characteristic (receiver sensitivity or the like) of the mobile radio appliance, the situation of the fluctuation factor (the noise power or the like at the time that the noise level is estimated to be maximum) set in the step 3002 at the time that the communication quality is estimated to be worst, and the required positioning area set in the step 3001.

Figure 10:
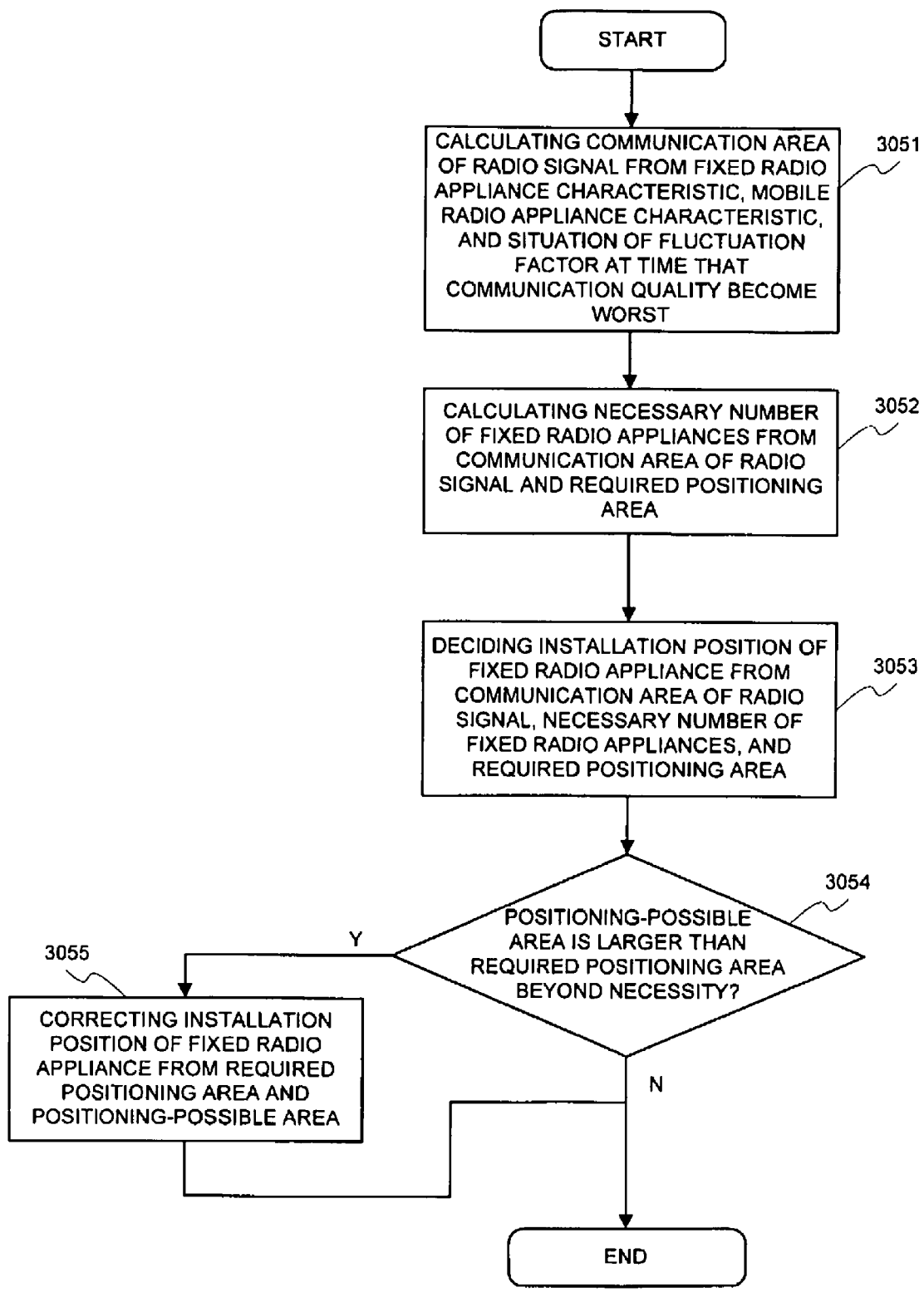
FIG. 10 is a view of a detailed process of the positioning system design in the second embodiment.

Herein, the details of the operation in the fixed radio appliance installation position operating unit 3066 are shown in FIG. 10.

This process is comprised of a process (step 3051) of calculating an area in which the radio signal is only transmittable, or is only receivable, or is transmittable/receivable from the communication characteristic (transmission power or the like) of the fixed radio appliance, the communication characteristic (receiver sensitivity or the like) of the mobile radio appliance, and the situation of the fluctuation factor (the noise power or the like at the time that the noise level is estimated to be maximum) at the time that the communication quality is estimated to be worst, a process (step 3052) of calculating the necessary number of the fixed radio appliances from the area in which the radio communication is only transmittable, or is only receivable, or is transmittable/receivable, and the required positioning area, a process (step 3053) of deciding the installation position of the fixed radio appliances from the area in which the radio signal is only transmittable, or is only receivable, or is transmittable/receivable, the necessary number of the fixed radio appliances, and the required positioning area, a process (step 3054) of determining whether the positioning-possible area is larger than the required positioning area beyond necessity, and a process (step 3055) of correcting the installation position of the fixed radio appliance from the required positioning area and the positioning-possible area.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the communication characteristic (transmission power or the like) of the fixed radio appliance and the installation position of the fixed radio appliance.

At first, in the step 3051, the area in which the radio signal is only transmittable, or only receivable, or is transmittable/receivable is calculated from the communication characteristic (transmission power or the like) of the fixed radio appliance calculated in the step 3003, and the communication characteristic (receiver sensitivity or the like) of the mobile radio appliance, and the situation of the fluctuation factor (the noise power or the like at the time that the noise level is estimated to be maximum) set in the step 3002 at the time that the communication quality is estimated to be worst.

Next, in the step 3052, the necessary number of the fixed radio appliances is calculated from the area calculated in the step 3051, in which the radio communication is only transmittable, or is only receivable, or is transmittable/receivable, and the required positioning area 2021 set in the step 3001.

Thereafter, in the step 3053, the installation position of the fixed radio appliance is decided from the area calculated in the step 3051, in which the radio signal is only transmittable, or only receivable, or is transmittable/receivable, the necessary number of the fixed radio appliances calculated in the step 3052, and the required positioning area set in the step 3001.

In the process above, the installation position of the fixed radio appliance can be decided in the first place. However, as is often the case, this decided position is not always the best suited one. In such a case, the following process is performed in succession to the above-mentioned process.

In the step 3054, it is determined whether the positioning-possible area, which is calculated from the area calculated in the step 3051, in which the radio communication is only transmittable, or only receivable, or is transmittable/receivable, and the installation position of the fixed radio appliance calculated in the step 3053, is larger than the required positioning area set in the step 3001 beyond necessity. In a case where it has not been determined that the positioning-possible area is larger than the required positioning area beyond necessity, a design result (the installation position of the fixed radio appliance) is output from the outputting unit 3067, and the positioning system design is finished.

Figure 11:
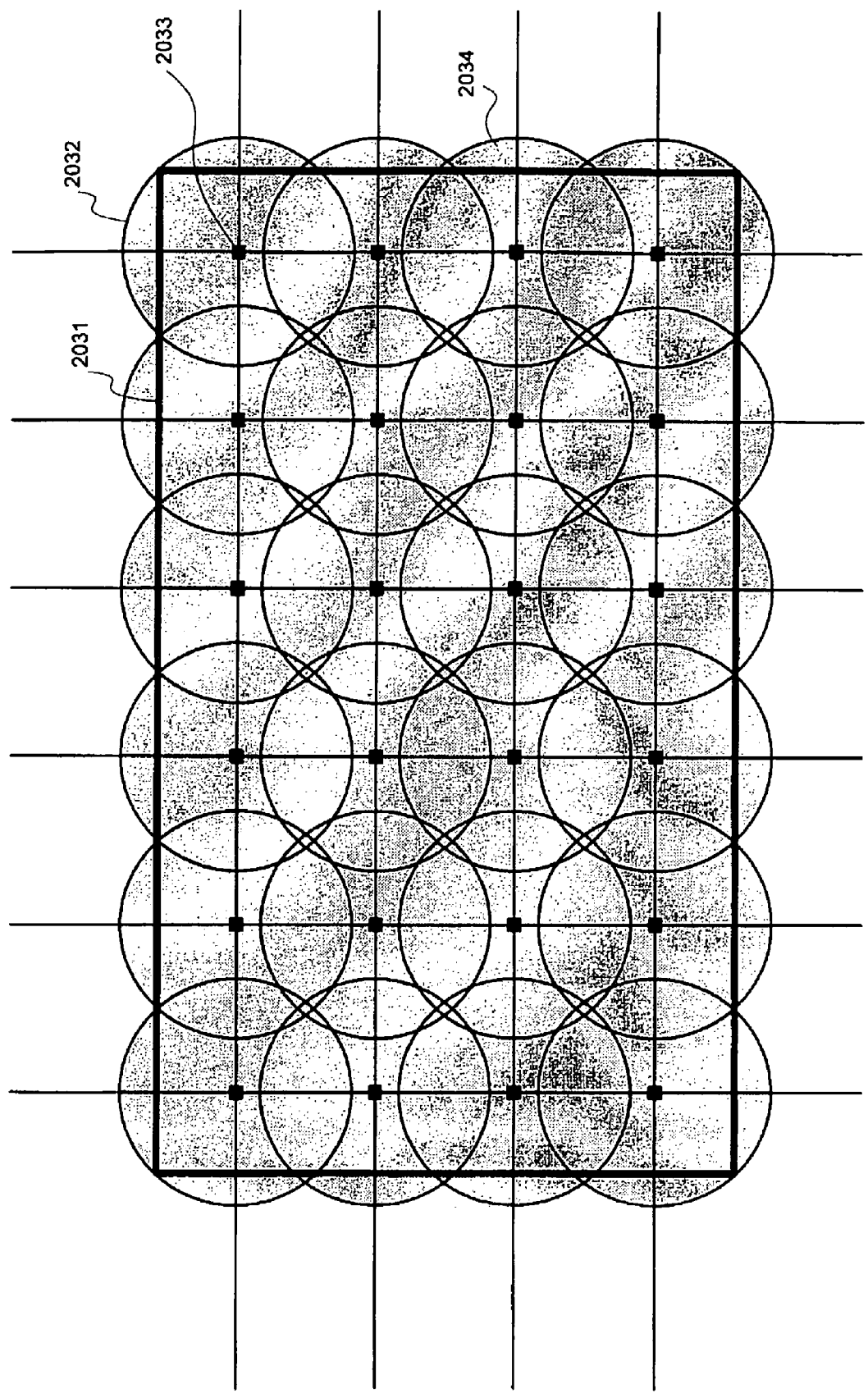
FIG. 11 is a view of a required positioning area and a designed positioning area in the case of having narrowed a space between fixed radio appliances.
Figure 12:
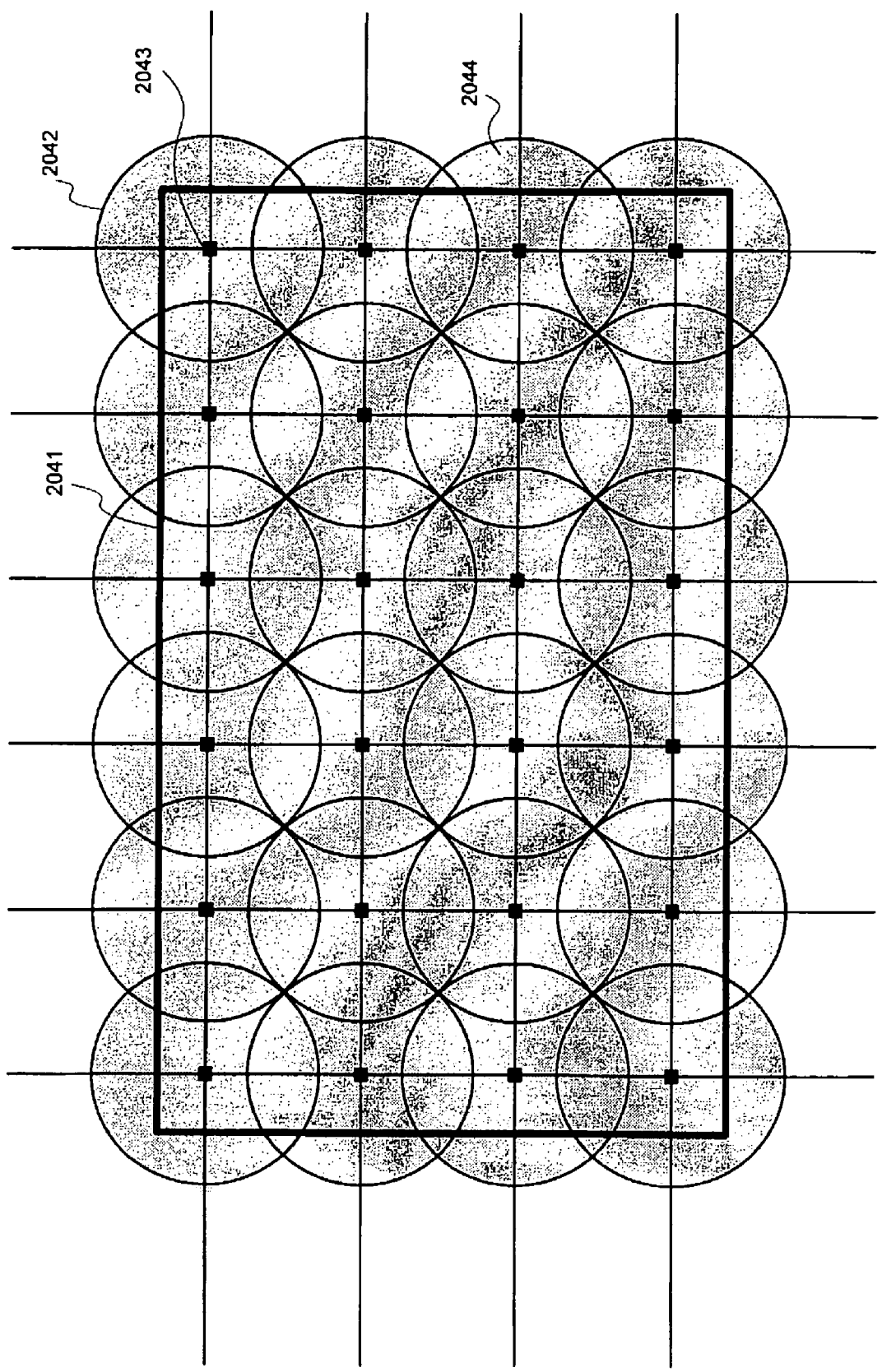
FIG. 12 is a view of a required positioning area and a designed positioning area in the case of having installed the fixed radio appliance so that the upper/lower/left/right sides of the positioning area designed to go out from the required positioning area are equalized with each other.

In a case where the positioning-possible area is larger than the required positioning area beyond necessity, in the step 3055, the installation position of the fixed radio appliance is corrected from the required positioning area set in the step 3001, and the positioning-possible area that is calculated from the area calculated in the step 3051, in which the radio communication is only transmittable, or only receivable, or is transmittable/receivable, and the installation position of the fixed radio appliance calculated in the step 3053, a design result is output from the outputting unit 3067, and the positioning system design is finished. As one example of correcting the installation position of the fixed radio appliance, as shown in FIG. 11, there exists the method of installing the fixed radio appliances in such a manner of slightly shortening the distance between the installation positions so that the positioning areas, each of which is an area at which a radio wave from each fixed radio appliance arrives, are overlapped with each other all the more, or the like. Further, as another example, as shown in FIG. 12, there exists the method as well of installing the fixed radio appliances without changing a space between each of the fixed radio appliances and the other so that the upper/lower/left/right sides of the positioning area designed to go out from the required positioning area are equalized with each other. Further, as yet another example, there exists the method as well of keeping the status of the installation shown in FIG. 13 as it stands.

Figure 13:
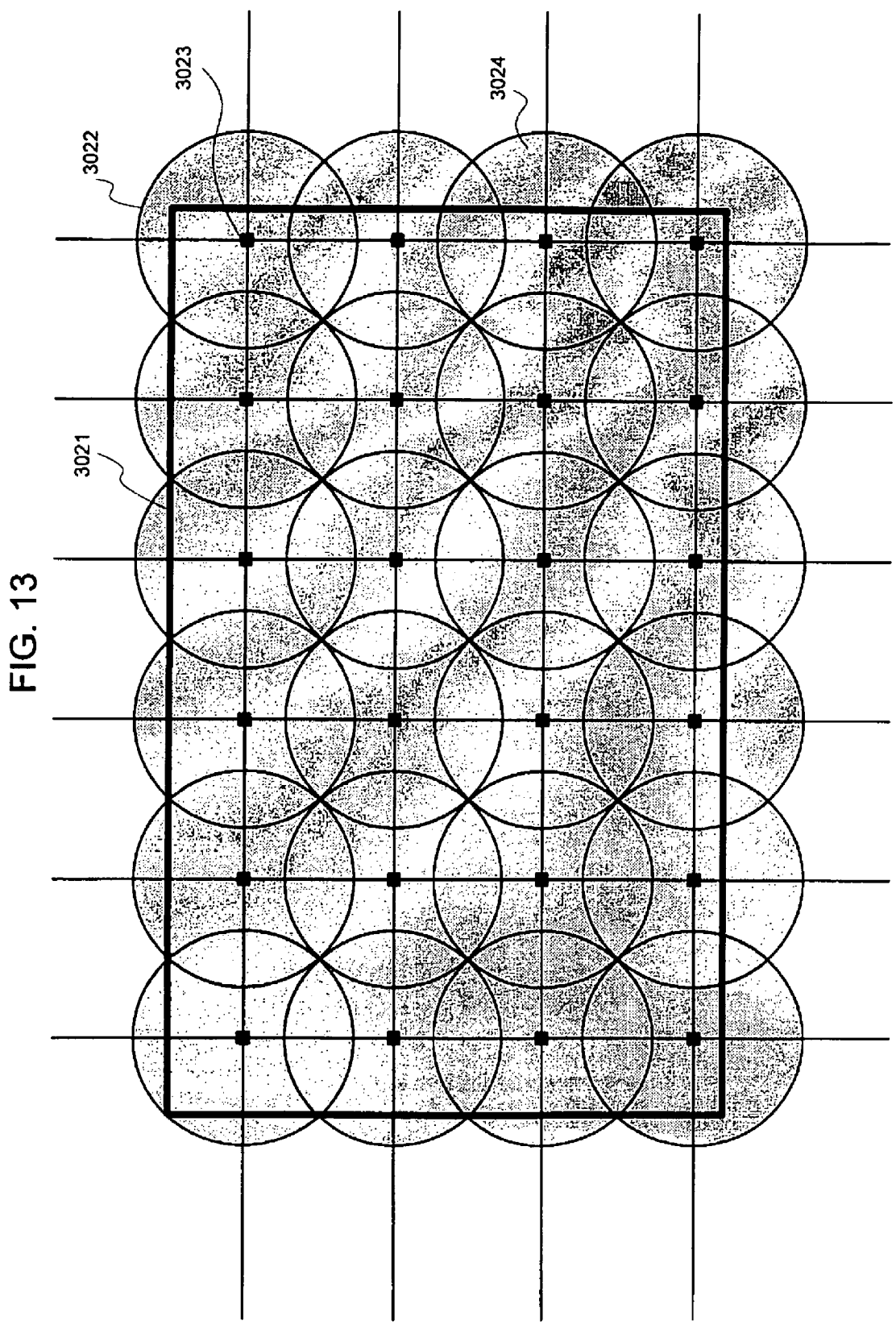
FIG. 13 is a view of a required positioning area and a designed positioning area in a case where the designed positioning area becomes wider than the required positioning area beyond necessity.

Further, as shown in FIG. 11, FIG. 12, and FIG. 13, the process of changing the positioning-possible area can be performed similarly in the first embodiment as well.

An Example 1

Figure 14:
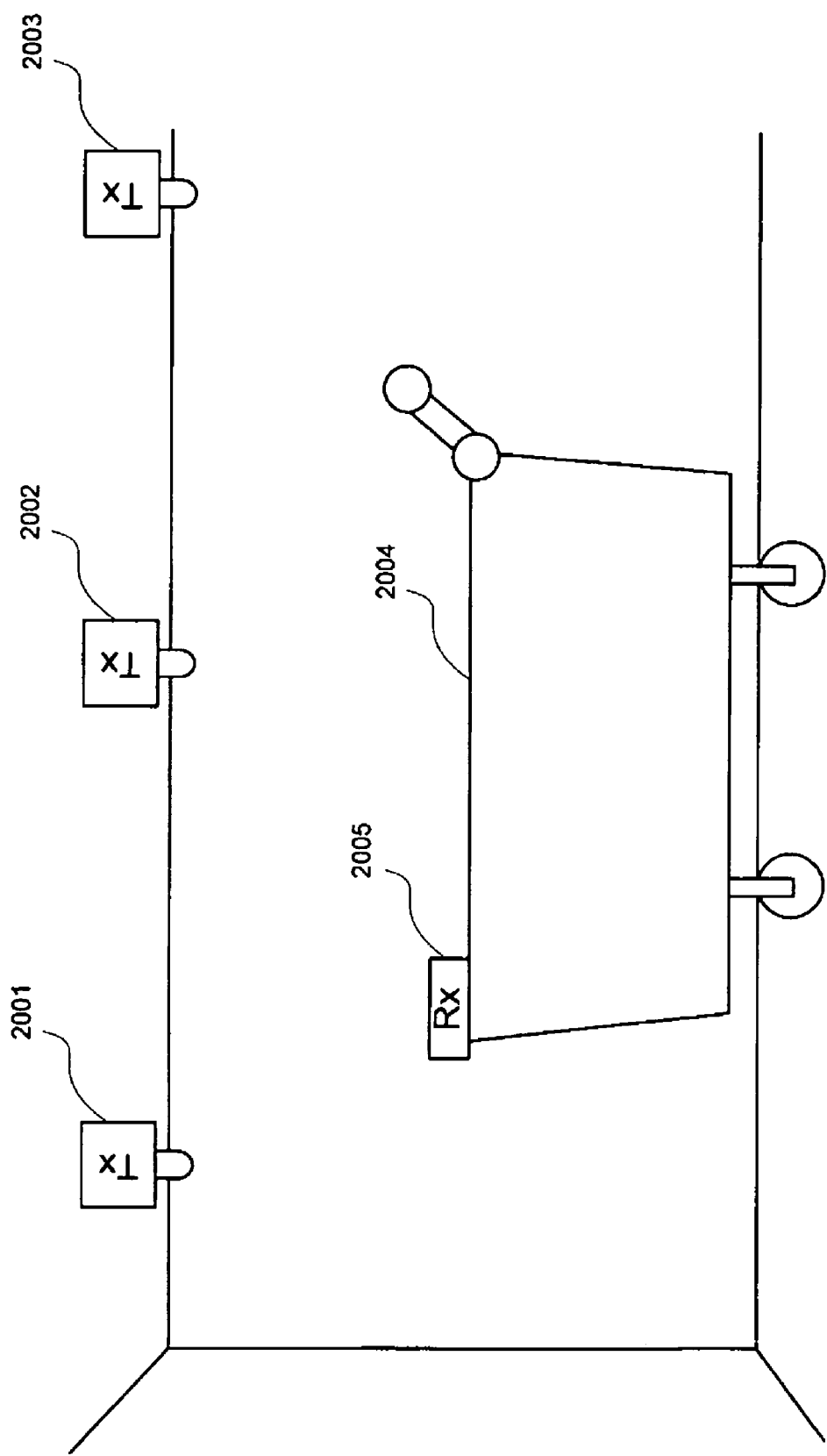
FIG. 14 is a view of the environment into which the positioning system that is envisaged in a first example, a third example, and a sixth example is introduced.

In a first example of the present invention, an example will be explained of the positioning system design (decision of the installation position of the originating terminal (transmitter)) in the case of installing transmitters (originating terminals) 2001 to 2003 only for the positioning that broadcast-transmits the signal for positioning onto the ceiling, and fixedly mounting a receiver (receiving terminal) 2005 on the upper side etc. of a cart 2004 in the positioning system employing the infra-red-rays, as shown in FIG. 14. Additionally, the method of designing the positioning system follows the functional block of FIG. 5 and flows of FIG. 15 and FIG. 16, being a modification example of FIG. 6 and FIG. 8, respectively.

At first, in a step 4001, the required positioning area and the required positioning accuracy are set. Envisage that the required positioning area, which is a top view of information of the required positioning area in a certain floor as shown in FIG. 7, is given as a rectangle like a positioning area 3035 within a floor 3031 in which structures 3032 to 3034 have been arranged. Further, it is assumed that the required positioning accuracy is given as r.

Next, in a step 4002, the situation of the fluctuation factor at the time that the communication quality is estimated to be worst, and the situation of the fluctuation factor at the time that the communication quality is estimated to be best are set. The fluctuation factor that should be taken into consideration this time is noise. As one example of the noise of the infrared-rays, the noise from sunlight is listed. The noise quantity from sunlight changes, depending upon to a time. For this, a noise quantity N_worst at the time that the communication quality is estimated to be worst is set as a situation of the fluctuation factor (noise quantity) at the time that the communication quality is estimated to be worst, and further, a noise quantity N_best at the time that the communication quality is estimated to be best is set as a situation of the fluctuation factor (noise quantity) at the time that the communication quality is estimated to be best. Herein, as an example of the method of setting the noise quantity N_worst at the time that the communication quality is estimated to be worst, and the noise quantity N_best at the time that the communication quality is estimated to be best, there exist the method of directly inputting the noise quantity from the inputting unit 3061 of FIG. 5, the method of, in the DB unit 3063, preserving the noise quantity under an environment being envisaged, or the like. Additionally, the information, which is preserved in the DB unit 3063, in the method of, in the DB unit 3063, preserving the noise quantity under an environment being envisaged could be, for example, noise information 4051 for each piece of installation environment information as shown in FIG. 17. At this time, as an example of each piece of installation environment information, rough installation information of an office, a warehouse, etc., information of a noise source that could become noise against communication, for example, existence of a window, absence of a window, and a fluorescent, or the like is listed. Further, as an example of noise information, there exists at least one of the noise quantity that is estimated to be worst, and the noise quantity that is estimated to be best for each piece of installation environment information.

And, in a step 4003, a transmitter characteristic is calculated from the receiver performance, the noise quantity N_best at the time that the communication quality is estimated to be best, and the required positioning accuracy.

Figure 19:
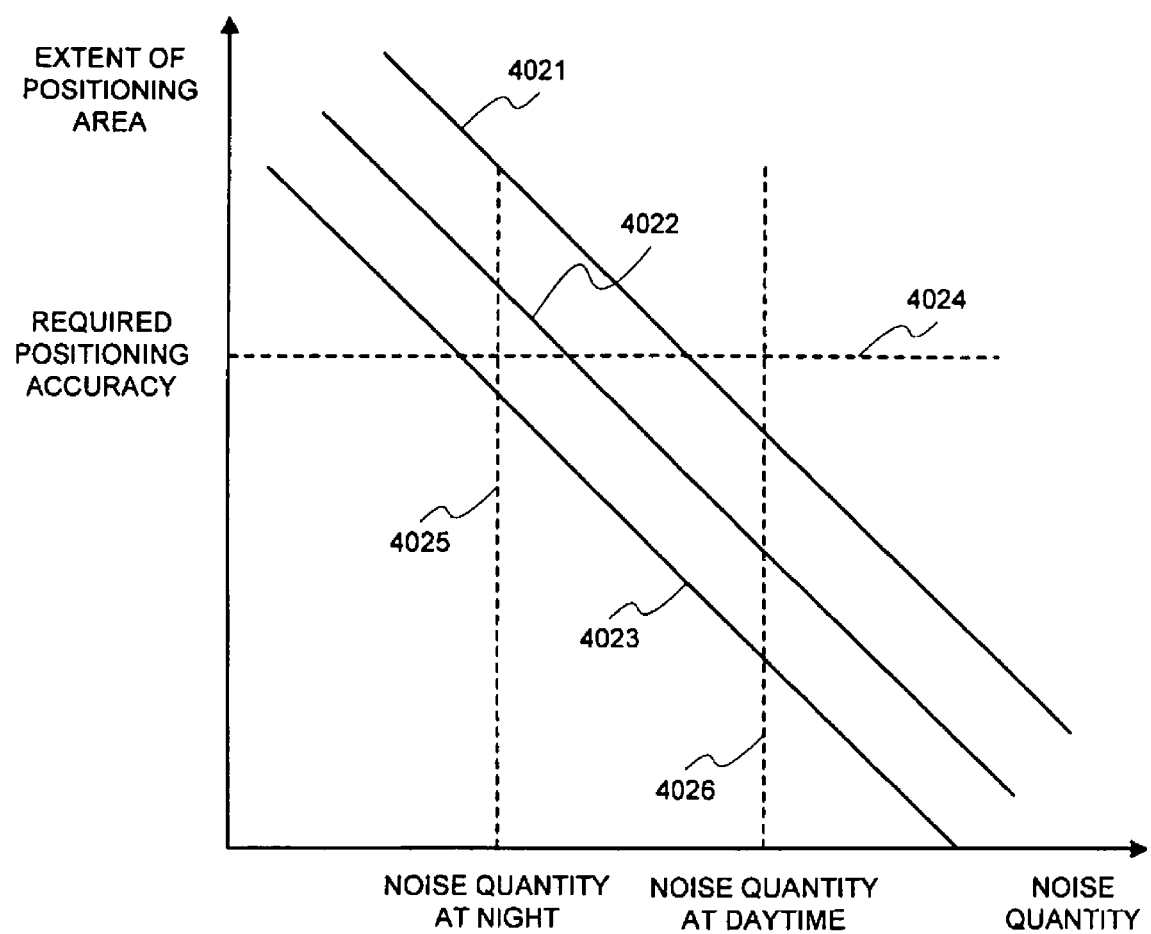
FIG. 19 is a view of an example of a relation of a positioning area with each noise quantity.

Herein, as one example, now think about the situation in which the requested positioning accuracy like a broken line 4024 is given under an environment of noise quantities at night and at daytime like broken lines 4025 and 4026, respectively, in a situation in which three kinds of transmitters having graphical characteristics of solid lines 4021 to 4023, respectively, can be designed as shown in an example of a graph of FIG. 19 in which a relation between the noise quantity and an extent of the positioning area is illustrated. Additionally, the solid lines 4021 to 4023 of FIG. 19 indicate an example of the graph of three kinds of the transmitter characteristics, respectively, the broken line 4024 indicates an example of the required positioning accuracy, the broken line 4025 indicates an example of the noise quantity at night, and the broken line 4026 indicates an example of the noise quantity at daytime. It is preferable to calculate the transmitter characteristic adapted to satisfy the required positioning accuracy under the noise quantity at the time that the communication quality is estimated to be best. The noise quantity at the time that the communication quality is estimated to be best is the noise quantity at night, being the broken line 4025. Further, the fact that the required positioning accuracy is satisfied signifies that the extent of the positioning area is narrower than the extent equivalent to the required positioning accuracy, being the broken line 4024. That is, the transmitter characteristic that should be calculated is such a transmitter characteristic that assumes the solid line 4023 of which the extent of the positioning area under the noise quantity at night in which the communication quantity is estimated to be best is narrower than the extent equivalent to the required positioning accuracy.

As a specific example of calculating the transmitter characteristic, the transmitter characteristic such that the SN ratio, which takes into consideration the receiver performance, the noise quantity N_best at the time that the communication quality is estimated to be best, and the propagation loss, becomes equal to or less than a desired SN in a positional relation between the transmitter and the receiver that is calculated from the installation height of the transmitter and the required positioning accuracy r is calculated. Herein, the propagation loss is obtained by calculating a propagation distance from the installation height of the transmitter and the required positioning accuracy r. Additionally, any of the method of setting the installation height of the transmitter from the inputting unit 3061 of FIG. 5, the method of pre-setting it in the DB unit 3063, and the method of pre-setting it in the operating unit 3064 is envisagable as an example of the method of setting the installation height of the transmitter. As an example of the information that is pre-preserved in the DB unit 3063, it is thinkable to preserve the installation height corresponding to rough installation environment information of an office, a warehouse, etc. as shown in FIG. 18.

Thereafter, in a step 4004, after a radius of the area in which the infrared signal from one transmitter is receivable is calculated from the transmitter characteristic calculated in the step 4003, the receiver characteristic, and the noise quantity N_worst at the time that the communication quality is estimated to be worst to calculate the necessary number of the transmitters from the radius of the area in which the infrared signal from one transmitter is receivable, and the required positioning area, the transmitter characteristic and the installation position of the transmitter are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the transmitter characteristic and the installation position of the transmitter.

Specifically, in a step 4011, the area in which the infrared signal is receivable is calculated from the transmitter characteristic calculated in the step 4003, the receiver characteristic, and the noise quantity N_worst set in the step 4002 at the time that the communication quality is estimated to be worst.

And, in a step 4012, the necessary number of the transmitters is calculated from the area calculated in the step 4011, in which the infrared communication is receivable, and the required positioning area set in the step 4001. Thereafter, in a step 4013, the installation position of the transmitter is calculated from the area in which the infrared signal is receivable, the necessary number of the transmitters calculated in the step 4012, and the required positioning area set in the step 4001.

And, in a step 4014, it is determined whether the positioning-possible area, which is calculated from the area calculated in the step 4011, in which the infrared communication is receivable, and the installation position of the transmitter calculated in the step 4013, is larger than the required positioning area set in the step 4001 beyond necessity. In a case where it has not been determined that the positioning-possible area is larger than the required positioning area beyond necessity, a design result is output from the outputting unit 3067, and the positioning system design is finished.

In a case where the positioning-possible area is larger than the required positioning area beyond necessity, in a step 4015, the transmitter characteristic is calculated from the required positioning area set in the step 4001, and the positioning-possible area that is calculated from the area calculated in the step 4011, in which the infrared communication is receivable, and the installation position of the transmitter calculated in the step 4013, and the operation returns to the process of the step 4011 once again.

As explained above, in the first example of the present invention, the design of the positioning system employing the infrared-rays is realized based upon a fluctuation in the noise.

An Example 2

Figure 20:
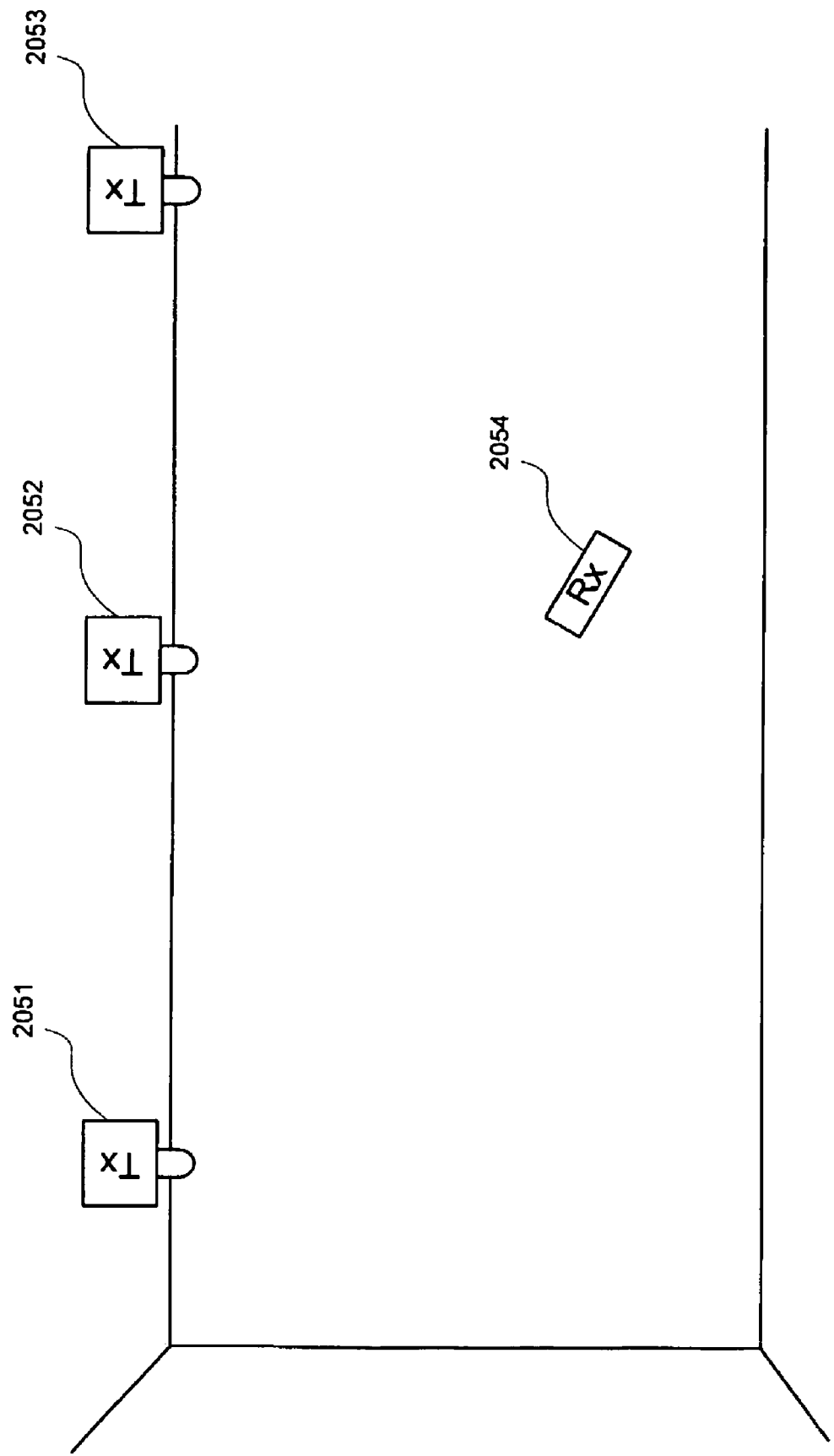
FIG. 20 is a view of the environment into which the positioning system that is envisaged in a second example is introduced.
Figure 21:
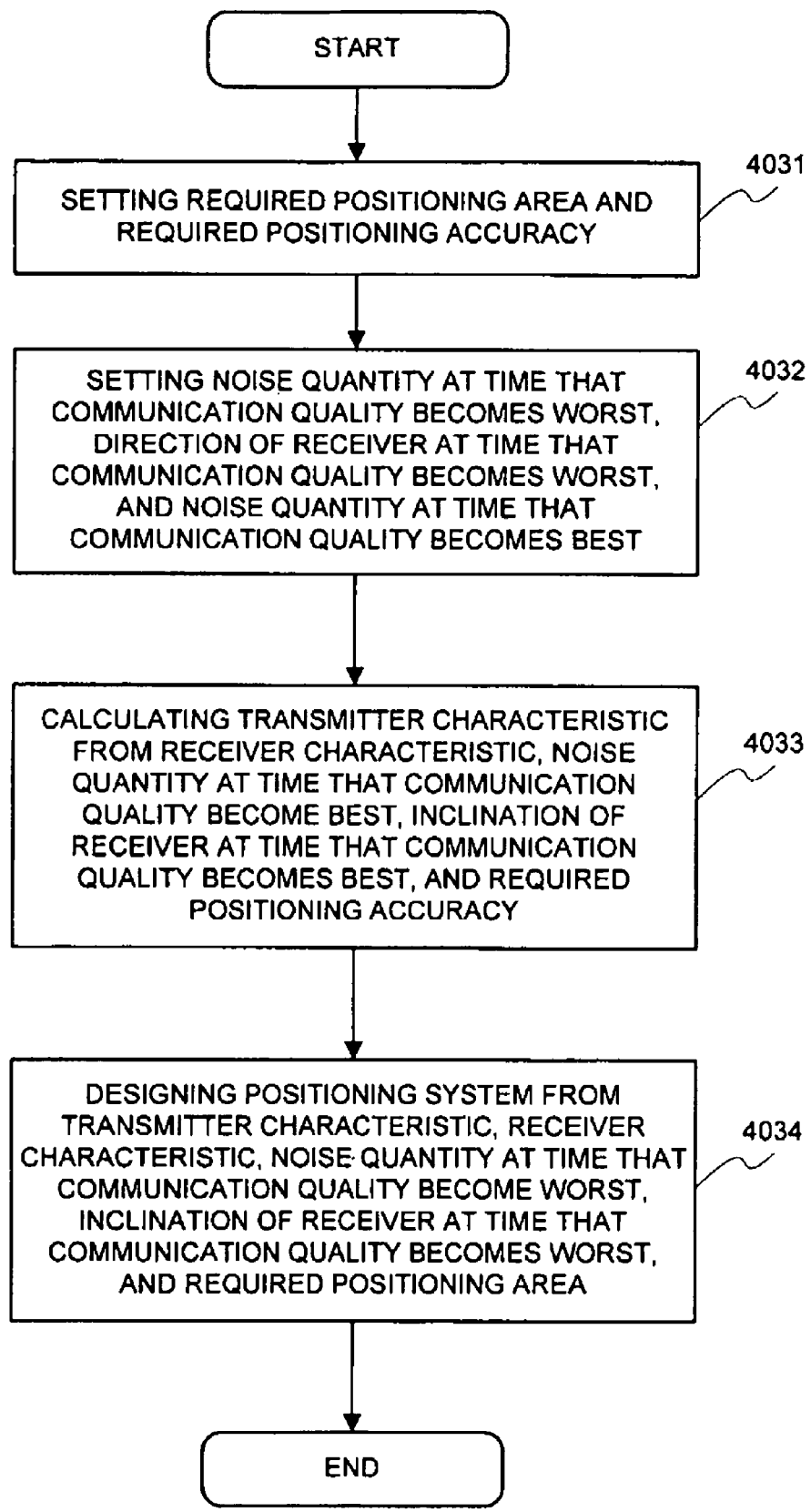
FIG. 21 is a flowchart of the positioning system design in the second example.
Figure 22:
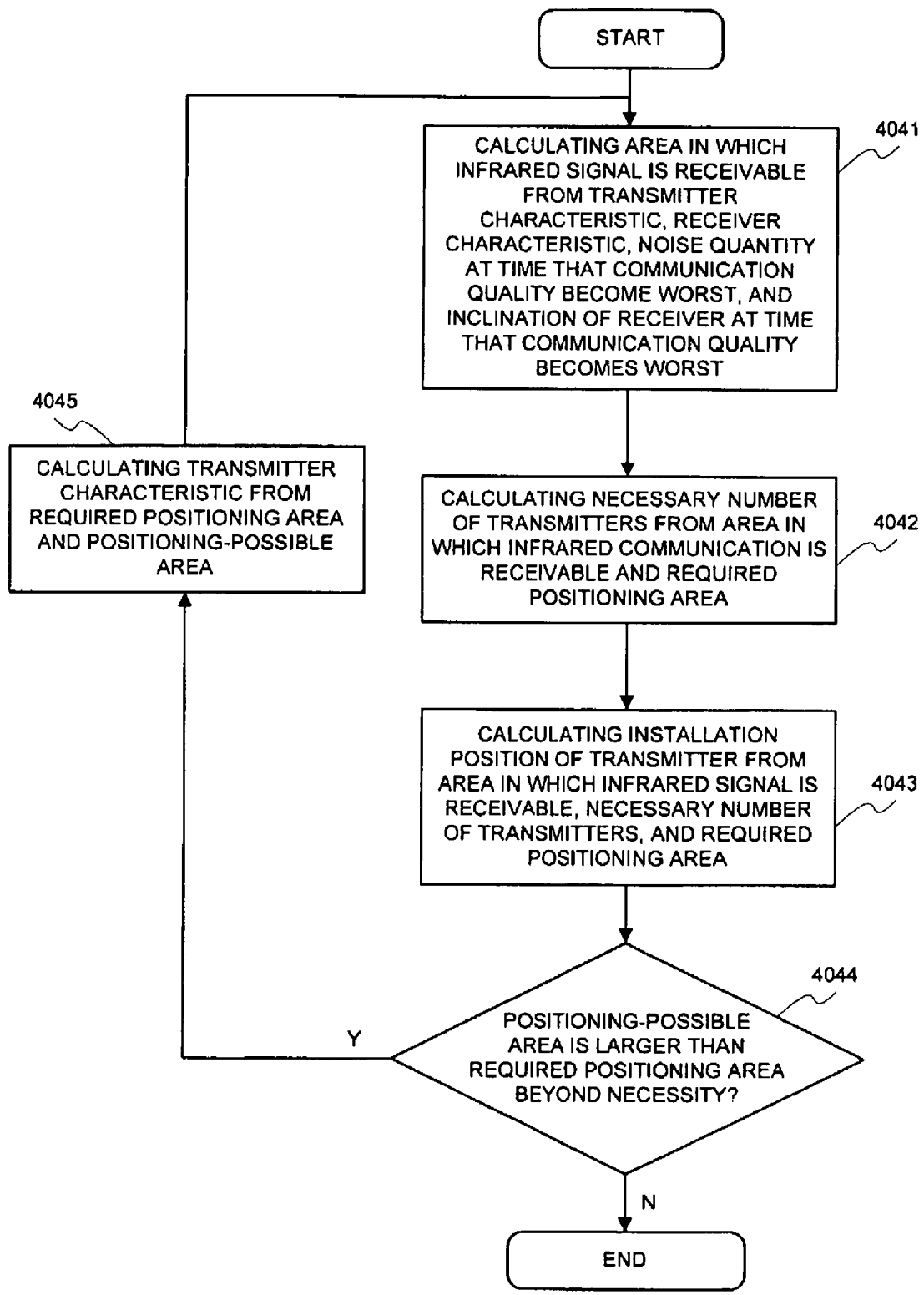
FIG. 22 is a view of a detailed process of the positioning system design in the second example.

In a second example of the present invention, an example will be explained of the positioning system design (decision of the installation position of the originating terminal (transmitter)) in the case that transmitters (originating terminals) 2051 to 2053 only for the positioning that broadcast-transmits the signal for positioning are installed on the ceiling, and a person has a portable PC, a business-purpose terminal, or the like onto which a receiver (receiving terminal) 2054 has been mounted (in the case that the receiver has been not fixed) in the positioning system employing the infrared-rays, as shown in FIG. 20. The second example as well follows the flow of the positioning system design of FIG. 6 similarly to the first example, and the second example, which differs from the first example in the fluctuation factor, includes a direction of the receiver as a fluctuation factor, so it will be explained below. Additionally, a flow of the positioning system design in the second example will be shown in FIG. 21 and FIG. 22.

At first, in a step 4031, the required positioning area and the required positioning accuracy are set.

Next, in a step 4032, the situation of the fluctuation factor at the time that the communication quality is estimated to be worst, and the situation of the fluctuation factor at the time that the communication quality is estimated to be best are set. The fluctuation factor that should be taken into consideration this time is noise and a direction of the receiver. Herein, the fact that the direction of the receiver differs causes a signal reception power to fluctuate because an angle gain of the receiver fluctuates. For this, a noise quantity N_worst at the time that the communication quality is estimated to be worst, and an angle θ_Rx_worst of a shift from the direction of the receiver that is envisaged at the time that the communication quality is estimated to be worst are set as a situation of the fluctuation factor at the time that the communication quality is estimated to be worst, and further, a noise quantity N_best at the time that the communication quality is estimated to be best is set as a situation at the time that the communication quality is estimated to be best. Herein, as an example of the method of setting the noise quantity N_worst at the time that the communication quality is estimated to be worst, the angle θ_Rx_worst of a shift from the direction of the receiver that is envisaged at the time that the communication quality is estimated to be worst, and the noise quantity N_best at the time that the communication quality is estimated to be best, there exists the method of directly inputting them from the inputting unit 3061 of FIG. 5, the method of, in the DB unit 3063, preserving the noise quantity under an environment being envisaged, and an inclination of the receiver in the usage method being envisaged, or the like. Additionally, the information, which is preserved in the DB unit 3063, in the method of, in the DB unit 3063, preserving the noise quantity under an environment being envisaged could be, for example, noise information 4051 for each piece of installation environment information as shown in FIG. 17. Further, the information, which is preserved in the DB unit 3063, in the method of, in the DB unit 3063, preserving an inclination of the receiver in the usage method being envisaged could be, for example, an inclination of the receiver being envisaged in each usage method as shown in FIG. 23. At this time, as an example of the usage method, there exists the method of causing the appliance onto which the receiver is mounted to consciously receive the signal, and positioning it, the method of causing the appliance onto which the receiver is mounted to unconsciously receive the signal, and positioning it, or the like.

And, in a step 4033, the transmitter characteristic is calculated from the receiver performance, the noise quantity N_best at the time that the communication quality is estimated to be best, being a situation of the fluctuation factor at the time that the communication quality is estimated to be best, the angle θ_Rx_best of a shift from the direction of the receiver at the time that the communication quality is estimated to be best, and the required positioning accuracy. Herein, θ_Rx_best is an angle shifted from the direction of the receiver that is envisaged at the time that the reception characteristic in a positional relation between the transmitter and the receiver, which is calculated from the installation height of the transmitter and the required positioning accuracy r, is estimated to be best. However, it is assumed that the absolute value of θ_Rx_best is a value smaller than the absolute value of θ_Rx_worst.

Specifically, the transmitter characteristic such that the SN ratio, which takes into consideration the receiver performance taking θ_Rx_best into consideration, the noise quantity N_best at the time that the communication quality is estimated to be best, and the propagation loss, becomes equal to or less than a desired SN in a positional relation between the transmitter and the receiver that is calculated from the installation height of the transmitter and the required positioning accuracy r is calculated Thereafter, in a step 4034, after a radius of the area in which the infrared signal from one transmitter is receivable is calculated from the transmitter characteristic taking θ_Rx_worst into consideration, the receiver performance taking θ_Rx_worst into consideration, and the noise quantity N_worst at the time that the communication quality is estimated to be worst to calculate the necessary number of the transmitters from the radius of the area in which the infrared signal from one transmitter is receivable, and the required positioning area, the transmitter characteristic and the installation position of the transmitter are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the transmitter characteristic and the installation position of the transmitter.

Specifically, in a step 4041, the area in which the infrared signal is receivable is calculated from the transmitter characteristic taking θ_Rx_worst into consideration, the receiver performance taking θ_Rx_worst into consideration, and the noise quantity N_worst at the time that the communication quality is estimated to be worst.

And, in a step 4042, the necessary number of the transmitters is calculated from the area calculated in the step 4041, in which the infrared communication is receivable, and the required positioning area set in the step 4031.

Thereafter, in a step 4043, the installation position of the transmitter is calculated from the area in which the infrared signal is receivable, the necessary number of the transmitters calculated in the step 4042, and the required positioning area set in the step 4031.

And, in a step 4044, it is determined whether the positioning-possible area, which is calculated from the area calculated in the step 4041, in which the infrared communication is receivable, and the installation position of the transmitter calculated in the step 4043, is larger than the required positioning area set in the step 4031 beyond necessity. In a case where it has not been determined that the positioning-possible area is larger than the required positioning area beyond necessity, the positioning system design is finished.

In a case where the positioning-possible area is larger than the required positioning area beyond necessity, in a step 4045, the transmitter characteristic is calculated from the required positioning area set in the step 4031, and the positioning-possible area that is calculated from the area calculated in the step 4041, in which the infrared communication is receivable, and the installation position of the transmitter calculated in the step 4043, and the operation returns to the process of the step 4041 once again.

As explained above, in the second example of the present invention, the design of the positioning system employing the infrared-rays is realized based upon a fluctuation in the noise and a fluctuation in the receiver angle.

An Example 3

Figure 24:
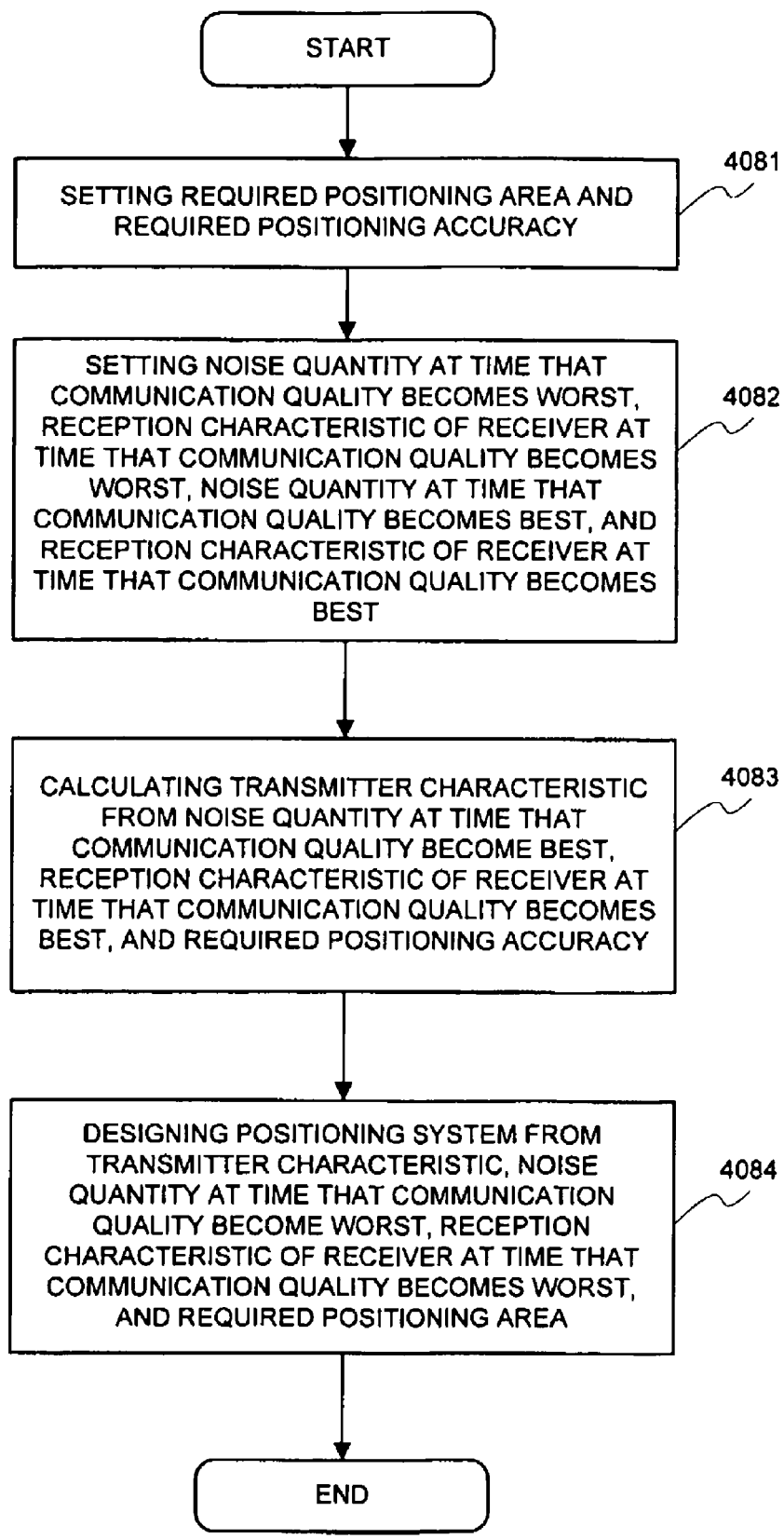
FIG. 24 is a flowchart of the positioning system design in the third example.
Figure 25:
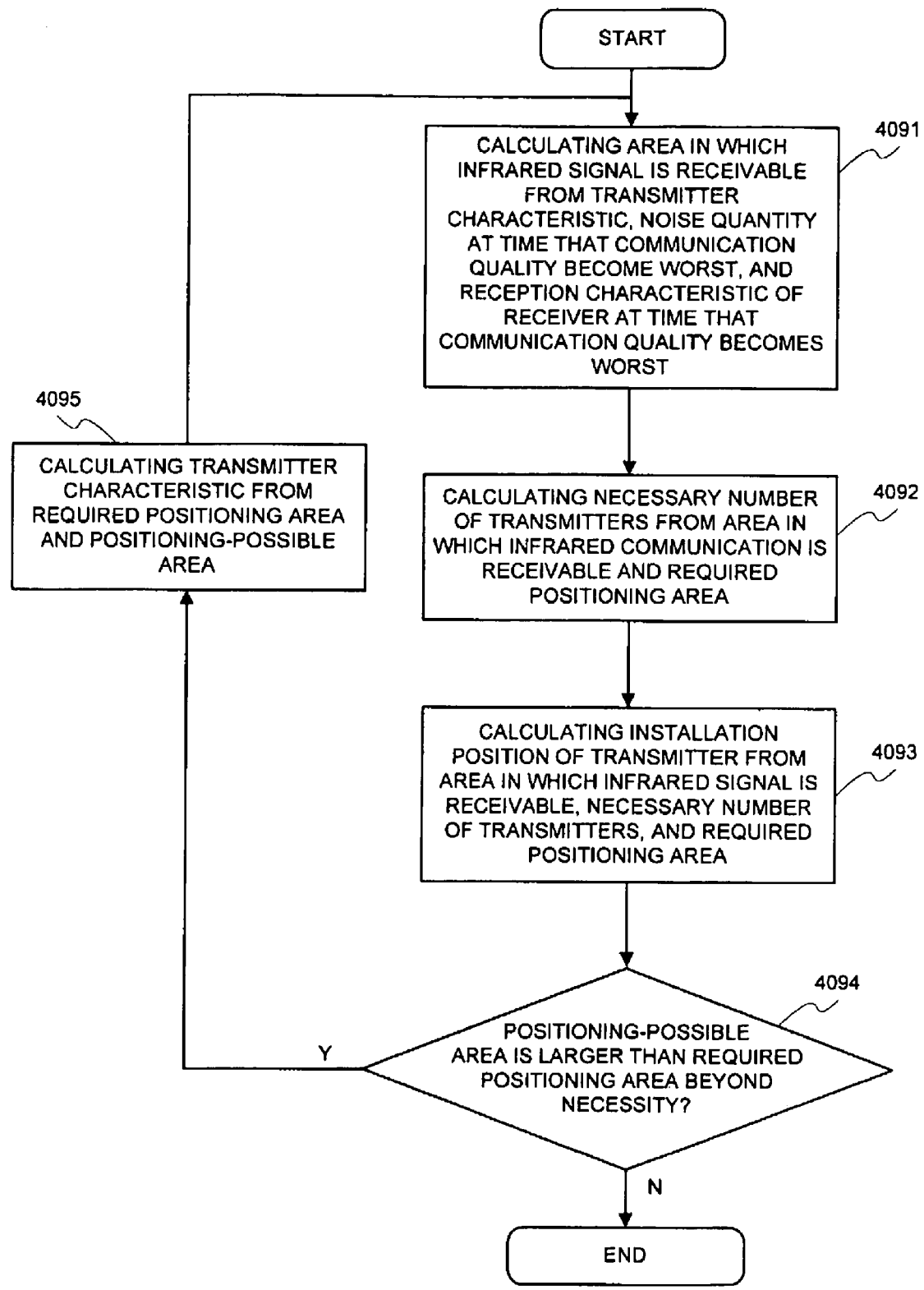
FIG. 25 is a view of a detailed process of the positioning system design in the third example.

In a third example of the present invention, an example will be explained of the positioning system design (decision of the installation position of the originating terminal (transmitter)) in the case of installing transmitters (originating terminals) 2001 to 2003 only for the positioning that broadcast-transmits the signal for positioning on the ceiling, and fixedly mounting a different receiver (receiving terminal) 2005 cart by cart on the upper side etc. of a cart 2004 in the positioning system employing the infrared-rays, as shown in FIG. 14. The third example, which differs from the first example in the fluctuation factor, includes a kind of the receiver as a fluctuation factor, so it will be explained below. Additionally, the method of designing the positioning system follows the functional block of FIG. 5, and flows of FIG. 24 and FIG. 25, being a modification to FIG. 6 and FIG. 8, respectively.

At first, in a step 4081, the required positioning area and the required positioning accuracy are set.

Next, in a step 4082, the situation of the fluctuation factor at the time that the communication quality is estimated to be worst, and the situation of the fluctuation factor at the time that the communication quality is estimated to be best are set. The fluctuation factor that should be taken into consideration this time is noise and a kind of the receiver. Herein, the fact that the kind of the receiver differs mainly causes a signal reception power to fluctuate because the angle gain of the receiver, the receiver sensitivity, or the like fluctuates. For this, a noise quantity N_worst at the time that the communication quality is estimated to be worst, and a reception characteristic Rx_worst of the receiver at the time that the communication quality is estimated to be worst are set as a situation of the fluctuation factor at the time that the communication quality is estimated to be worst, and further, a noise quantity N_best at the time that the communication quality is estimated to be best, and a reception characteristic Rx_best of the receiver at the time that the communication quality is estimated to be best are set as a situation of the fluctuation factor at the time that the communication quality is estimated to be best. Herein, as an example of the method of setting the noise quantity N_worst at the time that the communication quality is estimated to be worst, the reception characteristic Rx_worst at the time that the communication quality is estimated to be worst, the noise quantity N_best at the time that the communication quality is estimated to be best, and the reception characteristic Rx_best at the time that the communication quality is estimated to be best, there exists the method of directly inputting them from the inputting unit 3061 of FIG. 5, the method of, in the DB unit 3063, preserving the noise quantity under an environment being envisaged, or the like.

Figure 26:
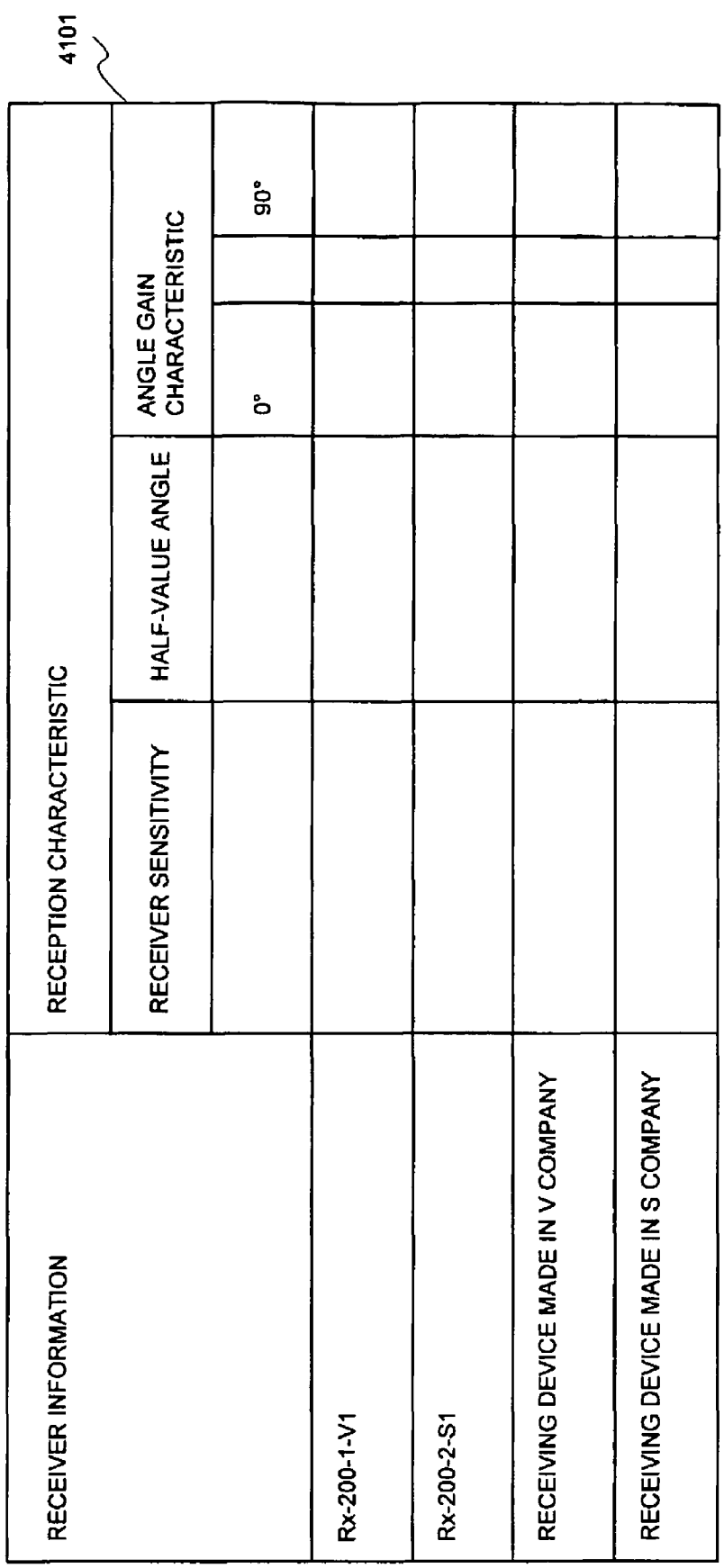
FIG. 26 is a view of an example of a reception characteristic for each piece of receiver information that is preserved in the DB unit.

Additionally, the information, which is preserved in the DB unit 3063, in the method of, in the DB unit 3063, preserving the noise quantity under an environment being envisaged could be, for example, noise information 4051 for each piece of installation environment information as shown in FIG. 17, or reception characteristic information 4101 for each piece of receiver kind information as shown in FIG. 26. At this time, as an example of each piece of receiver kind information, there exists information of a manufacturer, a model, and a product name of the receiver, or the like. Further, as an example of the reception characteristic information, there exists information of a receiver sensitivity, a half-value angle, an angle gain characteristic, etc. for each piece of receiver kind information.

And, in a step 4083, the transmitter characteristic is calculated from the receiver performance Rx_best, N_best, being a situation of the fluctuation factor at the time that the communication quality is estimated to be best, and the required positioning accuracy.

Thereafter, in a step 4084, after a radius of the area in which the infrared signal from one transmitter is receivable is calculated from the transmitter characteristic, the receiver performance Rx_worst, and the noise quantity N_worst at the time that the communication quality is estimated to be worst to calculate the necessary number of the transmitters from the radius of the area in which the infrared signal from one transmitter is receivable and the required positioning area, the transmitter characteristic and the installation position of the transmitter are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the transmitter characteristic and the installation position of the transmitter.

Specifically, in the step 4091, the area in which the infrared signal is receivable is calculated from the transmitter characteristic, the receiver performance Rx_worst, and the noise quantity N_worst at the time that the communication quality is estimated to be worst.

And, in a step 4092, the necessary number of the transmitters is calculated from the area calculated in the step 4091, in which the infrared communication is receivable, and the required positioning area set in the step 4081.

Thereafter, in a step 4093, the installation position of the transmitter is calculated from the area in which the infrared signal is receivable, the necessary number of the transmitters calculated in the step 4092, and the required positioning area set in the step 4081.

And, in a step 4094, it is determined whether the positioning-possible area, which is calculated from the area calculated in the step 4091, in which the infrared communication is receivable, and the installation position of the transmitter calculated in the step 4093, is larger than the required positioning area set in the step 4081 beyond necessity. In a case where it has not been determined that the positioning-possible area is larger than the required positioning area beyond necessity, the positioning system design is finished.

In a case where the positioning-possible area is larger than the required positioning area beyond necessity, in a step 4095, the transmitter characteristic is calculated from the required positioning area set in the step 4081, and the positioning-possible area that is calculated from the area calculated in the step 4091, in which the infrared communication is receivable, and the installation position of the transmitter calculated in the step 4093, and the operation returns to the process of the step 4091 once again.

As explained above, in the third example of the present invention, the design of the positioning system employing the infrared-rays is realized based upon a fluctuation in the noise and the kind of the receiver.

An Example 4

Figure 27:
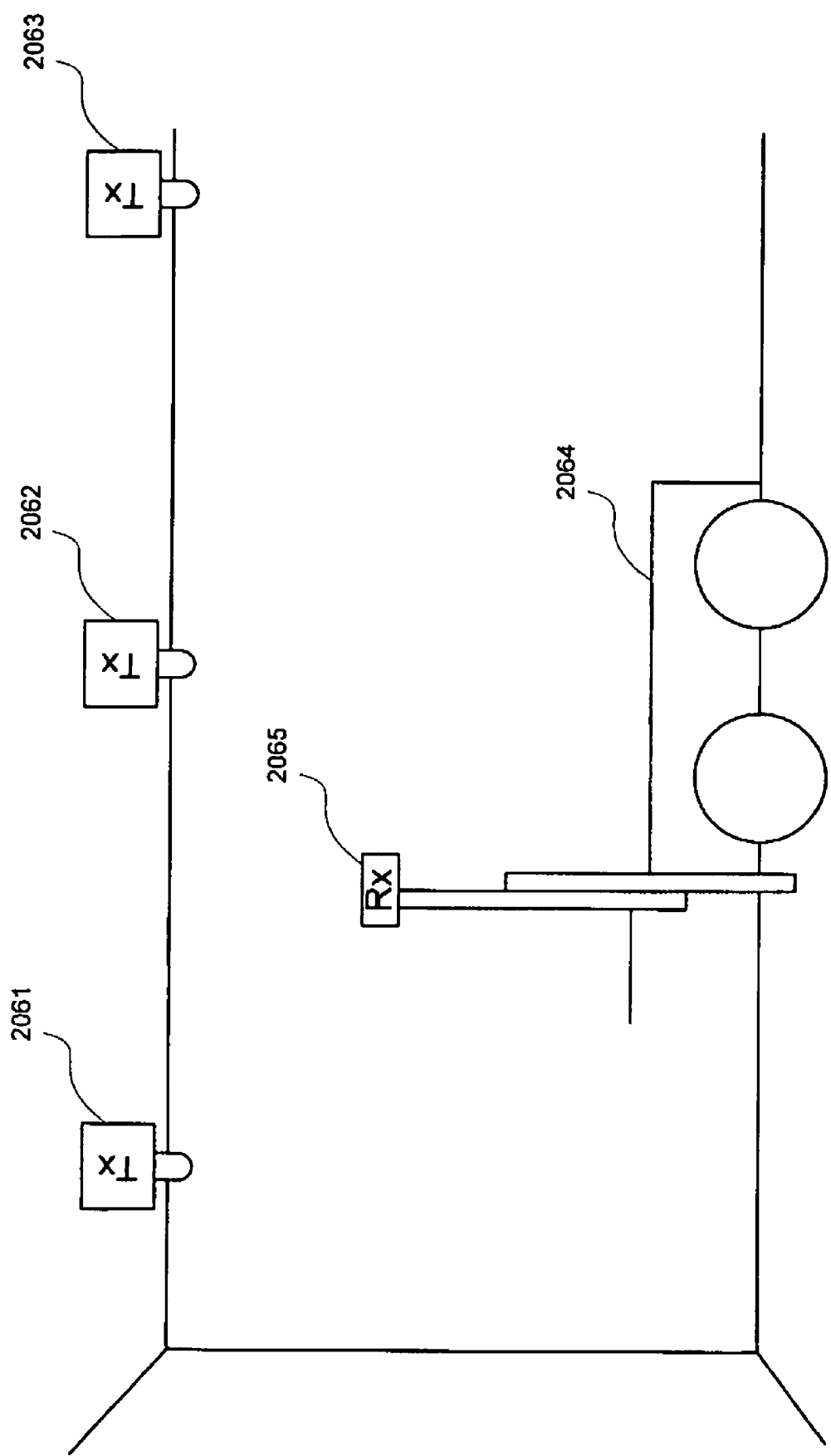
FIG. 27 is a view of the environment into which the positioning system that is envisaged in a fourth example is introduced.
Figure 28:
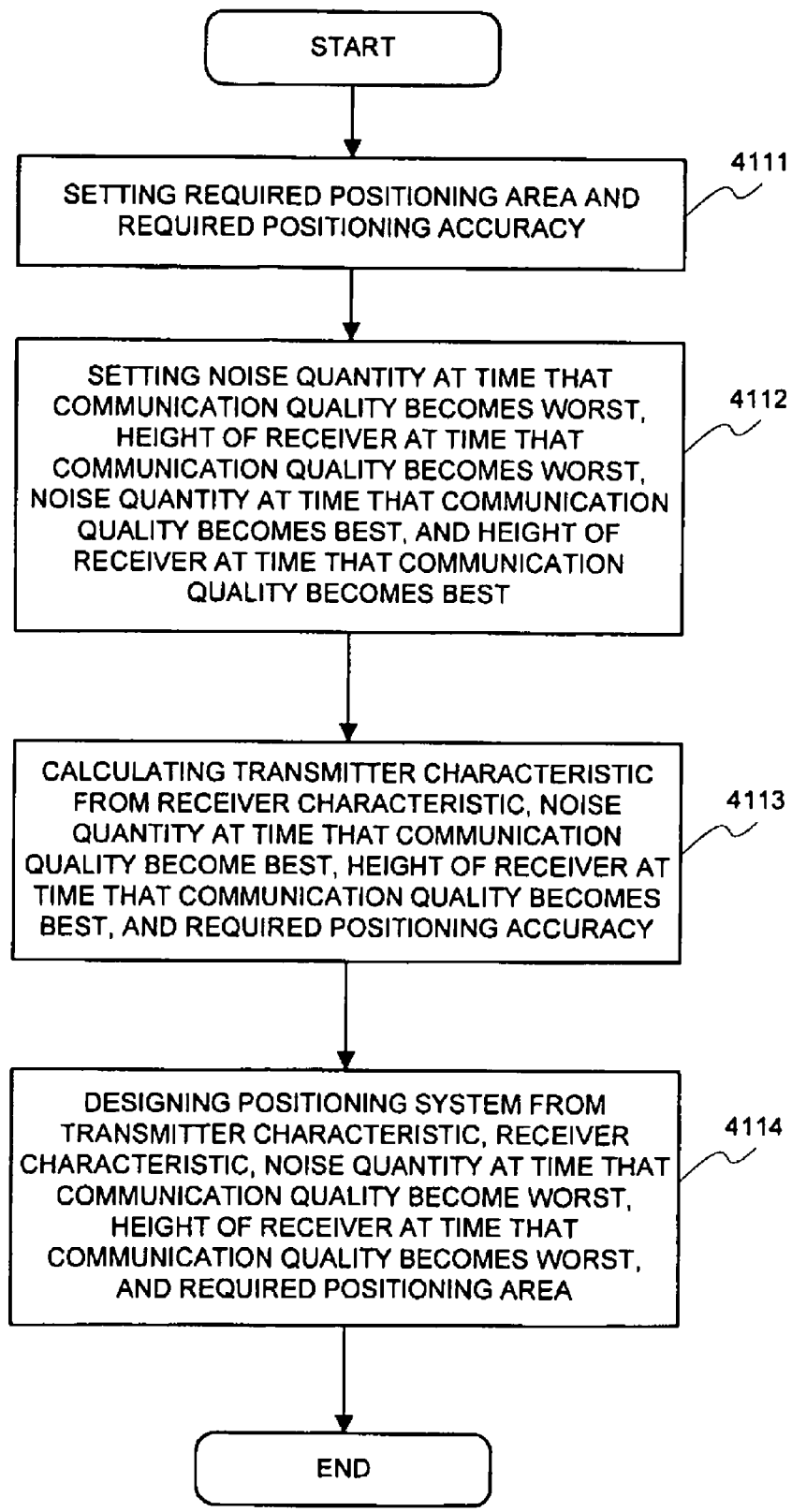
FIG. 28 is a flowchart of the positioning system design in the fourth example.
Figure 29:
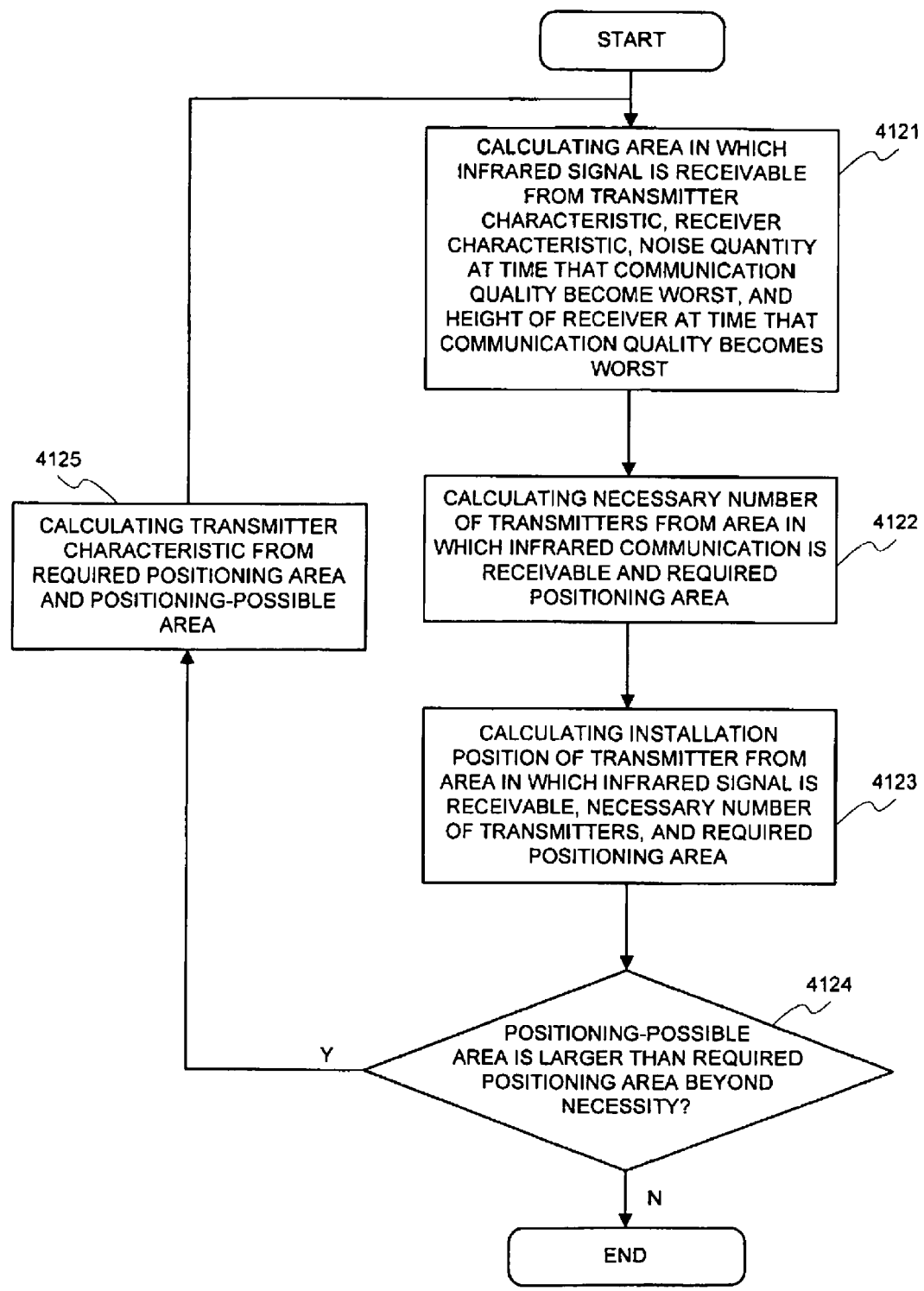
FIG. 29 is a view of a detailed process of the positioning system design in the fourth example.

In a fourth example of the present invention, an example will be explained of the positioning system design (decision of the installation position of the originating terminal (transmitter)) in the case of installing transmitters (originating terminals) 2061 to 2063 only for the positioning that broadcast-transmits the signal for positioning on the ceiling, and fixedly mounting a receiver (receiving terminal) 2065 at a position that fluctuates in a height, for example, on the upper side of a forklift 2064 in the positioning system employing the infrared-rays, as shown in FIG. 27. The fourth example, which differs from the first example in the fluctuation factor, includes a height of the receiver as a fluctuation factor, so it will be explained below. Additionally, a flow of the positioning system design in the fourth example is shown in FIG. 28 and FIG. 29.

At first, in a step 4111, the required positioning area and the required positioning accuracy are set.

Next, in a step 4112, the situation of the fluctuation factor at the time that the communication quality is estimated to be worst, and the situation of the fluctuation factor at the time that the communication quality is estimated to be best are set. The fluctuation factor that should be taken into consideration this time is noise and a height of the receiver. Herein, the fact that the height of the receiver differs causes a signal reception power etc. to fluctuate due to a propagation loss or a fluctuation in a signal transmission/reception angle. For this, a noise quantity N_worst at the time that the communication quality is estimated to be worst, and a height h_worst of the receiver at the time that the communication quality is estimated to be worst are set as a situation of the fluctuation factor at the time that the communication quality is estimated to be worst, and further, a noise quantity N_best at the time that the communication quality is estimated to be best, and height h_best of the receiver at the time that the communication quality is estimated to be best are set as a situation of the fluctuation factor at the time that the communication quality is estimated to be best. Herein, as an example of the method of setting the noise quantity N_worst at the time that the communication quality is estimated to be worst, the height h_worst of the receiver at the time that the communication quality is estimated to be worst, the noise quantity N_best at the time that the communication quality is estimated to be best, and the height h_best of the receiver at the time that the communication quality is estimated to be best, there exists the method of directly inputting them from the inputting unit 3061 of FIG. 5, the method of, in the DB unit 3063, preserving the noise quantity under an environment being envisaged, and a height of the receiver in the usage method being envisaged, or the like. Additionally, the information, which is preserved in the DB unit 3063, in the method of, in the DB unit 3063, preserving the noise quantity under an environment being envisaged could be, for example, noise information 4051 for each piece of installation environment information as shown in FIG. 17. Further, the information, which is preserved in the DB unit 3063, in the method of, in the DB unit 3063, preserving the height of the receiver in the usage method being envisaged could be, for example, a height of the receiver being envisaged in each usage method as shown in FIG. 30. At this time, as an example of the usage method, there exists the kind of the appliance onto which the receiver is mounted, for example, a note PC, a handy terminal, a cart, and a forklift.

And, in a step 4113, the transmitter characteristic is calculated from the receiver performance taking h_best into consideration, the noise quantity N_best and the height h_best of the receiver at the time that the communication quality is estimated to be best, and the required positioning accuracy.

Thereafter, in a step 4114, after a radius of the area in which the infrared signal from one transmitter is receivable is calculated from the transmitter characteristic taking h_worst into consideration, the receiver performance taking h_worst into consideration, the noise quantity N_worst at the time that the communication quality is estimated to be worst, and the height h_worst of the receiver at the time that the communication quality is estimated to be worst to calculate the necessary number of the transmitters from the radius of the area in which the infrared signal from one transmitter is receivable, and the required positioning area, the transmitter characteristic and the installation position of the transmitter are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the transmitter characteristic and the installation position of the transmitter.

Specifically, in a step 4121, the area in which the infrared signal is receivable is calculated from the transmitter characteristic taking h_worst into consideration, the receiver performance taking h_worst into consideration, the noise quantity N_worst at the time that the communication quality becomes worst, and the height h_worst of the receiver at the time that the communication quality is estimated to be worst.

And, in a step 4122, the necessary number of the transmitters is calculated from the area calculated in the step 4121, in which the infrared communication is receivable, and the required positioning area set in the step 4111.

Thereafter, in a step 4123, the installation position of the transmitter is calculated from the area in which the infrared signal is receivable, the necessary number of the transmitters calculated in the step 4122, and the required positioning area set in the step 4111.

And, in a step 4124, it is determined whether the positioning-possible area, which is calculated from the area calculated in the step 4121, in which the infrared communication is receivable, and the installation position of the transmitter calculated in the step 4123, is larger than the required positioning area set in the step 4111 beyond necessity. In a case where it has not been determined that the positioning-possible area is larger than the required positioning area beyond necessity, the positioning system design is finished.

In a case where the positioning-possible area is larger than the required positioning area beyond necessity, in a step 4125, the transmitter characteristic is calculated from the required positioning area set in the step 4111, and the positioning-possible area that is calculated from the area calculated in the step 4121, in which the infrared communication is receivable, and the installation position of the transmitter calculated in the step 4123, and the operation returns to the process of the step 4121 once again.

As explained above, in the fourth example of the present invention, the design of the positioning system employing the infrared-rays is realized based upon a fluctuation in the noise and the height of the receiver.

An Example 5

Figure 31:
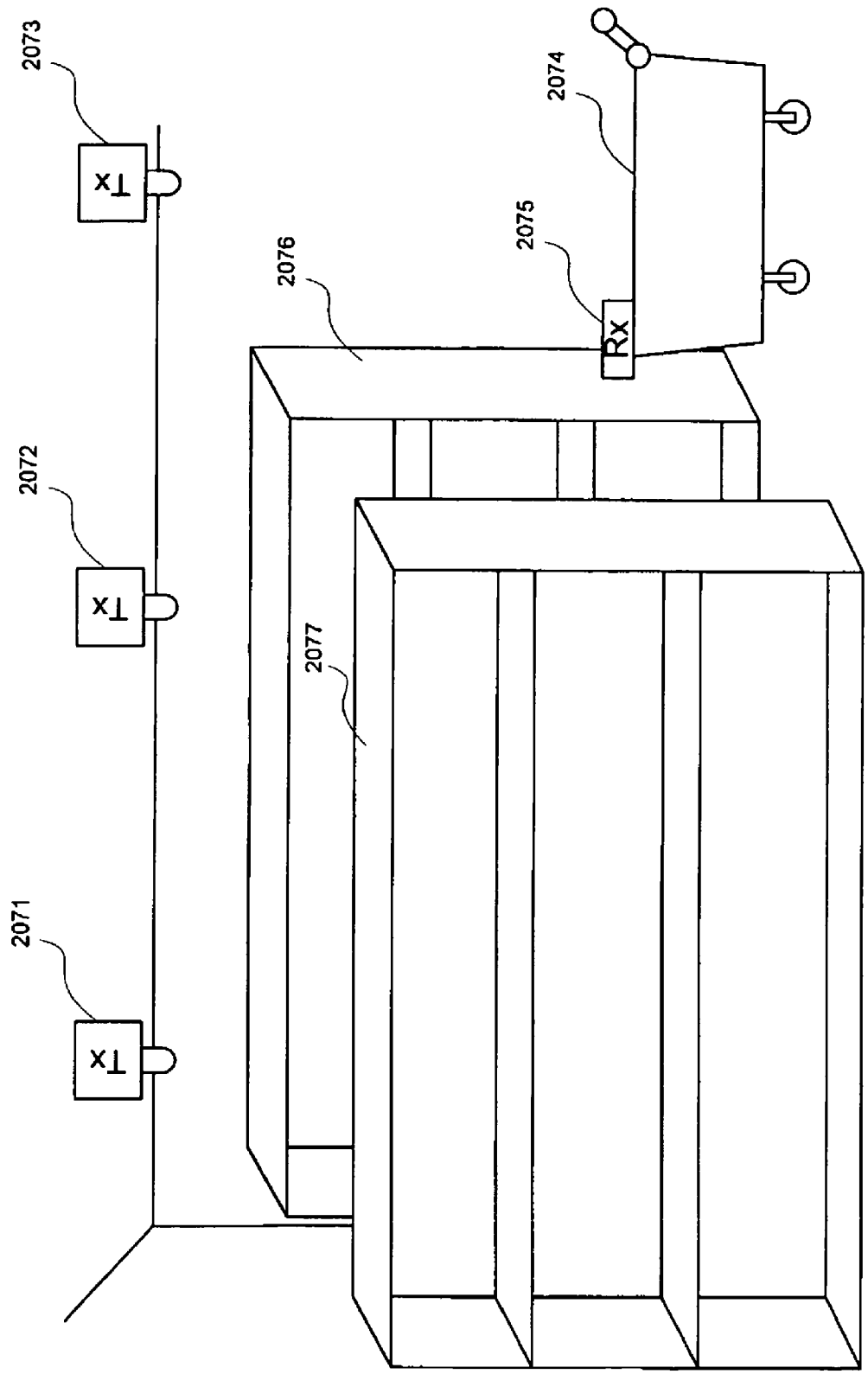
FIG. 31 is a view of the environment into which the positioning system that is envisaged in a fifth example is introduced.
Figure 32:
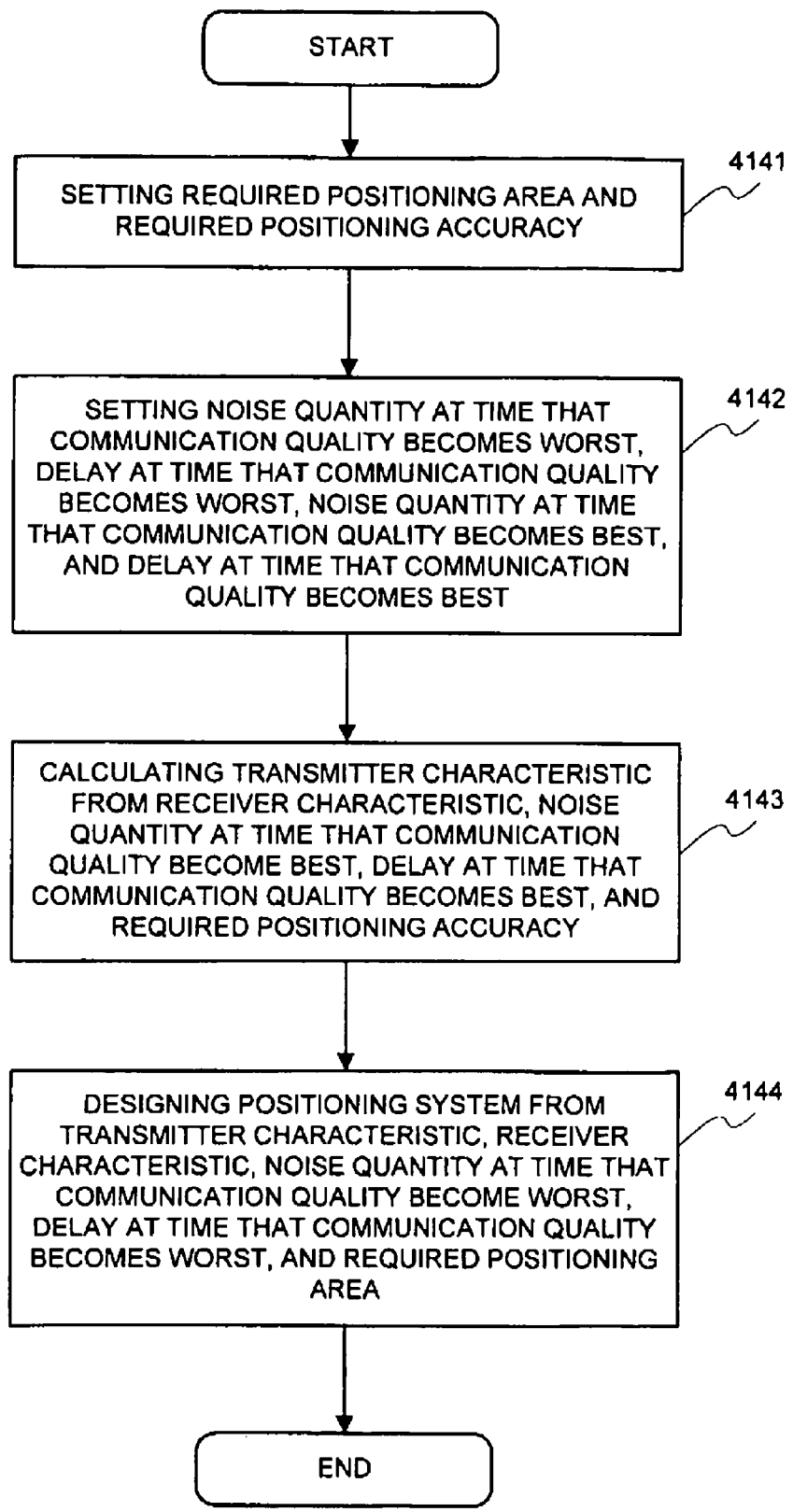
FIG. 32 is a flowchart of the positioning system design in the fifth example.
Figure 33:
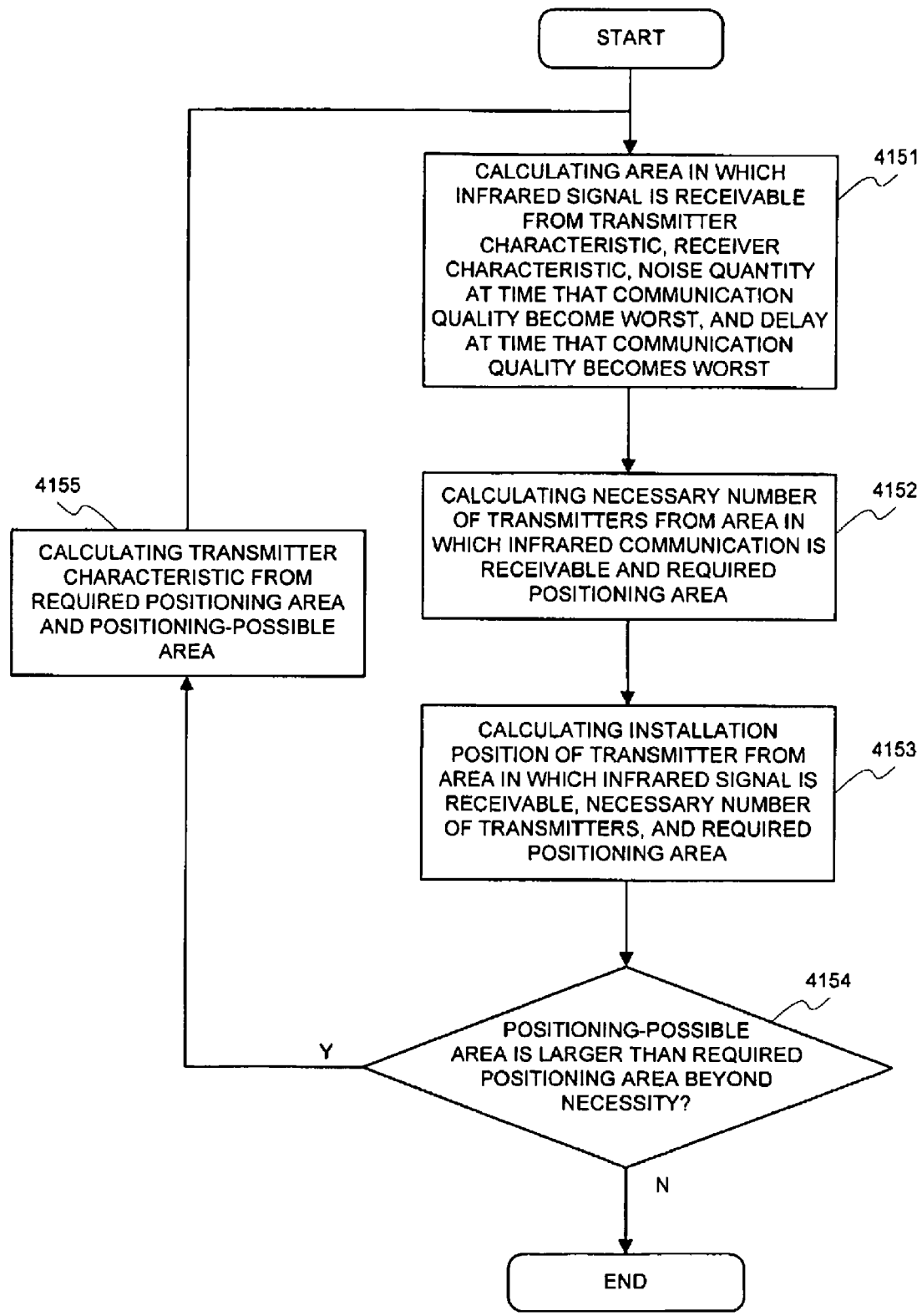
FIG. 33 is a view of a detailed process of the positioning system design in the fifth example.

In a fifth example of the present invention, an example will be explained of the positioning system design (decision of the installation position of the originating terminal (transmitter)) in the case of installing transmitters (originating terminals) 2071 to 2073 on the ceiling, and fixedly mounting a receiver (receiving terminal) 2075 on the upper side etc. of a cart 2074, which is placed in the floor having many structures (2076 and 2077) such as shelves, in the positioning system employing the infrared-rays, as shown in FIG. 31. The fifth example, which differs from the first example in the fluctuation factor, includes a delay time as a fluctuation factor, so it will be explained below. Additionally, a flow of the positioning system design in the fifth example is shown in FIG. 32 and FIG. 33.

At first, in a step 4141, the required positioning area and the required positioning accuracy are set.

Next, in a step 4142, the situation of the fluctuation factor at the time that the communication quality is estimated to be worst, and the situation of the fluctuation factor at the time that the communication quality is estimated to be best are set. The fluctuation factor that should be taken into consideration this time is noise and a delay. Herein, the fact that the delay differs causes a desired SNR to fluctuate because a transmission waveform is distorted and an inter-code interference occurs. For this, a noise quantity N_worst at the time that the communication quality is estimated to be worst, and a worst desired SNR value SNR_worst in a time of a delay that occurs at the time that the communication quality is estimated to be worst are set as a situation of the fluctuation factor at the time that the communication quality is estimated to be worst, and further, a noise quantity N_best at the time that the communication quality is estimated to be best, and a best desired SNR value SNR_best in a time of a delay that occurs at the time that the communication quality is estimated to be best are set as a situation of the fluctuation factor at the time that the communication quality is estimated to be best. Herein, as an example of the method of setting the noise quantity N_worst at the time that the communication quality is estimated to be worst, the worst desired SNR value SNR_worst in a time of a delay that occurs at the time that the communication quality is estimated to be worst, the noise quantity N_best at the time that the communication quality is estimated to be best, and the best desired SNR value SNR_best in a time of a delay that occurs at the time that the communication quality is estimated to be best, there exists the method of directly inputting them from the inputting unit 3061 of FIG. 5, the method of, in the DB unit 3063, preserving the noise quantity under an environment being envisaged, and an inclination of the receiver in the usage method being envisaged, or the like. Additionally, the information, which is preserved in the DB unit 3063, in the method of, in the DB unit 3063, preserving the noise quantity under an environment being envisaged could be, for example, noise information 4051 that corresponds to each piece of installation environment information as shown in FIG. 17. Further, the information, which is preserved in the DB unit 3063, in the method of, in the DB unit 3063, preserving the inclination of the receiver in the usage method being envisaged could be, for example, a delay quantity for each pieces of installation environment information as shown in FIG. 34.

And, in a step 4143, the transmitter characteristic is calculated from the receiver performance, the noise quantity N_best at the time that the communication quality is estimated to be best, the required positioning accuracy, and the best desired SNR value SNR_best in a quantity of a delay that occurs at the time that the communication quality is estimated to be best.

Thereafter, in a step 4144, after a radius of the area in which the infrared signal from one transmitter is receivable is calculated from the transmitter characteristic, the receiver performance, the noise quantity N_worst at the time that the communication quality is estimated to be worst, and the worst desired SNR value SNR_worst to calculate the necessary number of the transmitters from the radius of the area in which the infrared signal from one transmitter is receivable, and the required positioning area, the transmitter characteristic and the installation position of the transmitter are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the transmitter characteristic and the installation position of the transmitter.

Specifically, in a step 4151, the area in which the infrared signal is receivable is calculated from the transmitter characteristic, the receiver performance, the noise quantity N_worst at the time that the communication quality becomes worst, and the worst desired SNR value SNR_worst.

And, in a step 4152, the necessary number of the transmitters is calculated from the area calculated in the step 4151, in which the infrared communication is receivable, and the required positioning area set in the step 4141.

Thereafter, in a step 4153, the installation position of the transmitter is calculated from the area in which the infrared signal is receivable, the necessary number of the transmitters calculated in the step 4152, and the required positioning area set in the step 4141.

And, in a step 4154, it is determined whether the positioning-possible area, which is calculated from the area calculated in the step 4151, in which the infrared communication is receivable, and the installation position of the transmitter calculated in the step 4153, is larger than the required positioning area set in the step 4141 beyond necessity. In a case where it has not been determined that the positioning-possible area is larger than the required positioning area beyond necessity, the positioning system design is finished.

In a case where the positioning-possible area is larger than the required positioning area beyond necessity, in a step 4155, the transmitter characteristic is calculated from the required positioning area set in the step 4141, and the positioning-possible area that is calculated from the area calculated in the step 4151, in which the infrared communication is receivable, and the installation position of the transmitter calculated in the step 4153, and the operation returns to the process of the step 4151 once again.

As explained above, in the fifth example of the present invention, the design of the positioning system employing the infrared-rays is realized based upon a fluctuation in the noise and the delay time.

Further, the design of the positioning system employing the infrared-rays may be made by combining the fluctuation factors that were employed in two examples out of the second example, the third example, the fourth example, and fifth example.

Further, the design of the positioning system employing the infrared-rays may be made by combining the fluctuation factors that were employed in three examples out of the second example, the third example, the fourth example, and fifth example.

Further, the design of the positioning system employing the infrared-rays may be made by combining the fluctuation factors that were employed in the second example, the third example, the fourth example, and fifth example.

Further, in the above-mentioned first to fifth examples, the design of the positioning system employing the infrared-rays was explained, and the design of the positioning system employing the radio is also acceptable. Herein, with the radio, for example, RFID, Bluetooth, WLAN, cellular, and GPS tag may be employed. Further, with the WLAN, for example, IEEE802.11a, IEEE802.11b, and IEEE802.11g may be employed. Further, with the cellular, for example, W-CDMA, PHS, and PDC may be employed. Further, the so-called GPS tag is a tag for allowing a signal group to originate that has a signal, a signal number, a signal reception timing, etc. identical to that of the signal group that can be received at an indoor position (latitude and longitude) from a GPS satellite under an ideal environment in which no shield exists. This GPS tag is installed in the indoor, and is employed for a purpose of making a GPS positioning at a high precision by employing a signal group from the GPS tag.

Further, in the above-mentioned first to fifth examples, the situation in which the transmitter was installed on the ceiling was explained, and the situation in which the transmitter is hung on the wall is also acceptable. Further, in the above-mentioned first to fifth examples, the situation in which the transmitter was installed only for a purpose of the positioning was explained, and the transmitter may be utilized for the application other than the positioning. As a specific example, the transmitter may be utilized not only for the positioning but also for the communication by constructing the positioning system employing a beacon notifying existence of a base station to a terminal like the case of a wireless LAN.

An Example 6

Figure 15:
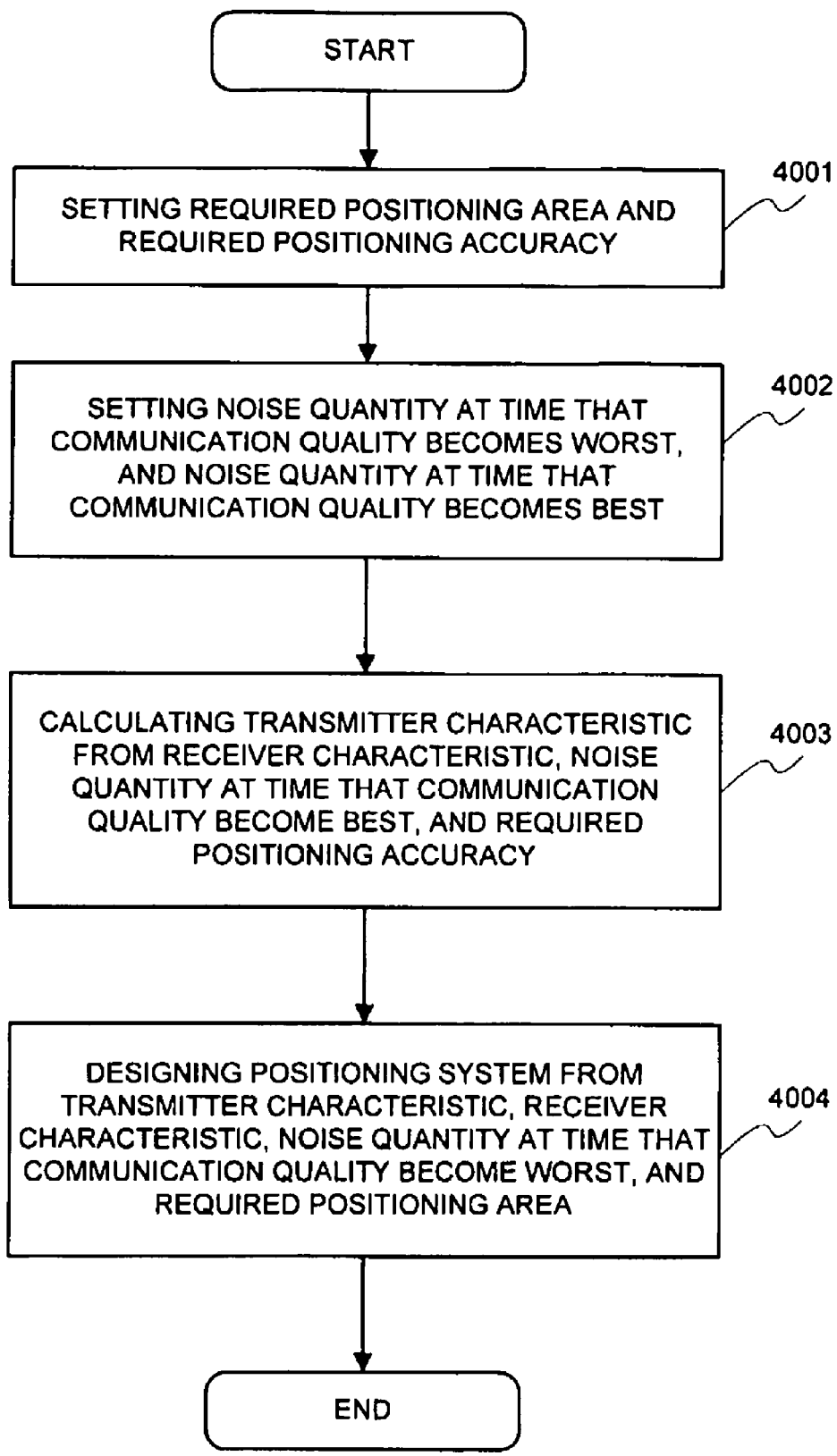
FIG. 15 is a flowchart of the positioning system design in the first example and the sixth example.
Figure 16:
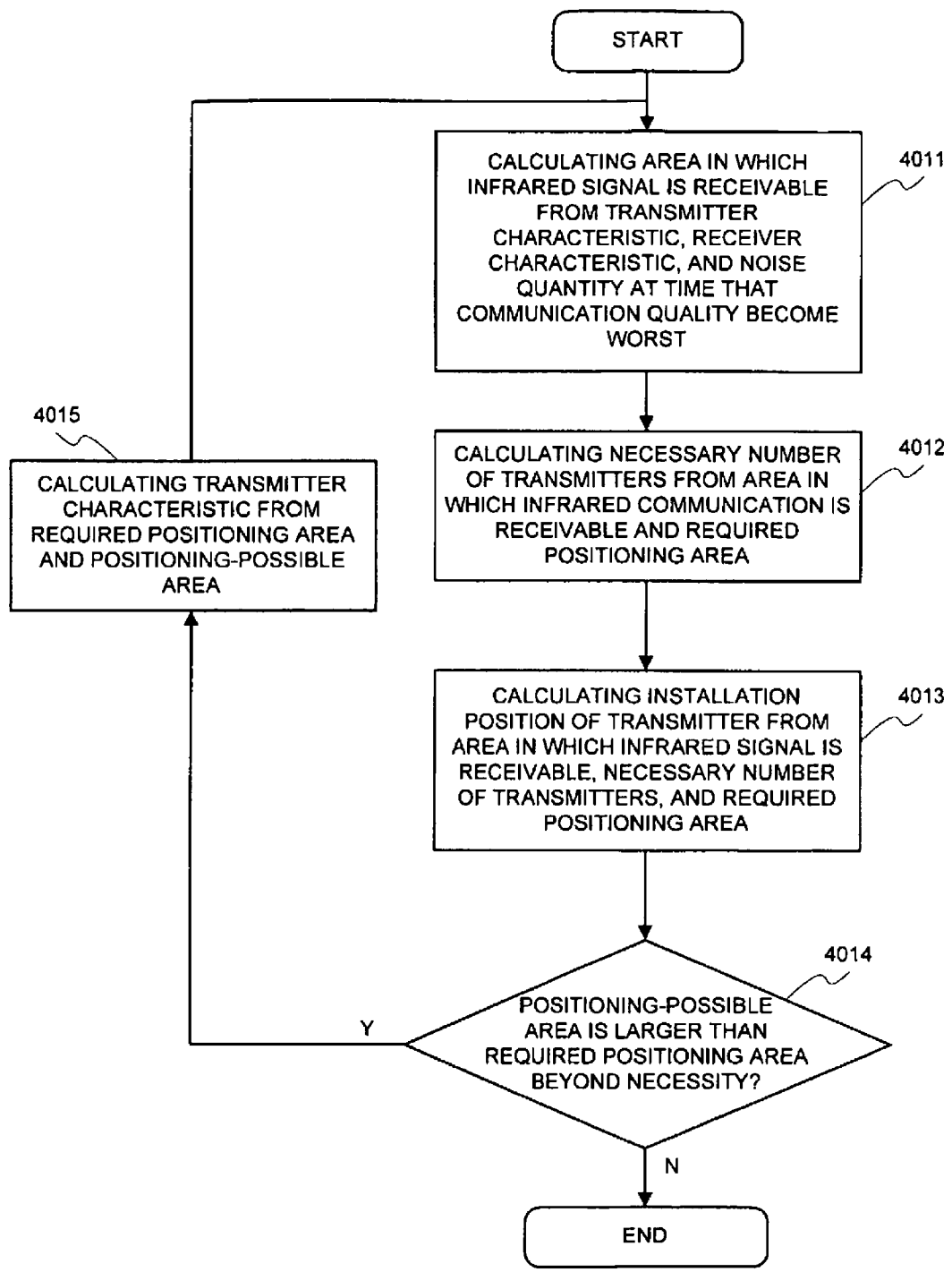
FIG. 16 is a view of a detailed process of the positioning system design in the first example.
Figure 35:
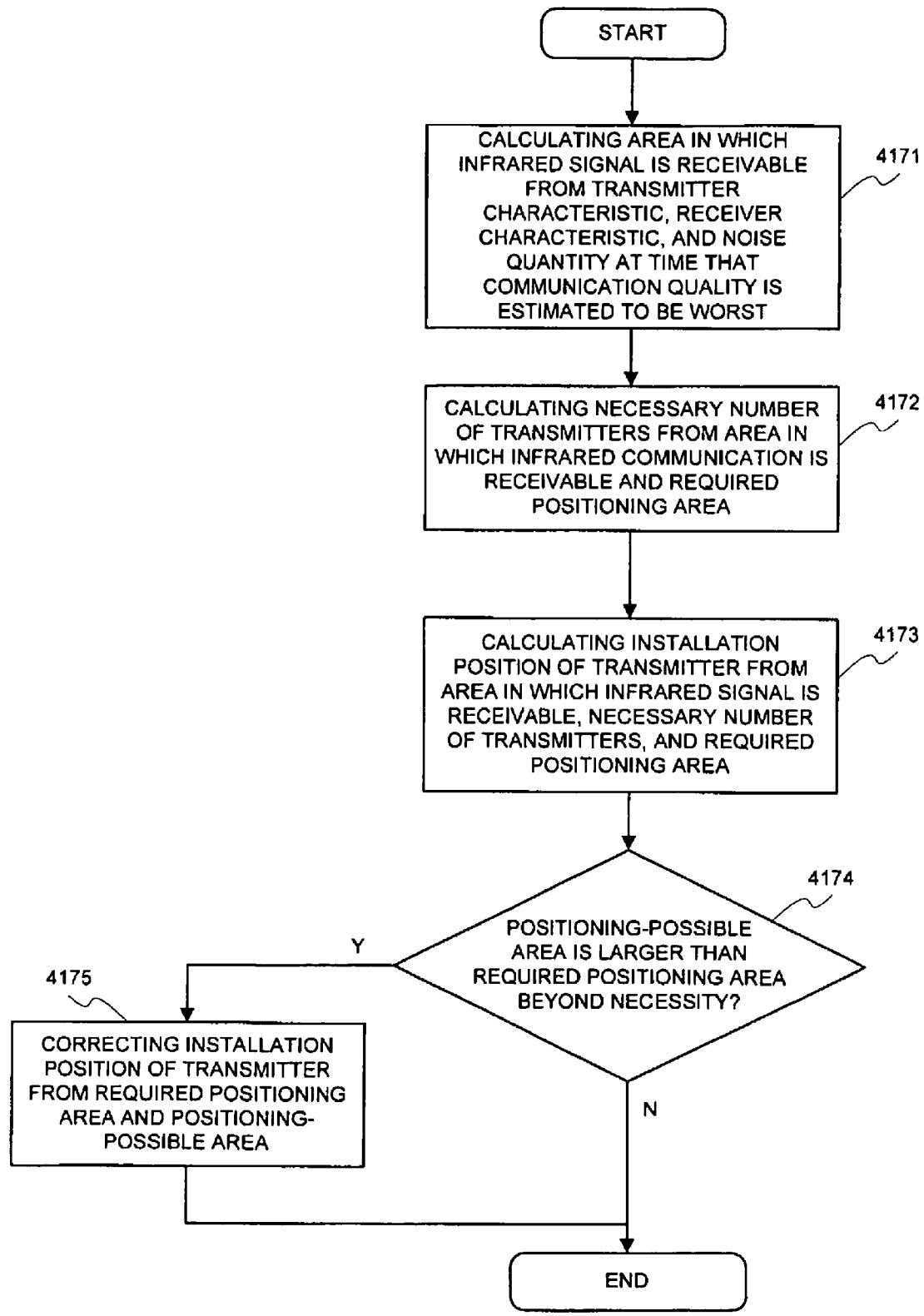
FIG. 35 is a view of a detailed process of the positioning system design in the sixth example.
Figure 36:
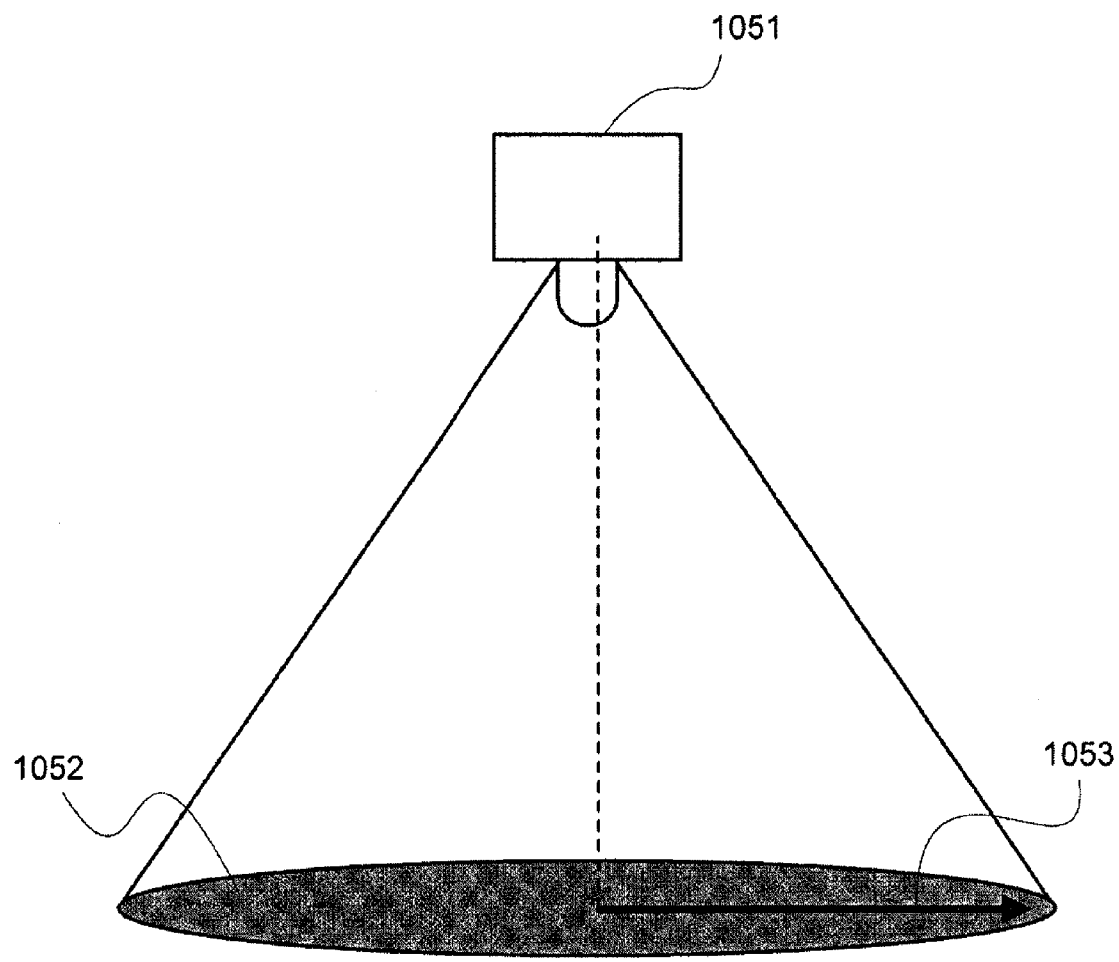
FIG. 36 is a view for explaining the positioning accuracy.
Figure 37:
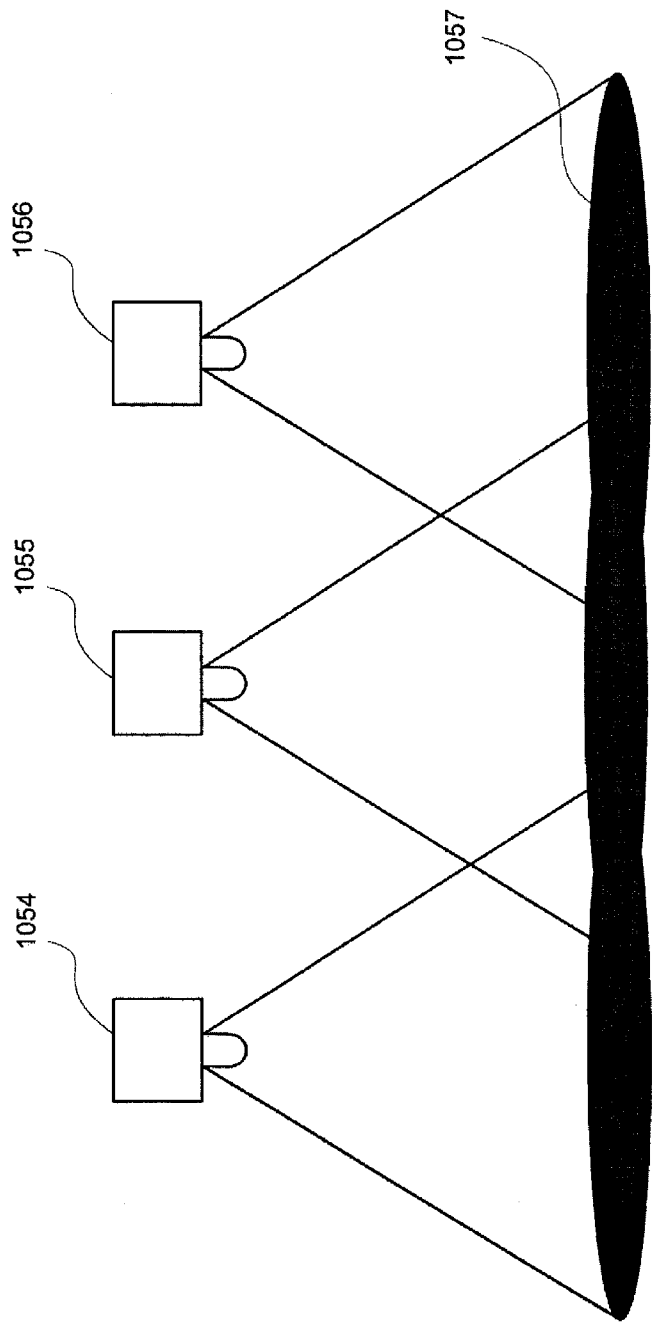
FIG. 37 is a view for explaining the positioning area.

In a sixth example of the present invention, an example will be explained of the positioning system design (decision of the installation position of the originating terminal (transmitter)) in the case of installing transmitters (originating terminals) 2001 to 2003 only for the positioning that broadcast-transmits the signal for positioning on the ceiling, and fixedly mounting a receiver (receiving terminal) 2005 on the upper side or the like of a cart 2004 in the positioning system employing the infrared-rays, as shown in FIG. 14. A flow of the positioning system design in the sixth example is shown in FIG. 15 and FIG. 35.

At first, in a step 4001, the required positioning area and the required positioning accuracy are set.

Next, in a step 4002, the situation of the fluctuation factor at the time that the communication quality is estimated to be worst, and the situation of the fluctuation factor at the time that the communication quality is estimated to be best are set. The fluctuation factor that should be taken into consideration this time is noise. For this, a noise quantity N_worst at the time that the communication quality is estimated to be worst is set as a situation of the fluctuation factor at the time that the communication quality is estimated to be worst, and further, a noise quantity N_best at the time that the communication quality is estimated to be best is set as a situation of the fluctuation factor at the time that the communication quality is estimated to be best. Herein, as an example of the method of setting the noise quantity N_worst at the time that the communication quality is estimated to be worst, and the noise quantity N_best at the time that the communication quality is estimated to be best, there exists the method of directly inputting them from the inputting unit 3061 of FIG. 5, the method of, in the DB unit 3063, preserving the noise quantity under an environment being envisaged, or the like. Additionally, the information, which is preserved in the DB unit 3063, in the method of, in the DB unit 3063, preserving the noise quantity under an environment being envisaged could be, for example, noise information 4051 for each piece of installation environment information as shown in FIG. 17.

And, in a step 4003, the transmitter characteristic is calculated from the receiver performance, the noise quantity N_best at the time that the communication quality is estimated to be best, and the required positioning accuracy.

Thereafter, in a step 4004, after a radius of the area in which the infrared signal from one transmitter is receivable is calculated from the calculated transmitter characteristic, the receiver performance, and the noise quantity N_worst at the time that the communication quality is estimated to be worst to calculate the necessary number of the transmitters from the radius of the area in which the infrared signal from one transmitter is receivable, and the required positioning area, the transmitter characteristic and the installation position of the transmitter are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the transmitter characteristic and the installation position of the transmitter.

Specifically, in a step 4171, the area in which the infrared signal is receivable is calculated from the calculated transmitter characteristic, the receiver performance, and the noise quantity N_worst at the time that the communication quality becomes worst.

And, in a step 4172, the necessary number of the transmitters is calculated from the area calculated in the step 4171, in which the infrared communication is receivable, and the required positioning area set in the step 4001.

Thereafter, in a step 4173, the installation position of the transmitter is calculated from the area in which the infrared signal is receivable, the necessary number of the transmitters calculated in the step 4172, and the required positioning area set in the step 4001.

And, in a step 4174, it is determined whether the positioning-possible area, which is calculated from the area calculated in the step 4171, in which the infrared communication is receivable, and the installation position of the transmitter calculated in the step 4173, is larger than the required positioning area set in the step 4001 beyond necessity. In a case where it has not been determined that the positioning-possible area is larger than the required positioning area beyond necessity, a design result is output from the outputting unit 3067, and the positioning system design is finished.

In a case where the positioning-possible area is larger than the required positioning area beyond necessity, in a step 4175, the installation position of the transmitter is corrected from the required positioning area set in the step 4001, and the positioning-possible area that is calculated from the area calculated in the step 4171, in which the infrared communication is receivable, and the installation position of the transmitter calculated in the step 4173, a design result is output from the outputting unit 3067, and the positioning system design is finished.

In the calculation of the installation position of the transmitter, as one example, the installation position may be decided with a space between the transmitters used for calculating the necessary number of the transmitters kept. Further, as another example, the installation position may be decided with a space between the transmitters used for calculating the necessary number of the transmitters narrowed.

As explained above, in the sixth example of the present invention, the design of the positioning system employing the infrared-rays is realized based upon a fluctuation in the noise.

Further, as a modification example to the sixth example, the design of the positioning system employing the infrared-rays may be made by combining the fluctuation factors that were employed in two examples out of the second example, the third example, the fourth example, and fifth example.

Further, as a modification example to the sixth example, the design of the positioning system employing the infrared-rays may be made by combining the fluctuation factors that were employed in three examples out of the second example, the third example, the fourth example, and fifth example.

Further, as a modification example to the sixth example, the design of the positioning system employing the infrared-rays may be made by combining the fluctuation factors that were employed in the second example, the third example, the fourth example, and fifth example.

Further, in the above-mentioned sixth example, the design of the positioning system employing the infrared-rays was explained, and the design of the positioning system employing the radio is also acceptable. Herein, with the radio, for example, RFID, Bluetooth, WLAN, cellular, and GPS tag may be employed. Further, with the WLAN, for example, IEEE802.11a, IEEE802.11b, and IEEE802.11g. Further, the cellular could be, for example, W-CDMA, PHS, and PDC may be employed.

Further, in the above-mentioned sixth example, the situation in which the fixed radio appliance was installed on the ceiling was explained, and the situation in which the fixed radio appliance is hung on the wall is also acceptable. Further, in the above-mentioned sixth example, the situation in which the transmitter was installed only for a purpose of the positioning was explained, and the transmitter may be utilized for the application other than the positioning. As a specific example, the transmitter may be utilized not only for the positioning but also for the data communication by constructing the positioning system employing a beacon notifying existence of a base station to a terminal like the case of a wireless LAN.

An Example 7

Figure 38:
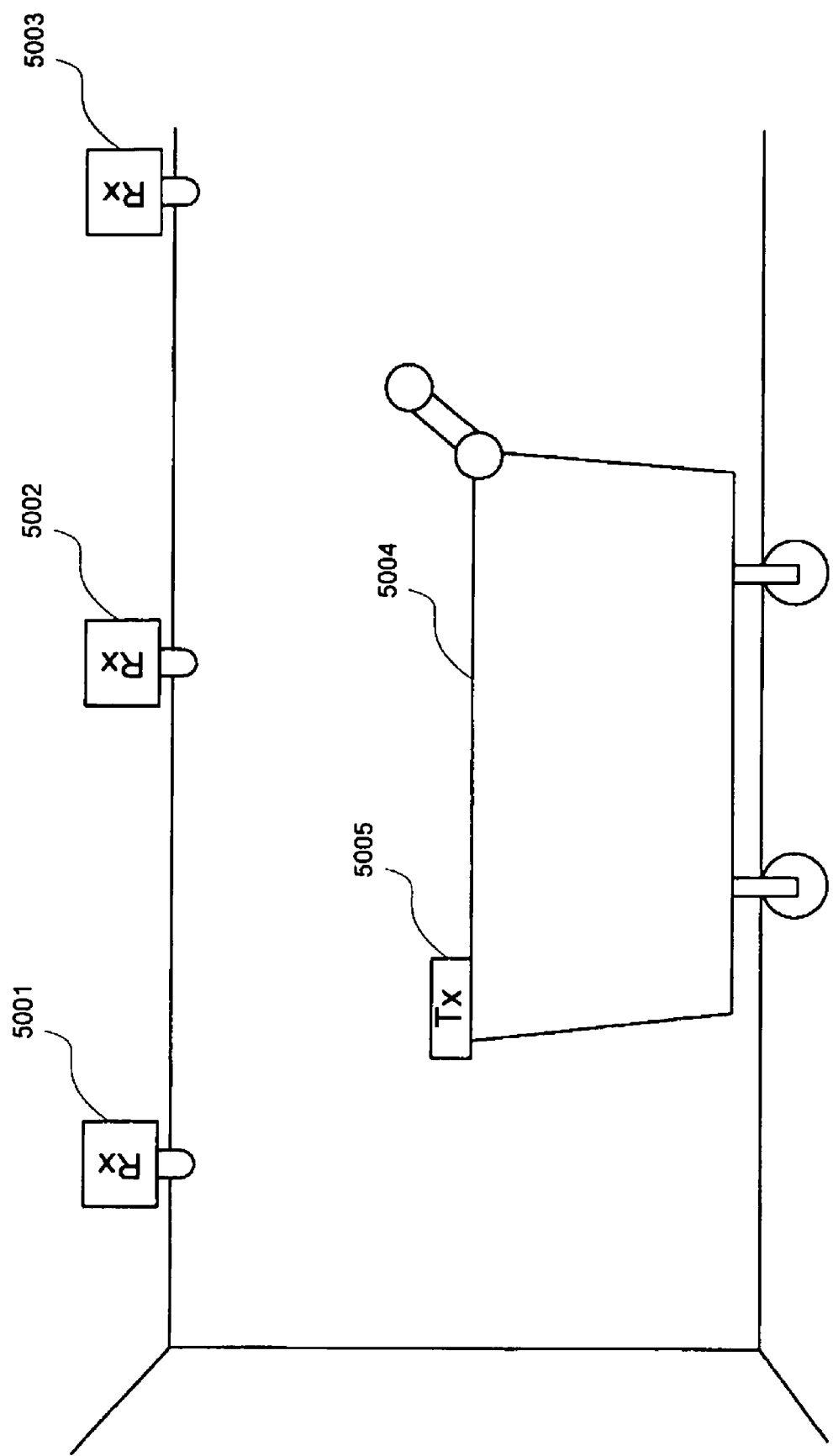
FIG. 38 is a view of the environment into which the positioning system that is envisaged in a seventh example, a ninth example and a twelfth example is introduced.
Figure 39:
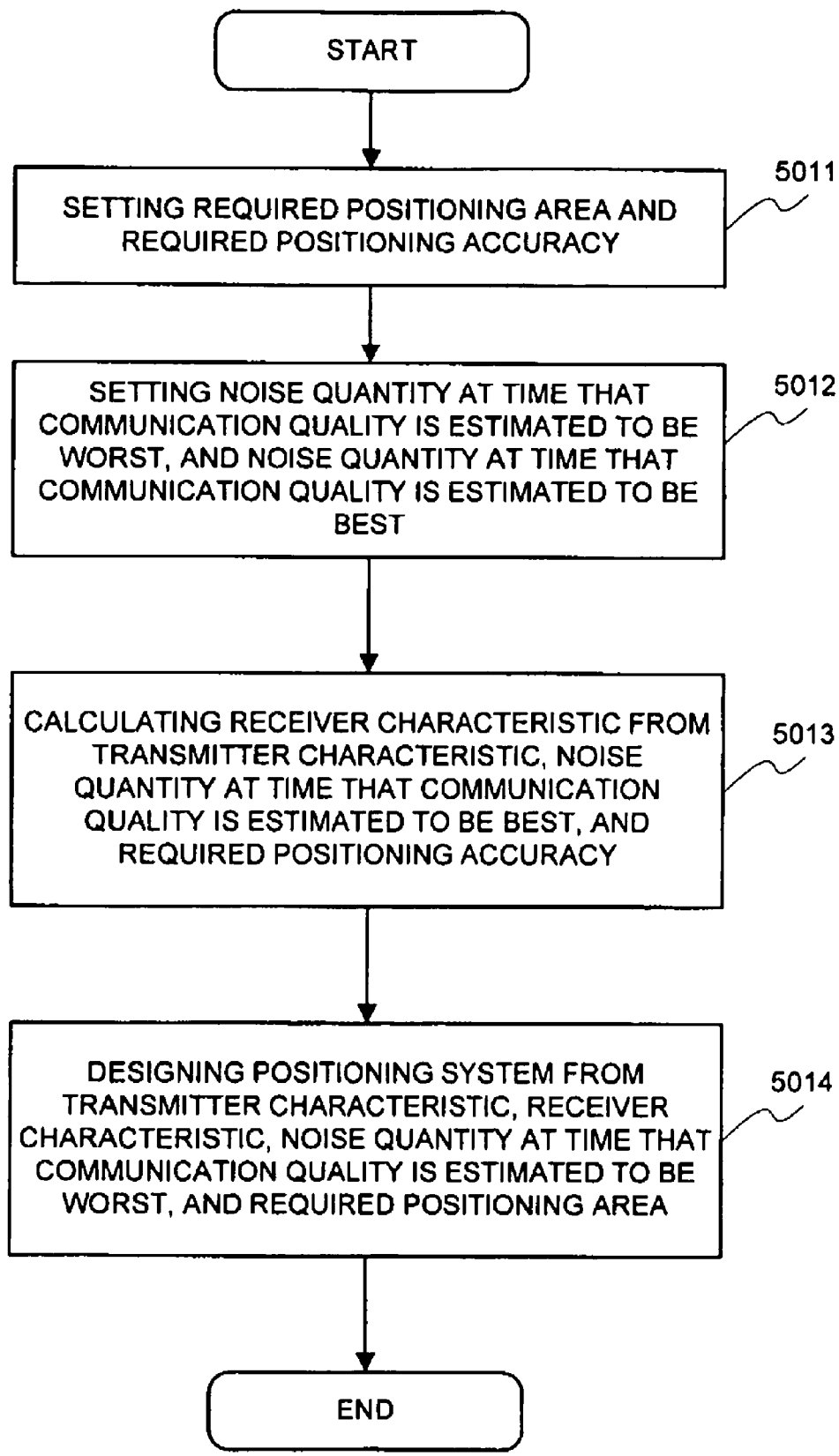
FIG. 39 is a flowchart of the positioning system design in the seventh example and the twelfth example.
Figure 40:
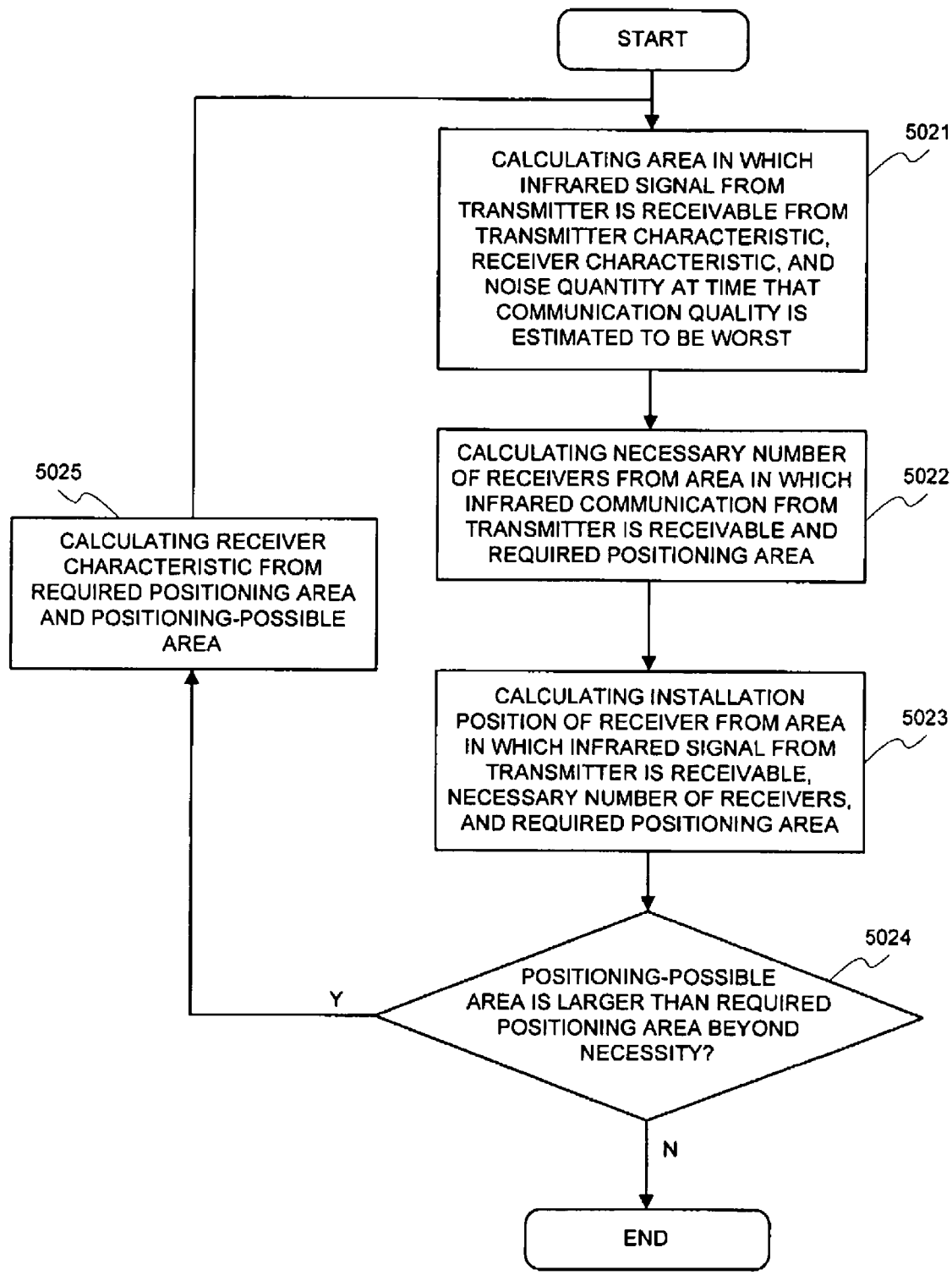
FIG. 40 is a view of a detailed process of the positioning system design in the seventh example.

In a seventh example of the present invention, an example will be explained of the positioning system design (decision of the installation position of the receiving terminal (receiver)) in the case of installing receivers (receiving terminals) 5001 to 5003 only for the positioning that broadcast-receives the signal for positioning on the ceiling, and fixedly mounting a transmitter (originating terminal) 5005 on the upper side or the like of a cart 5004 in the positioning system employing the infrared-rays, as shown in FIG. 38. Additionally, the method of designing the positioning system follows the functional block of FIG. 5, and flows of FIG. 39 and FIG. 40, being a modification example of FIG. 6 and FIG. 8, respectively.

At first, in a step 5011, the required positioning area and the required positioning accuracy are set. Envisage that the required positioning area, which is a top view of information of the required positioning area in a certain floor as shown in FIG. 7, is given as a rectangle like a positioning area 3035 within a floor 3031 in which structures 3032 to 3034 have been arranged. Further, it is assumed that the required positioning accuracy is given as r.

Next, in a step 5012, the situation of the fluctuation factor at the time that the communication quality is estimated to be worst, and the situation of the fluctuation factor at the time that the communication quality is estimated to be best are set. The fluctuation factor that should be taken into consideration this time is noise, whereby a noise quantity N_worst at the time that the communication quality is estimated to be worst is set as a situation of the fluctuation factor (noise quantity) at the time that the communication quality is estimated to be worst, and further, a noise quantity N_best at the time that the communication quality is estimated to be best is set as a situation of the fluctuation factor (noise quantity) at the time that the communication quality is estimated to be best. Herein, as an example of the method of setting the noise quantity N_worst at the time that the communication quality is estimated to be worst, and the noise quantity N_best at the time that the communication quality is estimated to be best, there exists the method of directly inputting them from the inputting unit 3061 of FIG. 5, the method of, in the DB unit 3063, preserving the noise quantity under an environment being envisaged, or the like. Additionally, the information, which is preserved in the DB unit 3063, in the method of, in the DB unit 3063, preserving the noise quantity under an environment being envisaged could be, for example, noise information 4051 for each piece of installation environment information as shown in FIG. 17.

And, in a step 5013, the receiver characteristic is calculated from the transmitter performance, the noise quantity N_best at the time that the communication quality is estimated to be best, and the required positioning accuracy.

As a specific example of calculating the receiver characteristic, the receiver characteristic such that the SN ratio, which takes into consideration the transmitter performance, the noise quantity N_best at the time that the communication quality is estimated to be best, and the propagation loss, become equal to or less than a desired SN in a positional relation between the transmitter and the receiver that is calculated from the installation height of the receiver and the required positioning accuracy r is calculated. Herein, the propagation loss is obtained by calculating a propagation distance from the installation height of the transmitter and the required positioning accuracy r. Additionally, any of the method of setting the installation height from the inputting unit 3061 of FIG. 5, the method of pre-setting it in the DB unit 3063, and the method of pre-setting it in the operating unit 3064 is envisagable as an example of the method of setting the installation height of the receiver.

Thereafter, in a step 5014, after a radius of the area in which one receiver can receive the infrared signal is calculated from the receiver characteristic calculated in the step 5013, the transmitter characteristic, and the noise quantity N_worst at the time that the communication quality is estimated to be worst to calculate the necessary number of the receivers from the radius of the area in which one receiver can receive the infrared signal, and the required positioning area, the receiver characteristic and the installation position of the receiver are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the transmitter characteristic and the installation position of the transmitter.

Specifically, in a step 5021, the area in which the infrared signal from the transmitter is receivable is calculated from the receiver characteristic calculated in the step 5013, the transmitter characteristic, and the noise quantity N_worst set in the step 5012 at the time that the communication quality is estimated to be worst.

And, in a step 5022, the necessary number of the receivers is calculated from the area calculated in the step 5021, in which the infrared communication from the transmitter is receivable, and the required positioning area set in the step 5011.

Thereafter, in a step 5023, the installation position of the receiver is calculated from the area in which the infrared signal from the transmitter is receivable, the necessary number of the receivers calculated in the step 5022, and the required positioning area set in the step 5011.

And, in a step 5024, it is determined whether the positioning-possible area, which is calculated from the area calculated in the step 5021, in which the infrared communication from the transmitter is receivable, and the installation position of the receiver calculated in the step 5023, is larger than the required positioning area set in the step 5011 beyond necessity. In a case where it has not been determined that the positioning-possible area is larger than the required positioning area beyond necessity, a design result is output from the outputting unit 3067, and the positioning system design is finished.

In a case where the positioning-possible area is larger than the required positioning area beyond necessity, in a step 5025, the receiver characteristic is calculated from the required positioning area set in the step 5011, and the positioning-possible area that is calculated from the area calculated in the step 5021, in which the infrared communication from the transmitter is receivable, and the installation position of the receiver calculated in the step 5023, and the operation returns to the process of the step 5021 once again.

As explained above, in the seventh example of the present invention, the design of the positioning system employing the infrared-rays is realized based upon a fluctuation in the noise.

An Example 8

Figure 41:
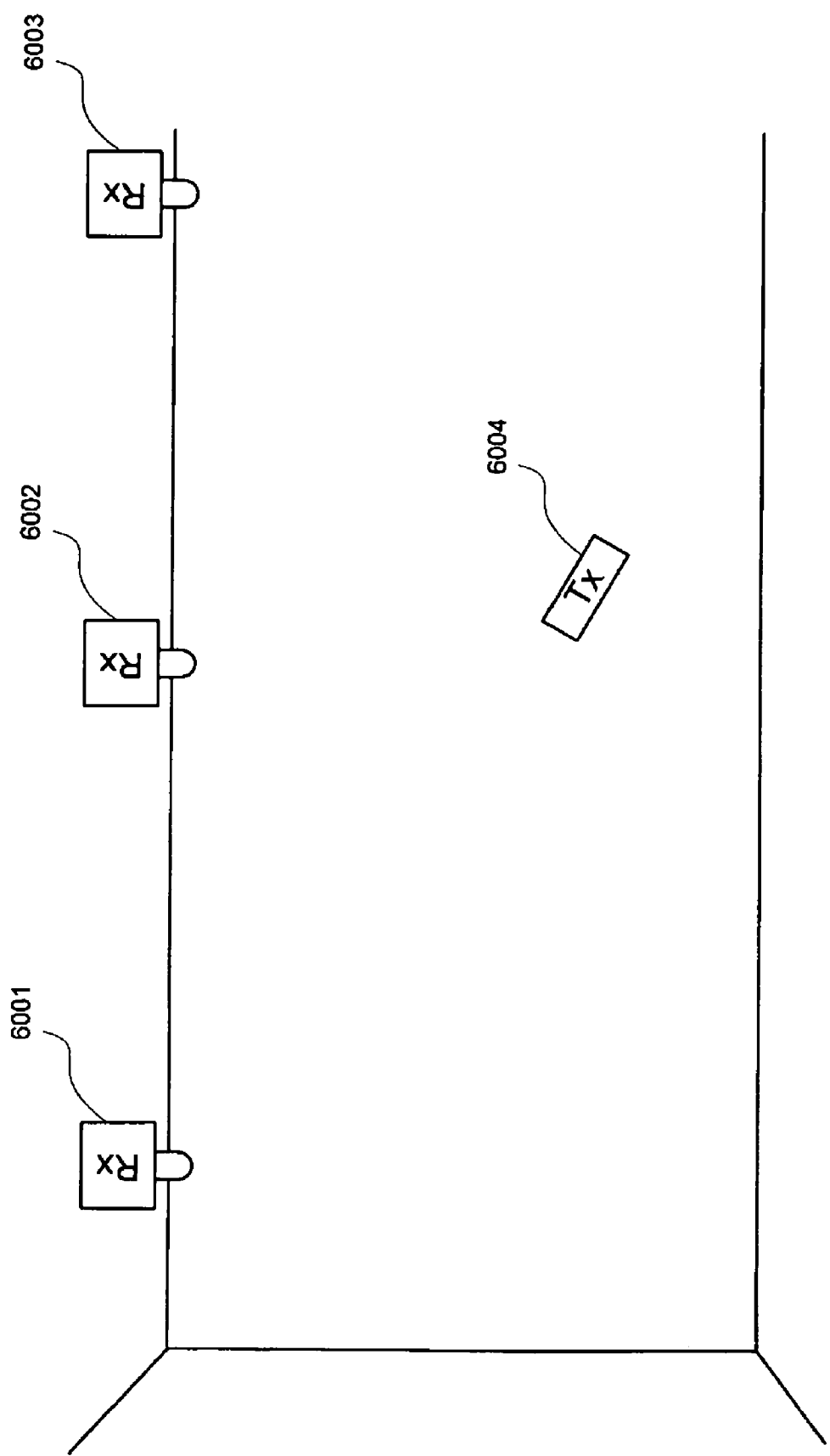
FIG. 41 is a view of the environment into which the positioning system that is envisaged in an eighth example is introduced.
Figure 42:
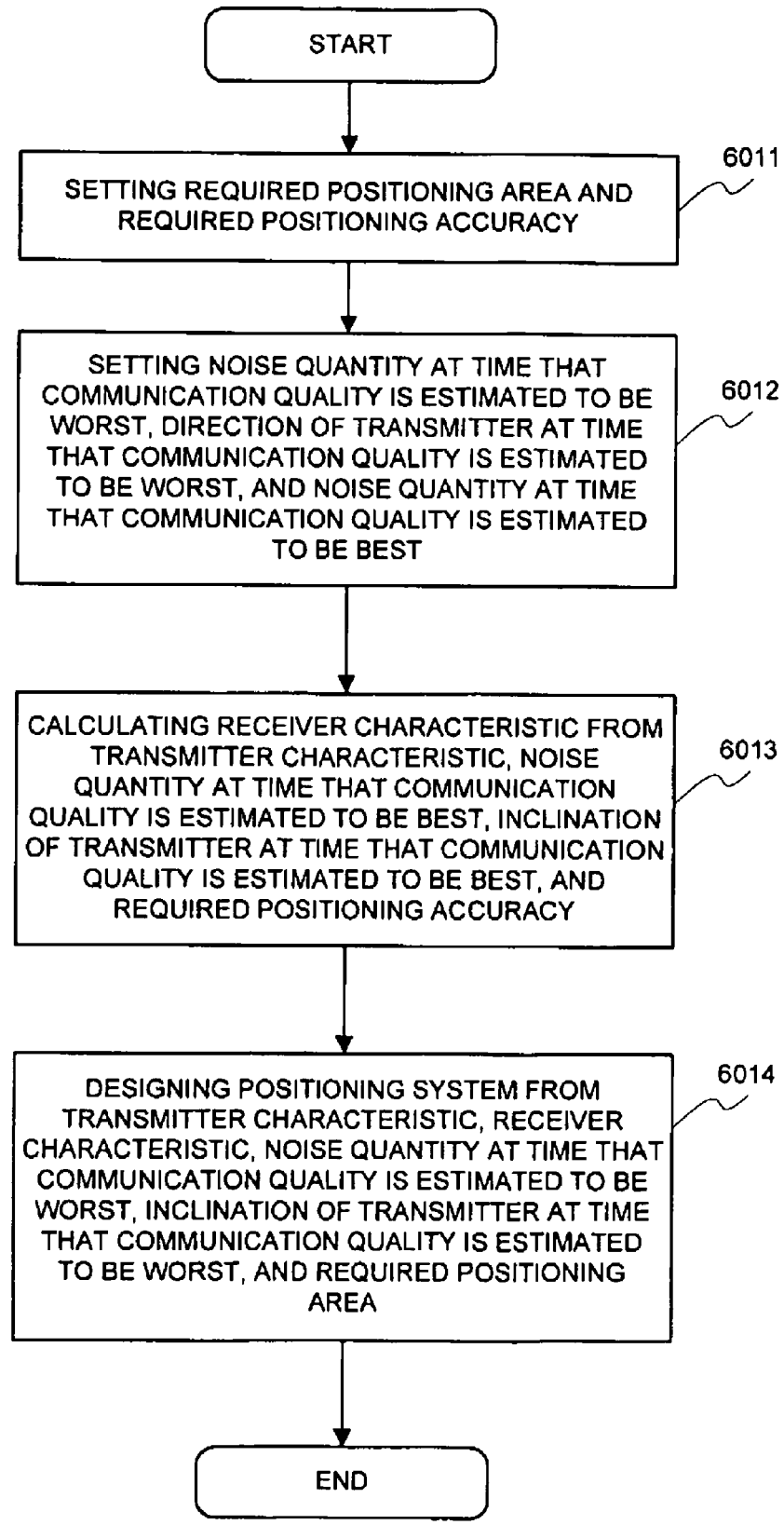
FIG. 42 is a flowchart of the positioning system design in the eighth example.
Figure 43:
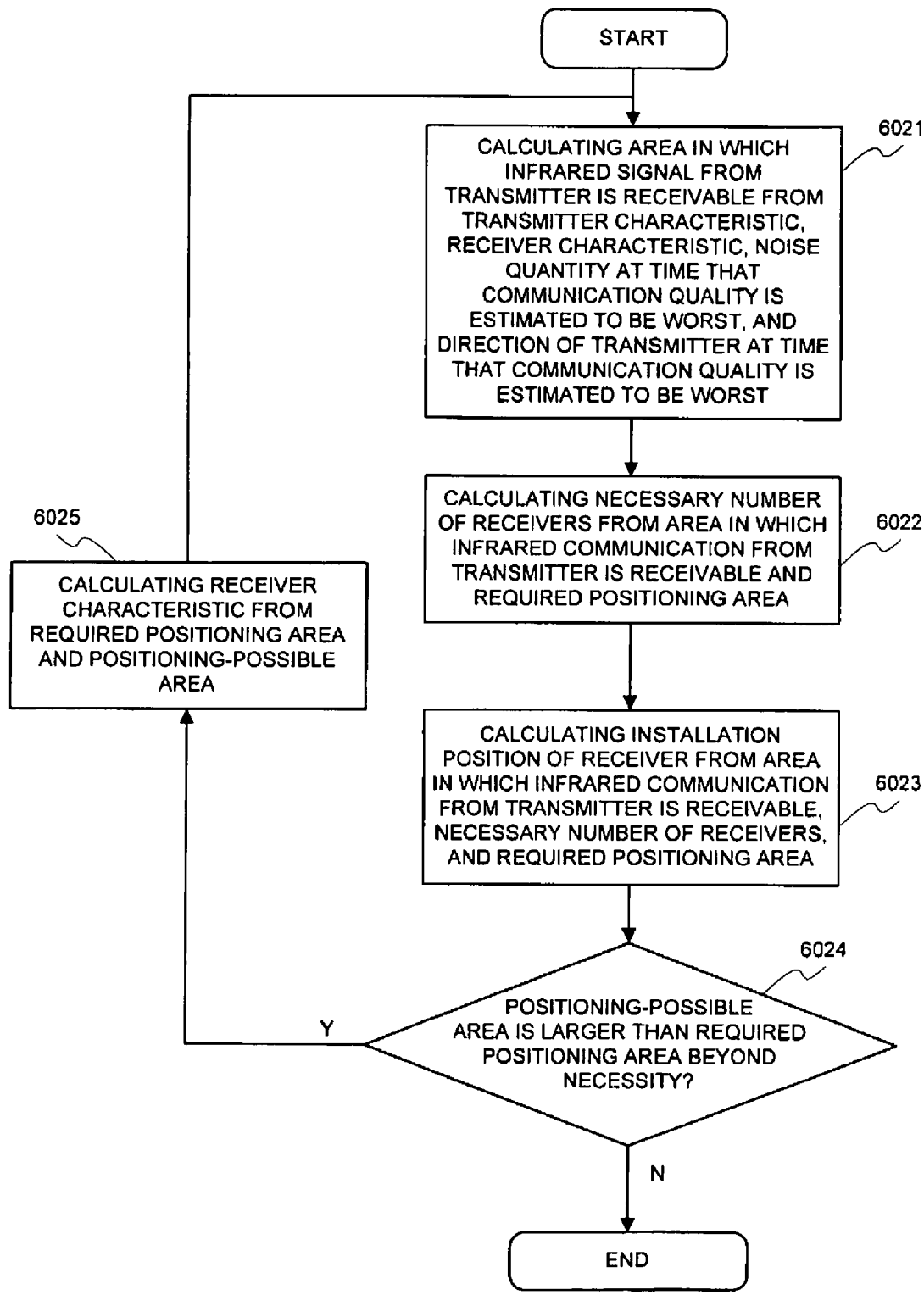
FIG. 43 is a view of a detailed process of the positioning system design in the eighth example.

In an eighth example of the present invention, an example will be explained of the positioning system design (decision of the installation position of the receiving terminal (receiver)) in the case that receivers (receiving terminals) 6001 to 6003 only for the positioning that broadcast-receives the signal for positioning are installed on the ceiling, and a person has a portable PC, a business-purpose terminal, or the like onto which a transmitter (originating terminal) 6004 broadcast-transmitting a signal for positioning has been mounted (in the case that the transmitter has been not fixed) in the positioning system employing the infrared-rays, as shown in FIG. 41. The eighth example as well follows a flow of the positioning system design of FIG. 6 similarly to the seventh example, and the eighth example, which differs from the seventh example in the fluctuation factor, includes a direction of the transmitter as a fluctuation factor, so it will be explained below. Additionally, a flow of the positioning system design in the eighth example will be shown in FIG. 42 and FIG. 43.

At first, in a step 6011, the required positioning area and the required positioning accuracy are set.

Next, in a step 6012, the situation of the fluctuation factor at the time that the communication quality is estimated to be worst, and the situation of the fluctuation factor at the time that the communication quality is estimated to be best are set. The fluctuation factor that should be taken into consideration this time is noise and a direction of the receiver. Herein, the fact that the direction of the transmitter differs causes a signal reception power to fluctuate because an angle gain of the transmitter fluctuates. For this, a noise quantity N_worst at the time that the communication quality is estimated to be worst, and an angle $\theta$_Tx_worst of a shift from the direction of the transmitter that is envisaged at the time that the communication quality is estimated to be worst are set as a situation of the fluctuation factor at the time that the communication quality is estimated to be worst, and further, a noise quantity N_best at the time that the communication quality is estimated to be best is set as a situation at the time that the communication quality is estimated to be best.

Herein, as an example of the method of setting the noise quantity N_worst at the time that the communication quality is estimated to be worst, the angle $\theta$_Rx_worst of a shift from the direction of the transmitter that is envisaged at the time that the communication quality is estimated to be worst, and the noise quantity N_best at the time that the communication quality is estimated to be best, there exists the method of directly inputting them from the inputting unit 3061 of FIG. 5, the method of, in the DB unit 3063, preserving the noise quantity under an environment being envisaged, and an inclination of the transmitter in the usage method being envisaged, or the like. Additionally, the information, which is preserved in the DB unit 3063, in the method of, in the DB unit 3063, preserving the noise quantity under an environment being envisaged could be, for example, noise information 4051 for each piece of installation environment information as shown in FIG. 17. Further, the information, which is preserved in the DB unit 3063, in the method of, in the DB unit 3063, preserving an inclination of the transmitter in the usage method being envisaged could be, for example, an inclination of the transmitter being envisaged in each usage method as shown in FIG. 44.

And, in a step 6013, the receiver characteristic is calculated from the transmitter performance, the noise quantity N_best at the time that the communication quality is estimated to be best, being a situation of the fluctuation factor at the time that the communication quality is estimated to be best, the angle $\theta$_Tx_best of a shift from the direction of the transmitter at the time that the communication quality is estimated to be best, the required positioning accuracy. Herein, $\theta$_Tx_best is an angle shifted from the direction of the transmitter that is envisaged at the time that the transmitter characteristic in a positional relation between the transmitter and the receiver that is calculated from the installation height of the receiver and the required positioning accuracy r is estimated to be best. However, it is assumed that the absolute value of $\theta$_Tx_best is a value smaller than the absolute value of $\theta$_Tx_worst.

Specifically, the receiver characteristic such that the SN ratio, which takes into consideration the transmitter performance taking $\theta$_Tx_best into consideration, the noise quantity N_best at the time that the communication quality is estimated to be best, and the propagation loss, becomes equal to or less than a desired SN ratio in a positional relation between the transmitter and the receiver that is calculated from the installation height of the receiver and the required positioning accuracy r is calculated.

Thereafter, in a step 6014, after a radius of the area in which one receiver can receive the infrared signal from the transmitter is calculated from the receiver characteristic taking $\theta$_Tx_worst into consideration, the transmitter performance taking $\theta$_Tx_worst into consideration, and the noise quantity N_worst at the time that the communication quality is estimated to be worst to calculate the necessary number of the receivers from the radius of the area in which one receiver can receive the infrared signal from the transmitter, and the required positioning area, the receiver characteristic and the installation position of the receiver are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the receiver characteristic and the installation position of the receiver.

Specifically, in the step 6021, the area in which one receiver can receive the infrared signal from the transmitter is calculated from the receiver characteristic taking θ_Tx_worst into consideration, the transmitter performance taking θ_Tx_worst into consideration, and the noise quantity N_worst at the time that the communication quality is estimated to be worst.

And, in a step 6022, the necessary number of the receivers is calculated from the area calculated in the step 6021, in which one receiver can receive the infrared signal from the transmitter, and the required positioning area set in the step 6011.

Thereafter, in a step 6023, the installation position of the receiver is calculated from the area in which one receiver can receive the infrared signal from the transmitter, the necessary number of the receivers calculated in the step 6022, and the required positioning area set in the step 6011.

And, in a step 6024, it is determined whether the positioning-possible area, which is calculated from the area calculated in the step 6021, in which one receiver can receive the infrared signal from the transmitter, and the installation position of the receiver calculated in the step 6023, is larger than the required positioning area set in the step 6011 beyond necessity. In a case where it has not been determined that the positioning-possible area is larger than the required positioning area beyond necessity, and the positioning system design is finished.

In a case where the positioning-possible area is larger than the required positioning area beyond necessity, in a step 6025, the receiver characteristic is calculated from the required positioning area set in the step 6011, and the positioning-possible area that is calculated from the area calculated in the step 6021, in which one receiver can receive the infrared signal from the transmitter, and the installation position of the receiver calculated in the step 6023, and the operation returns to the process of the step 6021 one again.

As explained above, in the eighth example of the present invention, the design of the positioning system employing the infrared-rays is realized based upon a fluctuation in the noise, and a fluctuation in the transmitter angle.

An Example 9

Figure 45:
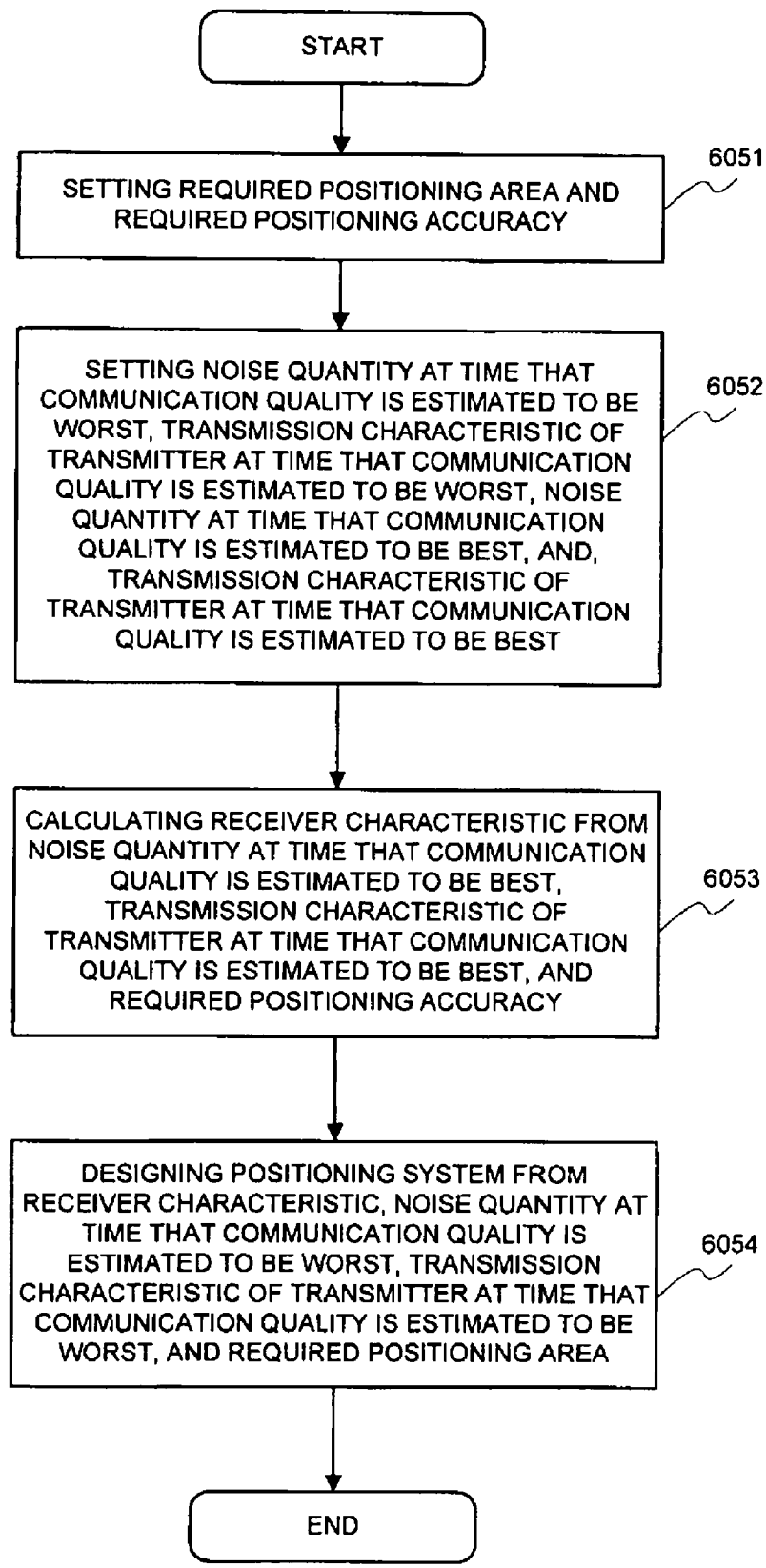
FIG. 45 is a flowchart of the positioning system design in the ninth example.
Figure 46:
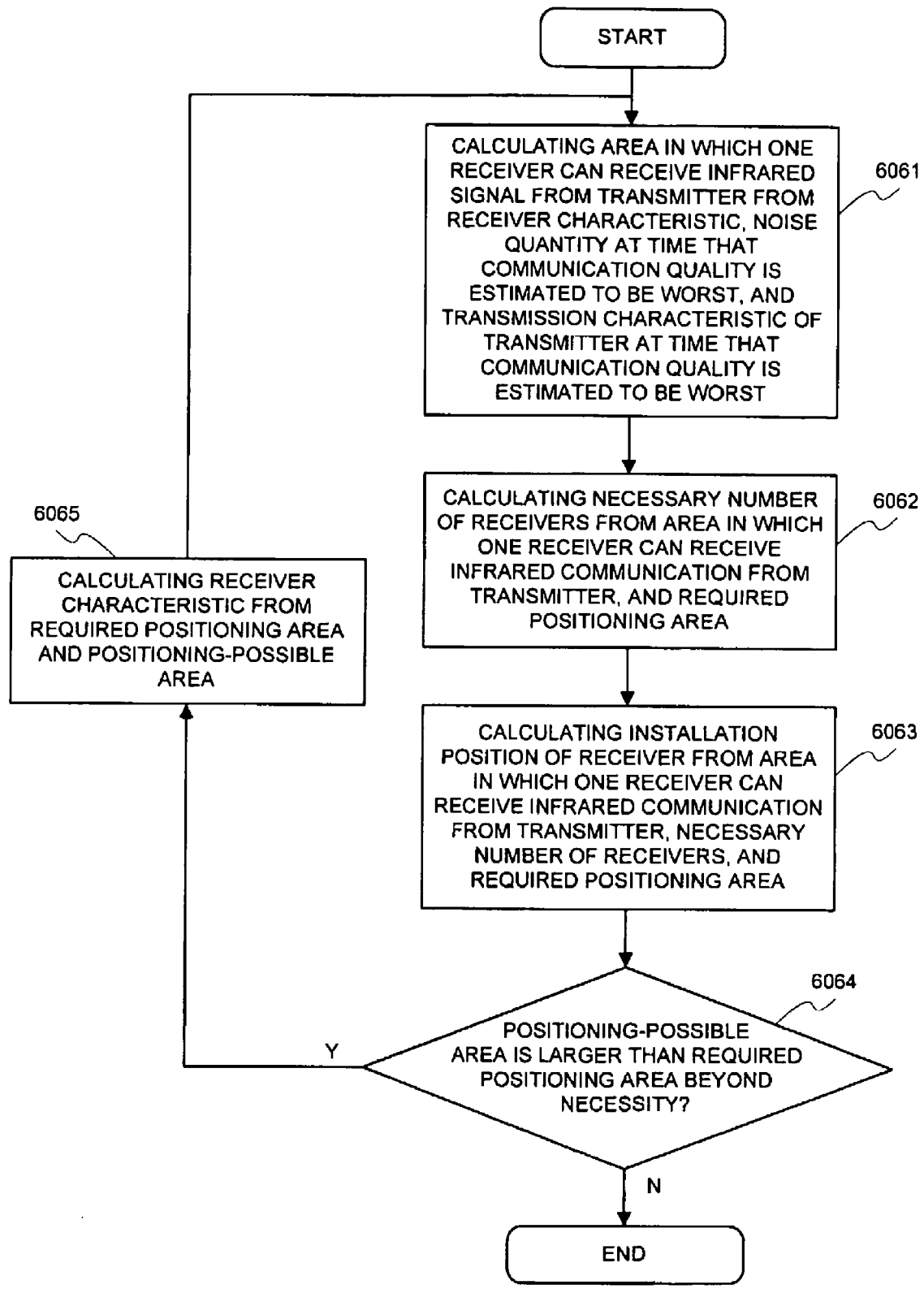
FIG. 46 is a view of a detailed process of the positioning system design in the ninth example.

In an ninth example of the present invention, an example will be explained of the positioning system design (decision of the installation position of the receiving terminal (receiver)) in the case of installing receivers (receiving terminals) 5001 to 5003 only for the positioning that broadcast-receives the signal for positioning on the ceiling, and fixedly mounting a different transmitter (originating terminals) 5005 cart by cart on the upper side or the like of a cart 5004 in the positioning system employing the infrared-rays as shown in FIG. 38. The ninth example, which differs from the seventh example in the fluctuation factor, includes a kind of the transmitter as a fluctuation factor, so it will be explained below. Additionally, the method of designing the positioning system follows the functional block of FIG. 5 and flows FIG. 45 and FIG. 46, being a modification to FIG. 6 and FIG. 8, respectively.

At first, in a step 6051, the required positioning area and the required positioning accuracy are set.

Next, in a step 6052, the situation of the fluctuation factor at the time that the communication quality is estimated to be worst, and the situation of the fluctuation factor at the time that the communication quality is estimated to be best are set. The fluctuation factor that should be taken into consideration this time is noise and a kind of the transmitter. Herein, the fact that the kind of the transmitter differs mainly causes a signal reception power to fluctuate because an angle gain of the transmitter, a signal transmission power, or the like fluctuates. For this, a noise quantity N_worst at the time that the communication quality is estimated to be worst, and a transmission characteristic Tx_worst of the transmitter at the time that the communication quality is estimated to be worst are set as a situation of the fluctuation factor at the time that the communication quality is estimated to be worst, and further, a noise quantity N_best at the time that the communication quality is estimated to be best, and a transmission characteristic Tx_best of the transmitter at the time that the communication quality is estimated to be best are set as a situation of the fluctuation factor at the time that the communication quality is estimated to be best.

Herein, as an example of the method of setting the noise quantity N_worst at the time that the communication quality is estimated to be worst, the transmission characteristic Tx_worst of the transmitter at the time that the communication quality is estimated to be worst, the noise quantity N_best at the time that the communication quality is estimated to be best, and the transmission characteristic Tx_best of the transmitter at the time that the communication quality is estimated to be best, there exists the method of directly inputting them from the inputting unit 3061 of FIG. 5, the method of, in the DB unit 3063, preserving the noise quantity under an environment being envisaged, or the like.

Figure 47:
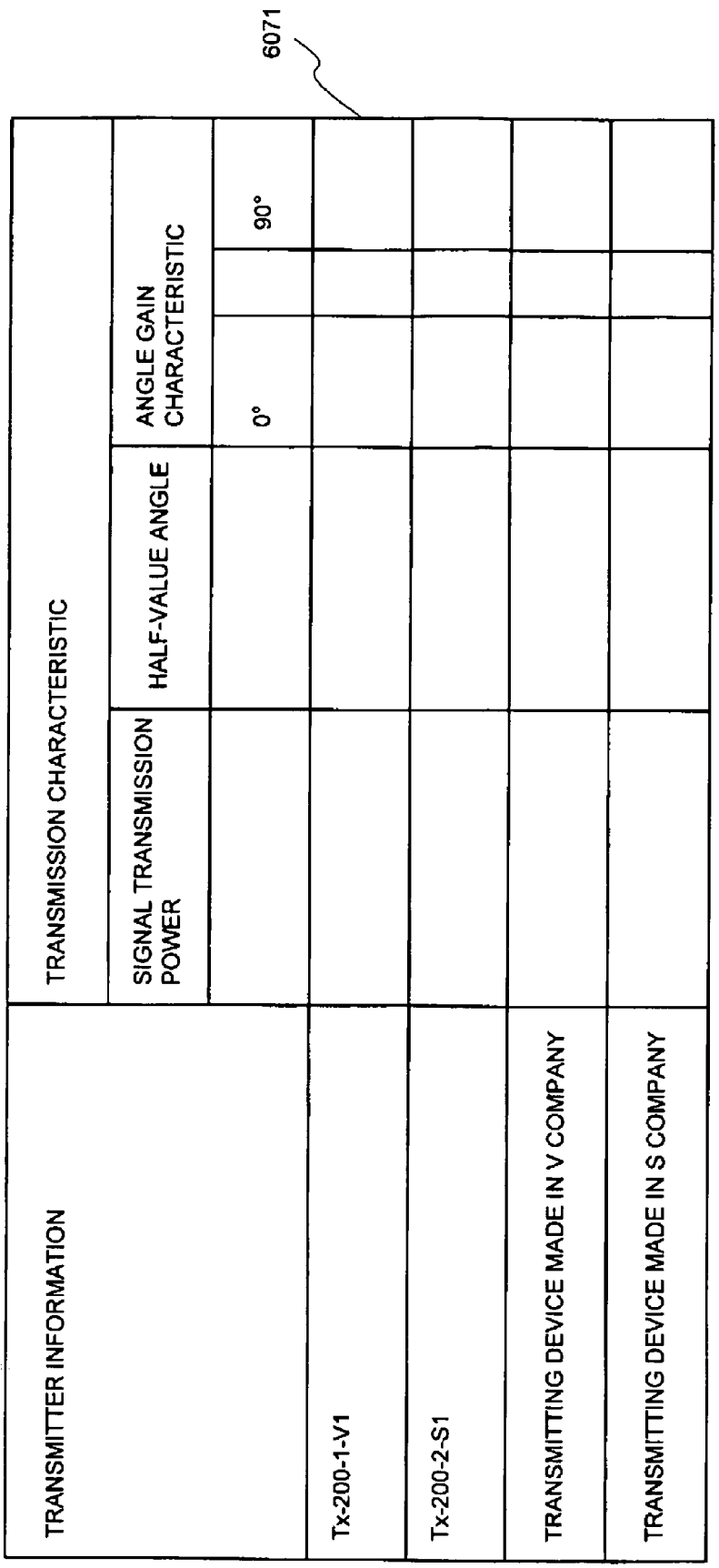
FIG. 47 is a view of an example of the transmission characteristic for each piece of the receiver information that is preserved in the DB unit.

Additionally, the information, which is preserved in the DB unit 3063, in the method of, in the DB unit 3063, preserving the noise quantity under an environment being envisaged could be, for example, noise information 4051 for each piece of installation environment information as shown in FIG. 17 or transmission characteristic information 4101 for each piece of transmitter kind information as shown in FIG. 47. At this time, as an example of each piece of transmitter kind information, there exists information of a manufacturer, a model, and a product name of the transmitter, or the like. Further, as an example of the transmission characteristic information, there exists information of a signal transmission power, a half-value angle, an angle gain characteristic, or the like for each piece of transmitter kind information.

And, in a step 6053, the receiver characteristic is calculated from the transmission characteristic Tx_best, N_best, being a situation of the fluctuation factor at the time that the communication quality is estimated to be best, and the required positioning accuracy.

Thereafter, in a step 6054, after a radius of the area in which one receiver can receive the infrared signal from the transmitter is calculated from the receiver characteristic, the transmission performance Tx_worst, and the noise quantity N_worst at the time that the communication quality is estimated to be worst to calculate the necessary number of the receivers from the radius of the area in which one receiver can receive the infrared signal from the transmitter, and the required positioning area, the receiver characteristic and the installation position of the receiver are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the receiver characteristic and the installation position of the receiver.

Specifically, in the step 6061, the area in which one receiver can receive the infrared signal from the transmitter is calculated from the receiver characteristic, the transmission performance Tx_worst, and the noise quantity N_worst at the time that the communication quality is estimated to be worst.

And, in a step 6062, the necessary number of the receivers is calculated from the area calculated in the step 6061, in which one receiver can receive the infrared signal from the transmitter, and the required positioning area set in the step 6051.

Thereafter, in a step 6063, the installation position of the transmitter is calculated from the area in which one receiver can receive the infrared signal from the transmitter, the necessary number of the transmitters calculated in the step 6062, and the required positioning area set in the step 4081.

And, in a step 6064, it is determined whether the positioning-possible area, which is calculated from the area calculated in the step 6061, in which one receiver can receive the infrared signal from the transmitter, and the installation position of the receiver calculated in the step 6063, is larger than the required positioning area set in the step 6051 beyond necessity. In a case where it has not been determined that the positioning-possible area is larger than the required positioning area beyond necessity, and the positioning system design is finished.

In a case where the positioning-possible area is larger than the required positioning area beyond necessity, in a step 6065, the receiver characteristic is calculated from the required positioning area set in the step 6051, and the positioning-possible area that is calculated from the area calculated in the step 6061, in which one receiver can receive the infrared signal from the transmitter, and the installation position of the receiver calculated in the step 6063, and the operation returns to the process of the step 6061 one again.

As explained above, in the ninth example of the present invention, the design of the positioning system employing the infrared-rays is realized based upon a fluctuation in the noise, and the kind of the transmitter.

An Example 10

Figure 48:
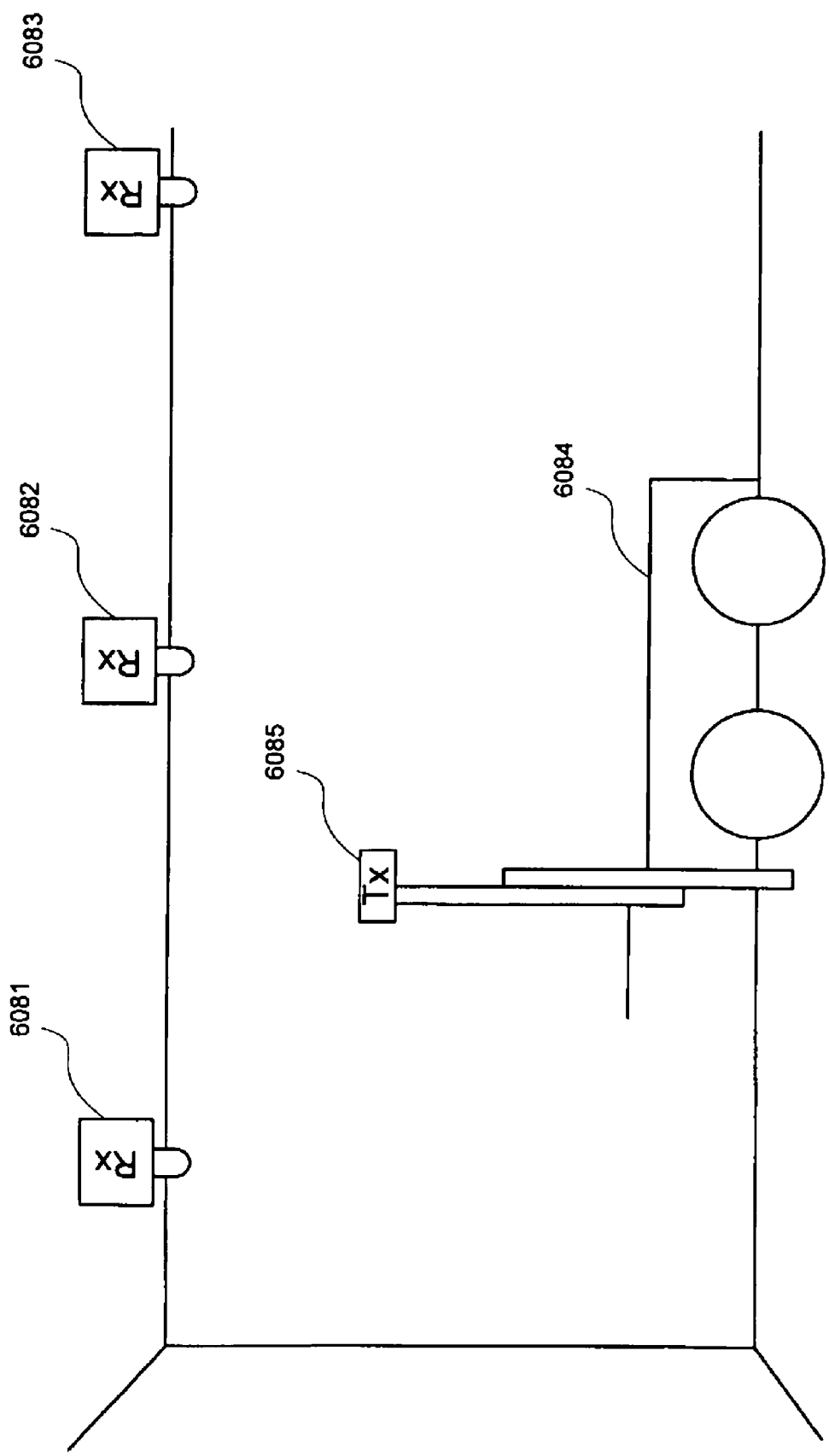
FIG. 48 is a view of the environment into which the positioning system that is envisaged in a tenth example is introduced.
Figure 49:
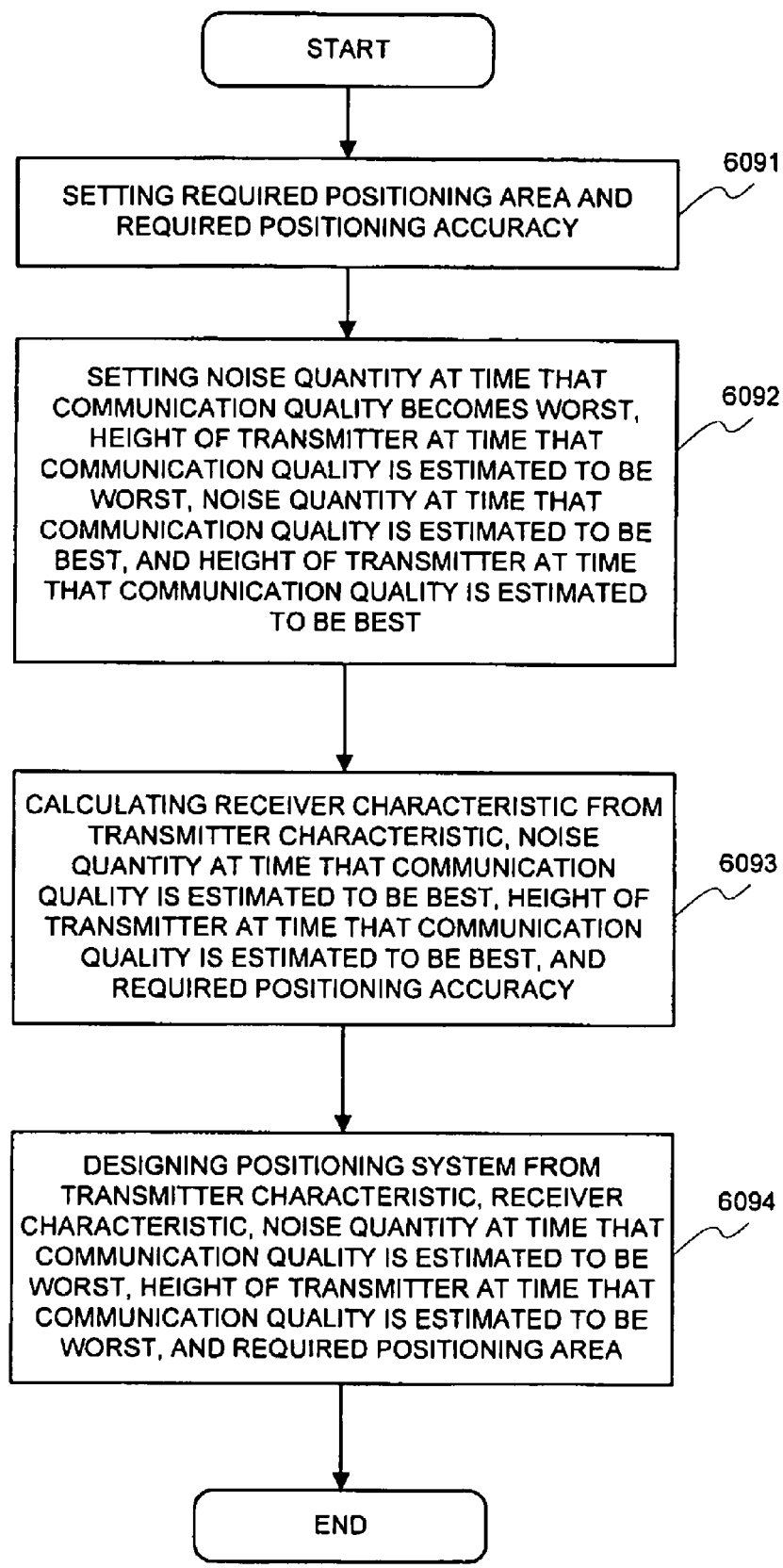
FIG. 49 is a flowchart of the positioning system design in the tenth example.
Figure 50:
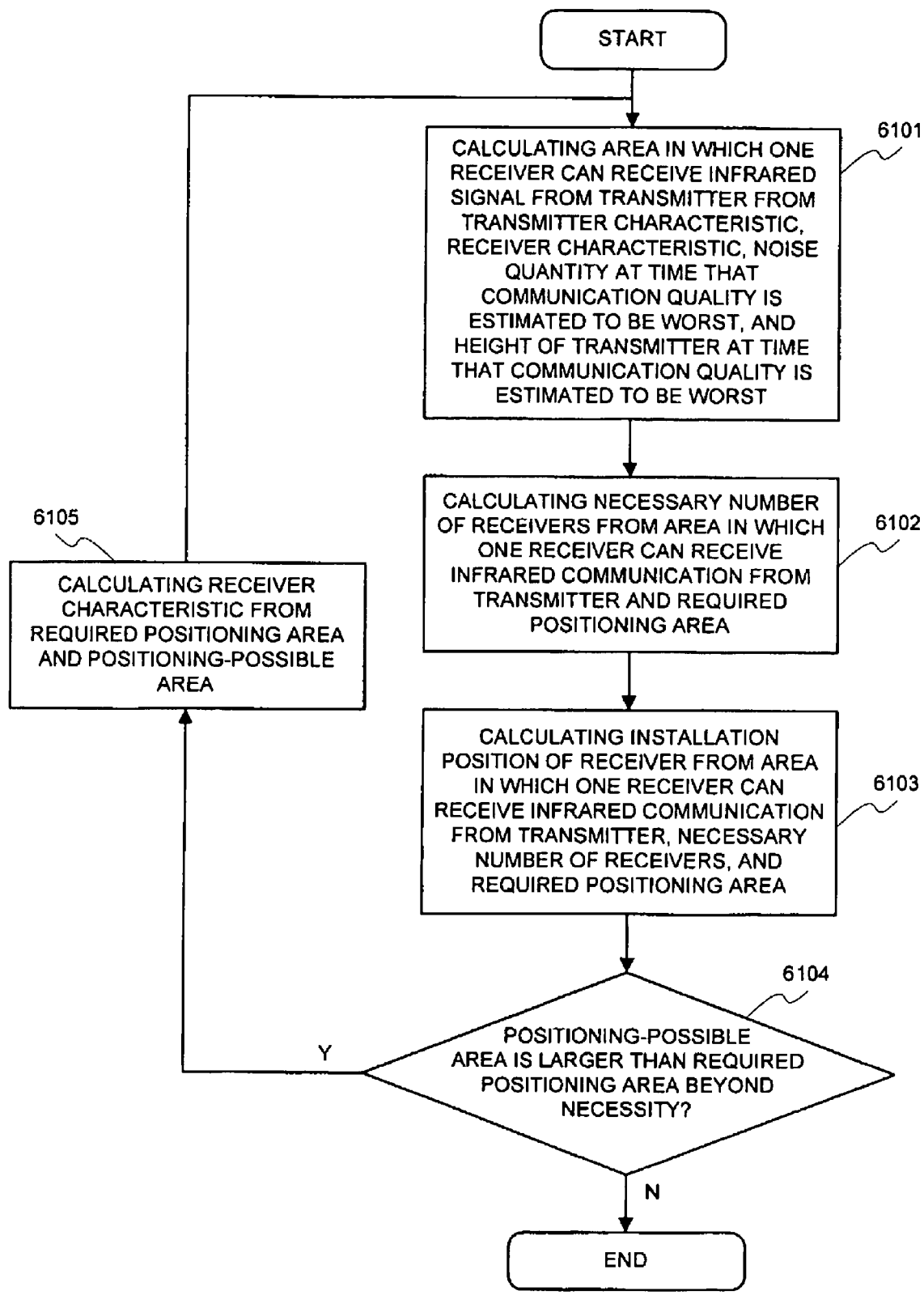
FIG. 50 is a view of a detailed process of the positioning system design in the tenth example.

In an tenth example of the present invention, an example will be explained of the positioning system design (decision of the installation position of the receiving terminal (receiver)) in the case of installing receivers (receiving terminals) 6081 to 6083 only for the positioning that broadcast-receives the signal for positioning on the ceiling, and fixedly mounting a transmitter (originating terminals) 6085 that broadcast-transmits the signal for positioning at a position fluctuating in a height, for example, on an upper side of a forklift 6084 in the positioning system employing the infrared-rays as shown in FIG. 48. The tenth example, which differs from the seventh example in the fluctuation factor, includes a height of the transmitter as a fluctuation factor, so it will be explained below. Additionally, a flow of the positioning system design in the tenth example will be shown FIG. 49 and FIG. 50.

At first, in a step 6091, the required positioning area and the required positioning accuracy are set.

Next, in a step 6092, the situation of the fluctuation factor at the time that the communication quality is estimated to be worst, and the situation of the fluctuation factor at the time that the communication quality is estimated to be best are set. The fluctuation factor that should be taken into consideration this time is noise and a height of the transmitter. Herein, the fact that the height of the transmitter differs causes a signal reception power or the like to fluctuate due to a propagation loss and a fluctuation in a signal transmission/reception angle. For this, a noise quantity N_worst at the time that the communication quality is estimated to be worst, and a height h_worst of the transmitter at the time that the communication quality is estimated to be worst are set as a situation of the fluctuation factor at the time that the communication quality is estimated to be worst, and further, a noise quantity N_best at the time that the communication quality is estimated to be best, and a height h_best of the transmitter at the time that the communication quality is estimated to be best are set as a situation of the fluctuation factor at the time that the communication quality is estimated to be best.

Herein, as an example of the method of setting the noise quantity N_worst at the time that the communication quality is estimated to be worst, the h height h_worst of the transmitter at the time that the communication quality is estimated to be worst, the noise quantity N_best at the time that the communication quality is estimated to be best, and the height h_best of the transmitter at the time that the communication quality is estimated to be best, there exists the method of directly inputting them from the inputting unit 3061 of FIG. 5, the method of, in the DB unit 3063, preserving the noise quantity under an environment being envisaged, and the height of the transmitter in the usage method being envisaged, or the like. Additionally, the information, which is preserved in the DB unit 3063, in the method of, in the DB unit 3063, preserving the noise quantity under an environment being envisaged could be, for example, noise information 4051 for each piece of installation environment information as shown in FIG. 17. Further, the information, which is preserved in the DB unit 3063, in the method of, in the DB unit 3063, preserving the height of the transmitter in the usage method being envisaged could be, for example, a height of the transmitter being envisaged in each usage method as shown in FIG. 51. At this time, as an example of the usage method, there exists the kind of the appliances onto which the transmitter is installed, for example, a note PC, a handy terminal, a cart, and a forklift.

And, in a step 6093, the receiver characteristic is calculated from the transmitter performance taking h_best into consideration, the noise quantity N_best and the height h_best of the transmitter at the time that the communication quality is estimated to be best, and the required positioning accuracy.

Thereafter, in a step 6094, after a radius of the area in which one receiver can receive the infrared signal from the transmitter is calculated from the transmitter characteristic taking h_worst into consideration, the receiver performance taking h_worst into consideration, the noise quantity N_worst at the time that the communication quality is estimated to be worst, and the height h_worst of the transmitter at the time that the communication quality is estimated to be worst to calculate the necessary number of the receivers from the radius of the area in which one receiver can receive the infrared signal from the transmitter, and the required positioning area, the receiver characteristic and the installation position of the receiver are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the receiver characteristic and the installation position of the receiver.

Specifically, in the step 6101, the area in which one receiver can receive the infrared signal from the transmitter is calculated from the transmitter characteristic taking h_worst into consideration, the receiver performance taking h_worst into consideration, the noise quantity N_worst at the time that the communication quality becomes worst, and the height h_worst of the transmitter at the time that the communication quality is estimated to be worst.

And, in a step 6102, the necessary number of the receivers is calculated from the area calculated in the step 6101, in which one receiver can receive the infrared signal from the transmitter, and the required positioning area set in the step 6091.

Thereafter, in a step 6103, the installation position of the receiver is calculated from the area in which one receiver can receive the infrared signal from the transmitter, the necessary number of the receivers calculated in the step 6102, and the required positioning area set in the step 6091.

And, in a step 6104, it is determined whether the positioning-possible area, which is calculated from the area calculated in the step 6101, in which one receiver can receive the infrared signal from the transmitter, and the installation position of the receiver calculated in the step 6103, is larger than the required positioning area set in the step 6091 beyond necessity. In a case where it has not been determined that the positioning-possible area is larger than the required positioning area beyond necessity, and the positioning system design is finished.

In a case where the positioning-possible area is larger than the required positioning area beyond necessity, in a step 6105, the receiver characteristic is calculated from the required positioning area set in the step 6091, and the positioning-possible area that is calculated from the area calculated in the step 6101, in which one receiver can receive the infrared signal from the transmitter, and the installation position of the receiver calculated in the step 6103, and the operation returns to the process of the step 6101 once again.

As explained above, in the tenth example of the present invention, the design of the positioning system employing the infrared-rays is realized based upon a fluctuation in the noise and the height of the transmitter.

An Example 11

Figure 52:
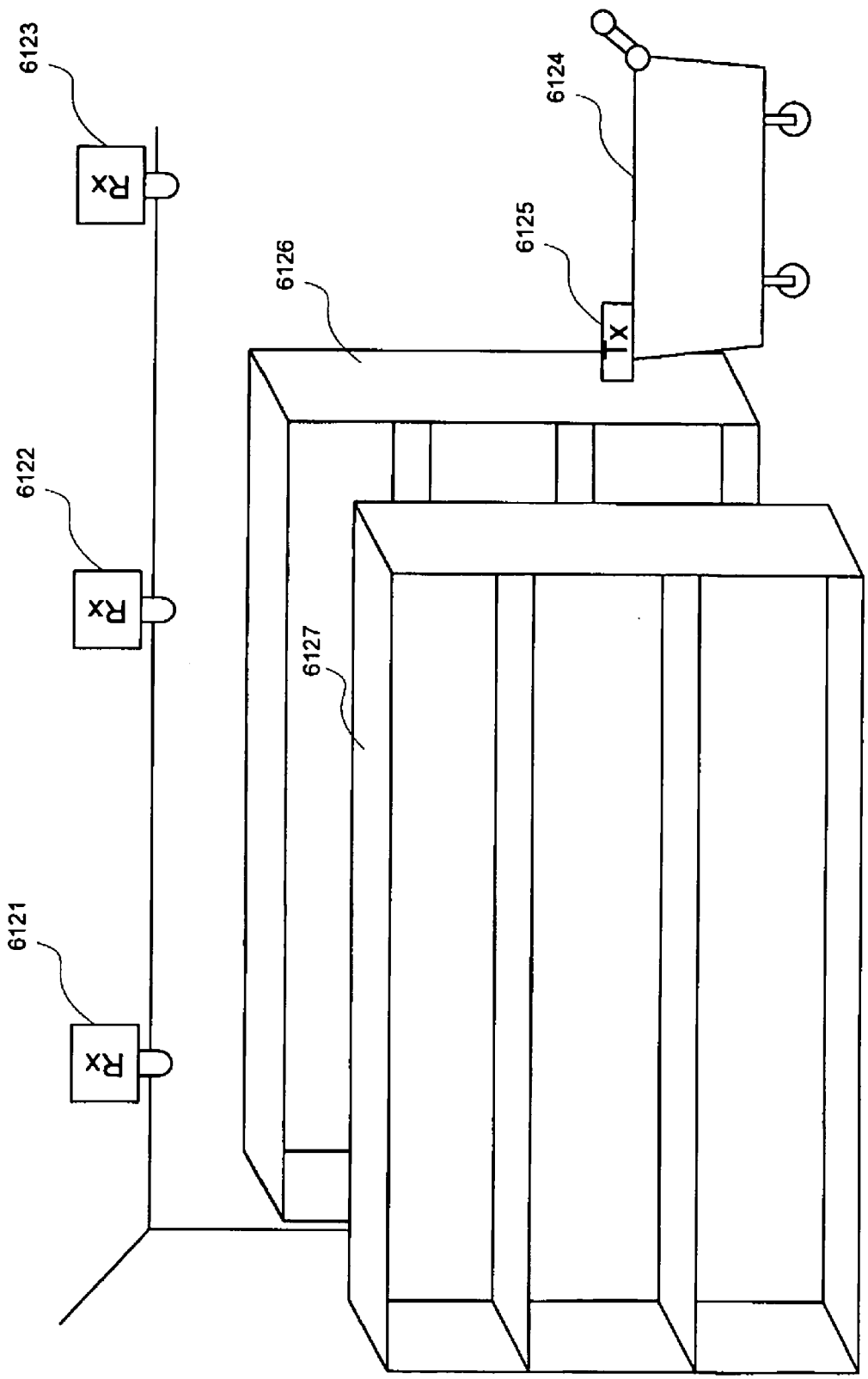
FIG. 52 is a view of the environment into which the positioning system that is envisaged in an eleventh example is introduced.
Figure 53:
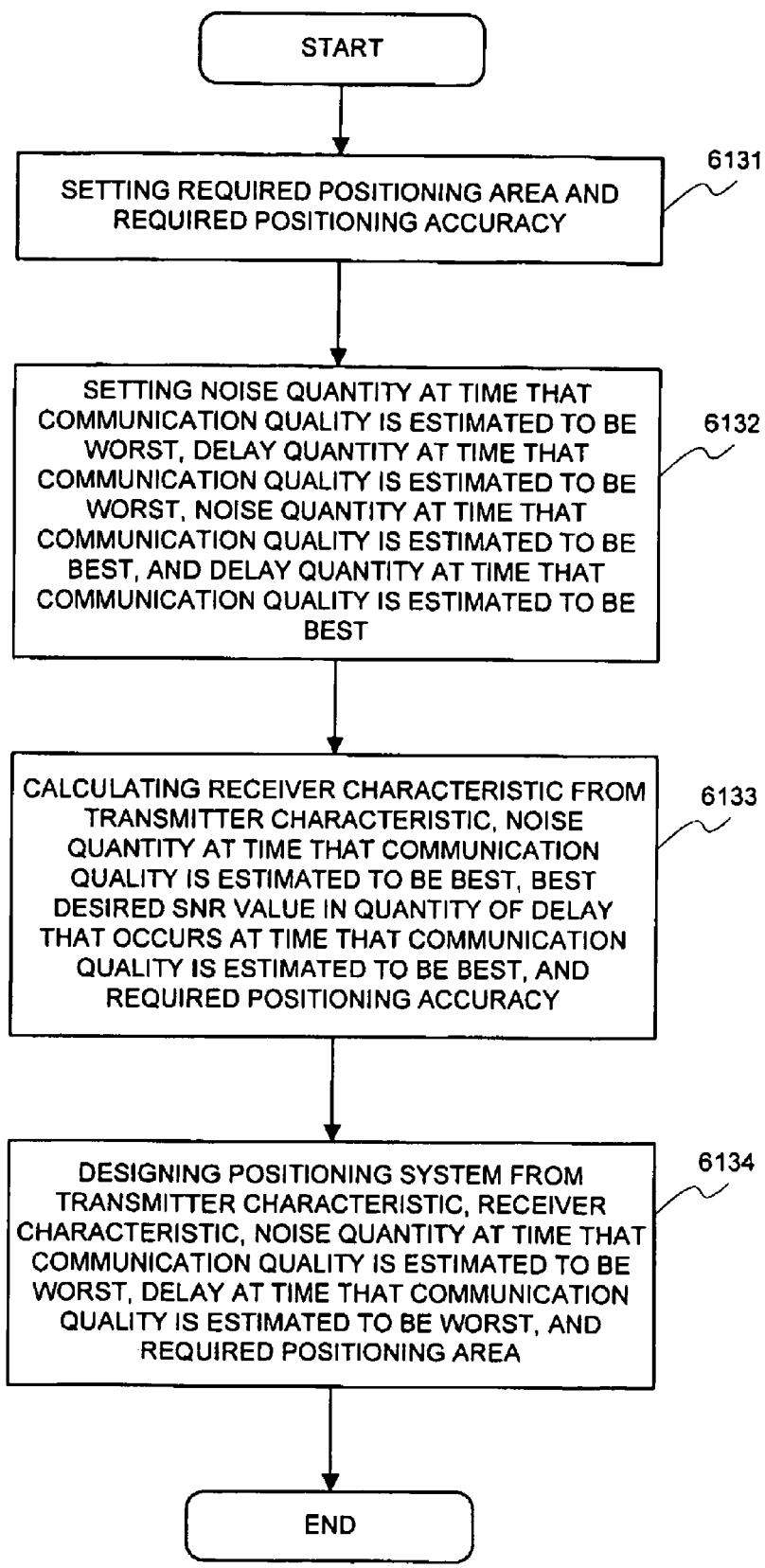
FIG. 53 is a flowchart of the positioning system design in the eleventh example.
Figure 54:
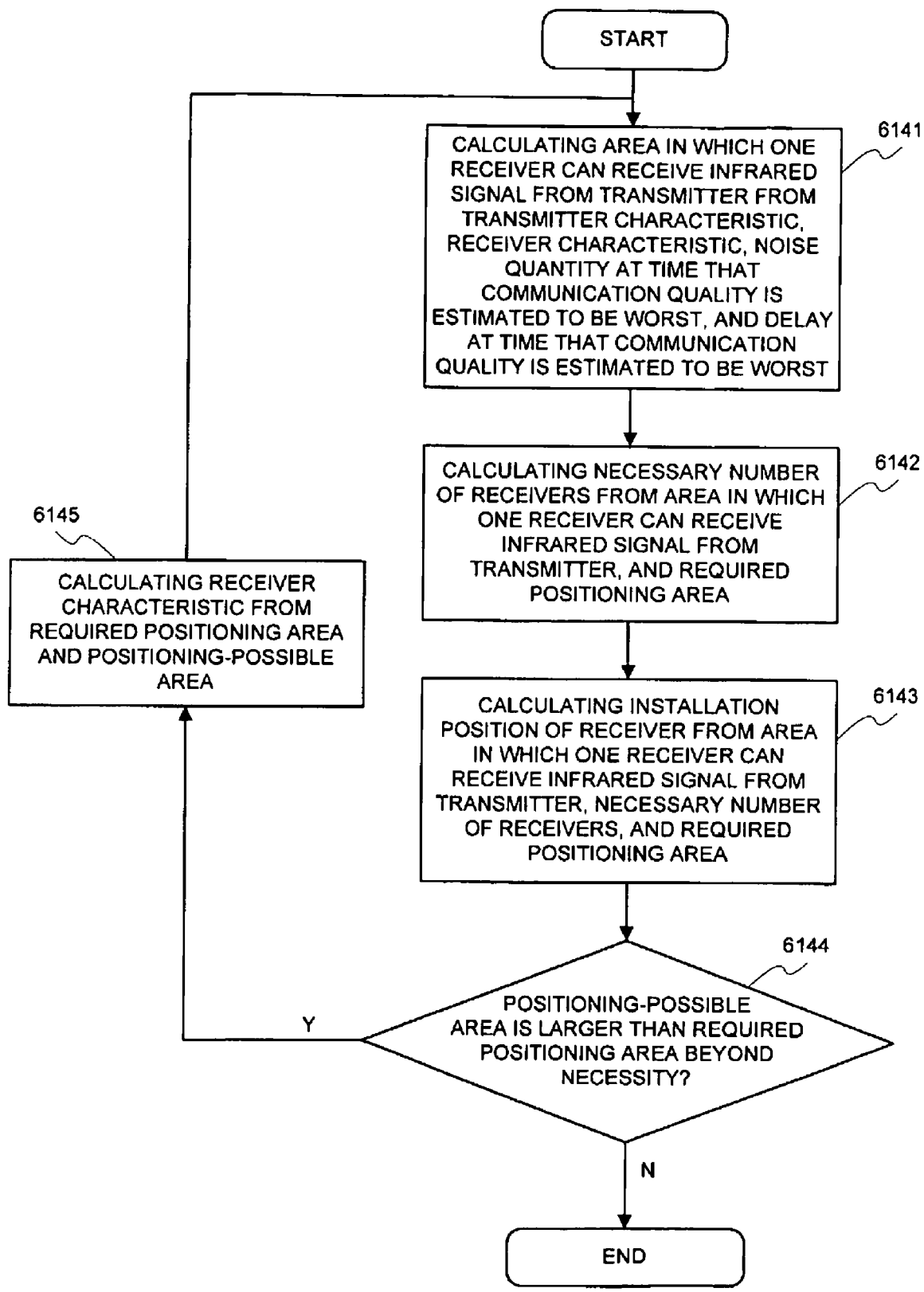
FIG. 54 is a view of a detailed process of the positioning system design in the eleventh example.

In an eleventh example of the present invention, an example will be explained of the positioning system design (decision of the installation position of the receiving terminal (receiver)) in the case of installing transmitter (originating terminals) 6121 to 6123 on the ceiling, and fixedly mounting a receiver (receiving terminal) 6125 on an upper side or the like of a cart 6124, which is placed on a floor having many structures (6126 and 6127) such as shelves, in the positioning system employing the infrared-rays as shown in FIG. 52. The eleventh example, which differs from the seventh example in the fluctuation factor, includes a delay time as a fluctuation factor, so it will be explained below. Additionally, a flow of the positioning system design in the eleventh example will be shown FIG. 53 and FIG. 54.

At first, in a step 6131, the required positioning area and the required positioning accuracy are set.

Next, in a step 6132, the situation of the fluctuation factor at the time that the communication quality is estimated to be worst, and the situation of the fluctuation factor at the time that the communication quality is estimated to be best are set. The fluctuation factor that should be taken into consideration this time is noise and a delay. Herein, the fact that the delay differs causes a desired SNR to fluctuate because a transmission waveform is distorted and an inter-code interference occurs. For this, a noise quantity N_worst at the time that the communication quality is estimated to be worst, and a worst desired SNR value SNR_worst in a time of a delay that occurs at the time that the communication quality is estimated to be worst are set as a situation of the fluctuation factor at the time that the communication quality is estimated to be worst, and further, a noise quantity N_best at the time that the communication quality is estimated to be best, and a best desired SNR value SNR_best in a time of a delay that occurs at the time that the communication quality is estimated to be best are set as a situation of the fluctuation factor at the time that the communication quality is estimated to be best.

And, in a step 6133, the receiver characteristic is calculated from the transmitter performance, the noise quantity N_best at the time that the communication quality is estimated to be best, the required positioning accuracy, and the best desired SNR value SNR_best in a quantity of a delay that occurs at the time that the communication quality is estimated to be best.

Thereafter, in a step 6134, after a radius of the area in which one receiver can receive the infrared signal from the transmitter is calculated from the transmitter characteristic, the receiver performance, the noise quantity N_worst at the time that the communication quality is estimated to be worst, and the worst desired SNR value SNR_worst to calculate the necessary number of the receivers from the radius of the area in which one receiver can receive the infrared signal from the transmitter, and the required positioning area, the receiver characteristic and the installation position of the receiver are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the receiver characteristic and the installation position of the receiver.

Specifically, in a step 6141, the area in which one receiver can receive the infrared signal from the transmitter is calculated from the transmitter characteristic, the receiver performance, the noise quantity N_worst at the time that the communication quality becomes worst, and the worst desired SNR value SNR_worst.

And, in a step 6142, the necessary number of the receivers is calculated from the area calculated in the step 6141, in which one receiver can receive the infrared signal from the transmitter, and the required positioning area set in the step 6131.

Thereafter, in a step 6143, the installation position of the receiver is calculated from the area in which one receiver can receive the infrared signal from the transmitter, the necessary number of the receivers calculated in the step 6142, and the required positioning area set in the step 6131.

And, in a step 6144, it is determined whether the positioning-possible area, which is calculated from the area calculated in the step 6141, in which one receiver can receive the infrared signal from the transmitter, and the installation position of the receiver calculated in the step 6143, is larger than the required positioning area set in the step 6131 beyond necessity. In a case where it has not been determined that the positioning-possible area is larger than the required positioning area beyond necessity, the positioning system design is finished.

In a case where the positioning-possible area is larger than the required positioning area beyond necessity, in a step 6145, the receiver characteristic is calculated from the required positioning area set in the step 6131, and the positioning-possible area that is calculated from the area calculated in the step 6141, in which one receiver can receive the infrared signal from the transmitter, and the installation position of the receiver calculated in the step 6143, and the operation returns to the process of the step 6141 once again As explained above, in the eleventh example of the present invention, the design of the positioning system employing the infrared-rays is realized based upon a fluctuation in the noise and the delay time.

Further, the design of the positioning system employing the infrared-rays may be made by combining the fluctuation factors that were employed in two examples out of the eighth example, the ninth example, the tenth example, and eleventh example.

Further, the design of the positioning system employing the infrared-rays may be made by combining the fluctuation factors that were employed in three examples out of the eighth example, the ninth example, the tenth example, and eleventh example.

Further, the design of the positioning system employing the infrared-rays may be made, by combining the fluctuation factors that were employed in the eighth example, the ninth example, the tenth example, and eleventh example.

Further, in the above-mentioned seventh to eleventh examples, the design of the positioning system employing the infrared-rays was explained, and the design of the positioning system employing the radio is also acceptable. Herein, with the radio, for example, RFID, Bluetooth, WLAN, cellular, and GPS tag may be employed. Further, with the WLAN, for example, IEEE802.11a, IEEE802.11b, and IEEE802.11g may be employed. Further, with the cellular, for example, W-CDMA, PHS, and PDC may be employed.

Further, in the above-mentioned seventh to eleventh examples, the situation in which the fixed radio appliance was installed on the ceiling was explained, and the situation in which the fixed radio appliance is hung on the wall is also acceptable.

Further, in the above-mentioned seventh to eleventh examples, the situation in which the receiver was installed only for a purpose of the positioning was explained, and the receiver may be utilized for the application other than the positioning (for example, data communication).

An Example 12

Figure 55:
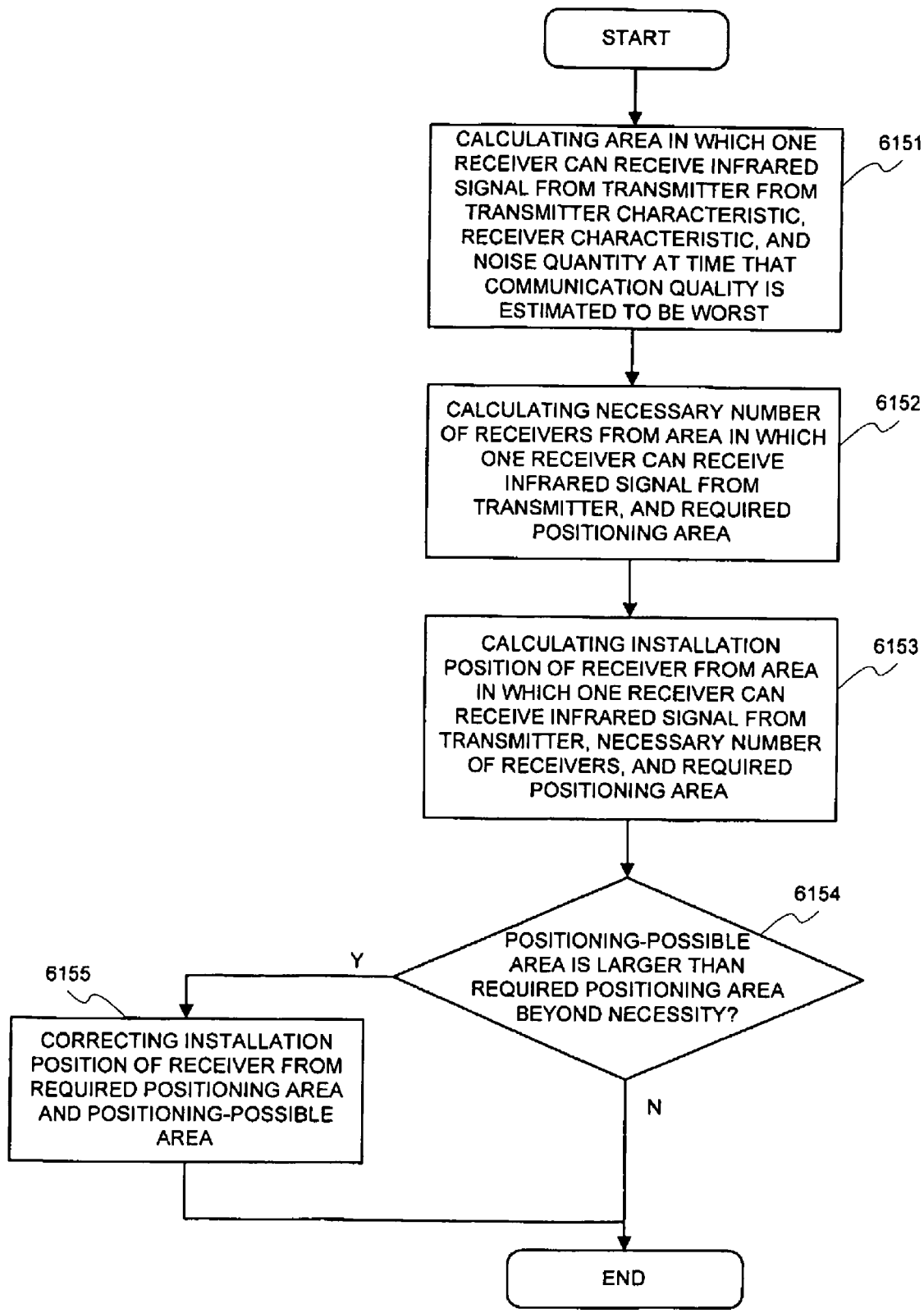
FIG. 55 is a view of a detailed process of the positioning system design in a twelfth example.

In an twelfth example of the present invention, an example will be explained of the positioning system design (decision of the installation position of the receiving terminal (receiver)) in the case of installing receivers (receiving terminals) 5001 to 5003 for only the positioning that broadcast-receives the signal for the positioning on the ceiling, and fixedly mounting a transmitter (originating terminal) 5005 that broadcast-transmits the signal for the positioning on an upper side or the like of a cart 5004 in the positioning system employing the infrared-rays as shown in FIG. 38. A flow of designing the positioning system in the twelfth example will be shown in FIG. 39 and FIG. 55.

At first, in a step 5011, the required positioning area and the required positioning accuracy are set.

Next, in a step 5012, the situation of the fluctuation factor at the time that the communication quality is estimated to be worst, and the situation of the fluctuation factor at the time that the communication quality is estimated to be best are set. The fluctuation factor that should be taken into consideration this time is noise. For this, a noise quantity N_worst at the time that the communication quality is estimated to be worst is set as a situation of the fluctuation factor at the time that the communication quality is estimated to be worst, and further, a noise quantity N_best at the time that the communication quality is estimated to be best is set as a situation of the fluctuation factor at the time that the communication quality is estimated to be best.

Herein, as an example of the method of setting the noise quantity N_worst at the time that the communication quality is estimated to be worst, and the noise quantity N_best at the time that the communication quality is estimated to be best, there exists the method of directly inputting them from the inputting unit 3061 of FIG. 5, the method of, in the DB unit 3063, preserving the noise quantity under an environment being envisaged, or the like. Additionally, the information, which is preserved in the DB unit 3063, in the method of, in the DB unit 3063, preserving the noise quantity under an environment being envisaged could be, for example, noise information 4051 for each piece of installation environment information as shown in FIG. 17.

And, in a step 5013, the receiver characteristic is calculated from the transmitter performance, the noise quantity N_best at the time that the communication quality is estimated to be best, and the required positioning accuracy.

Thereafter, in a step 5014, after a radius of the area in which one receiver can receive the infrared signal from the transmitter is calculated from the calculated receiver characteristic, the transmitter performance, and the noise quantity N_worst at the time that the communication quality is estimated to be worst to calculate the necessary number of the receivers from the radius of the area in which one receiver can receive the infrared signal from the transmitter, and the required positioning area, the receiver characteristic and the installation position of the receiver are decided.

Herein, now design a positioning area 2024 painted in a gray color by installing fixed radio appliances 2023 in a lattice shape in such a manner that a rectangle requested positioning area 2021 as shown in FIG. 9 is covered by employing round areas 2022, being an area at which a radio wave from one fixed radio appliance arrives, respectively, as one specific example of calculating the receiver characteristic and the installation position of the receiver.

Specifically, in the step 6051, the area in which one receiver can receive the infrared signal from the transmitter is calculated from the calculated receiver characteristic, the transmitter performance, and the noise quantity N_worst at the time that the communication quality become worst.

And, in a step 6052, the necessary number of the receivers is calculated from the area calculated in the step 6051, in which one receiver can receive the infrared signal from the transmitter, and the required positioning area set in the step 5011.

Thereafter, in a step 6053, the installation position of the receiver is calculated from the area in which one receiver can receive the infrared signal from the transmitter, the necessary number of the receiver calculated in the step 6052, and the required positioning area set in the step 5011.

And, in a step 6054, it is determined whether the positioning-possible area, which is calculated from the area calculated in the step 6051, in which one receiver can receive the infrared signal from the transmitter, and the installation position of the receiver calculated in the step 6053, is larger than the required positioning area set in the step 5011 beyond necessity. In a case where it has not been determined that the positioning-possible area is larger than the required positioning area beyond necessity, a design result is output from the outputting unit 3067, and the positioning system design is finished.

In a case where the positioning-possible area is larger than the required positioning area beyond necessity, in a step 6055, the installation position of the receiver is corrected from the required positioning area set in the step 5011, and the positioning-possible area that is calculated from the area calculated in the step 6051, in which one receiver can receive the infrared signal from the transmitter, and the installation position of the receiver calculated in the step 6053, a design result is output from the outputting unit 3067, and the positioning system design is finished.

In the calculation of the installation position of the receiver, as one example, the installation position may be decided with a space between the receivers used for calculating the necessary number of the receivers kept. Further, as another example, the installation position may be decided with a space between the receivers used for calculating the necessary number of the receivers narrowed.

As explained above, in the twelfth example of the present invention, the design of the positioning system employing the infrared-rays is realized based upon a fluctuation in the noise.

Further, as a modification example to the twelfth example, the design of the positioning system employing the infrared-rays may be made by combining the fluctuation factors that were employed in two examples out of the eighth example, the ninth example, the tenth example, and the eleventh example.

Further, as a modification example to the twelfth example, the design of the positioning system employing the infrared-rays may be made by combining the fluctuation factors that were employed in three examples out of the eighth example, the ninth example, the tenth example, and the eleventh example.

Further, as a modification example to the twelfth example, the design of the positioning system employing the infrared-rays may be made by combining the fluctuation factors that were employed in the eighth example, the ninth example, the tenth example, and the eleventh example.

Further, in the above-mentioned twelfth example, the design of the positioning system employing the infrared-rays was explained, and the design of the positioning system employing the radio is also acceptable. Herein, with the radio, for example, RFID, Bluetooth, WLAN, cellular, and GPS tag may be employed. Further, with the WLAN, for example, IEEE802.11a, IEEE802.11b, and IEEE802.11g may be employed. Further, with the cellular, for example, W-CDMA, PHS, and PDC may be employed.

Further, in the above-mentioned twelfth example, the situation in which the fixed radio appliance was installed on the ceiling was explained, and the situation in which the fixed radio appliance is hung on the wall is also acceptable.

Further, in the above-mentioned twelfth example, the situation in which the receiver was installed only for a purpose of the positioning was explained, and the receiver may be utilized for the application other than the positioning (for example, data communication).

Further, needless to say, the operations of the operating unit 3064 and the controlling unit 3062 of the present invention can be realized in a hardware-manner, and the computer machine executes a program for executing the function of each unit, thereby enabling these operations to be realized in a software-manner as well. This program is preserved in a magnetic disc, a semiconductor memory device, or mediums other than these, and is loaded into a computer machine from its medium, and by controlling the operation of the computer machine, the function shifted hereto can be realized.

The invention claimed is:

1. A method of positioning originating terminals, in a positioning system in which a location of a receiving terminal is determined based on a position of an originating terminal that transmitted information that was received at the receiving terminal, the method comprising:
determining a value of an origination characteristic of one or more fixed originating terminals which enables a required positioning accuracy to be achieved, when a communication quality is estimated to be at a maximum, from a value of a reception characteristic of said receiving terminal, a fluctuation factor of the communication quality when said communication quality is estimated to be at the maximum, and a required communication quality;
measuring a positioning-possible region when the communication quality is estimated to be at a minimum from said determined value of the origination characteristic of the one or more fixed originating terminals, said value of the reception characteristic of the receiving terminal, and said fluctuation factor when said communication quality is estimated to be at a minimum, wherein the positioning-possible region is a total area within which the receiving terminal can communicate with the one or more fixed originating terminals; and
obtaining a necessary number of fixed originating terminals from the positioning-possible region and a required positioning area, and determining an installation position of at least one fixed originating terminal based on said positioning-possible region and said necessary number of the fixed originating terminals.

2. The positioning method according to claim 1, wherein the origination characteristic of the one or more fixed originating terminals is an origination intensity.

3. The positioning method according to claim 1, wherein the origination characteristic of the one or more originating terminals is an angle gain.

4. The positioning method according to claim 1, wherein a factor causing the communication quality to fluctuate is noise.

5. The positioning method according to claim 1, wherein a factor causing the communication quality to fluctuate is one of a receiver sensitivity of the receiving terminal and an angle gain of the receiving terminal.

6. The positioning method according to claim 1, wherein a factor causing the communication quality to fluctuate is an inclination of the receiving terminal.

7. The positioning method according to claim 1, wherein a factor causing the communication quality to fluctuate is a height of the receiving terminal.

8. The positioning method according to claim 1, wherein a factor causing the communication quality to fluctuate is a delay.

9. The positioning method according to claim 1, wherein the determining the installation position comprises determining the installation position of the at least one additional originating terminal so that the positioning-possible region covers a predetermined to-be-positioned region.

10. A method of positioning receiving terminals in a positioning system in which a location of an originating terminal is determined based on a position of a receiving terminal that received information from the originating terminal, the method comprising:
determining a value of a reception characteristic of the receiving terminal which enables a required positioning accuracy to be satisfied when a communication quality is estimated to be a maximum, from a value of an origination characteristic of said originating terminal, a fluctuation factor of the communication quality when said communication quality is estimated to be at the maximum, and a required communication quality;
measuring a positioning-possible region based on the value of the reception characteristic of the receiving terminal when the communication quality is estimated to be at a minimum from the determined value of the reception characteristic of the receiving terminal, said value of the origination characteristic of said originating terminal, and said fluctuation factor when said communication quality is estimated to be at a minimum, wherein the positioning-possible region is a region within which the receiving terminal can communicate with the originating terminal; and obtaining a necessary number of fixed receiving terminals from the positioning-possible region and a required positioning area, and determining an installation position of at least one fixed receiving terminal based on the positioning-possible region and said necessary number of receiving terminals.

11. The positioning method according to claim 10, wherein the reception characteristic of the receiving terminal is receiver sensitivity.

12. The positioning method according to claim 10, wherein the reception characteristic of the receiving terminal is an angle gain.

13. The positioning method according to claim 10, wherein a factor causing the communication quality to fluctuate is noise.

14. The positioning method according to claim 10, wherein a factor causing the communication quality to fluctuate is one of an origination intensity of the originating terminal and an angle gain of the originating terminal.

15. The positioning method according to claim 10, wherein a factor causing the communication quality to fluctuate is an inclination of the originating terminal.

16. The positioning method according to claim 10, characterized in that a factor causing said communication quality to fluctuate is a height of the originating terminal.

17. The positioning method according to claim 10, wherein a factor causing the communication quality to fluctuate is a delay.

18. The positioning method according to claim 10, wherein the determining the installation position of the receiving terminal comprises determining the installation position so that the positioning-possible region covers a predetermined to-be-positioned region.

19. A device for positioning originating terminals, in a positioning system in which a location of a receiving terminal is determined based on a position of an originating terminal that transmitted information that was received at the receiving terminal, the device comprising:

an origination characteristic determining means for determining a value of an origination characteristic of one or more fixed originating terminals which enable a required positioning accuracy to be achieved, when a communication quality is estimated to be at a maximum, from a value of a reception characteristic of said receiving terminal, a fluctuation factor of the communication quality when said communication quality s estimated to be at the maximum, and a required communication quality;

a position-possible region measuring means for measuring a positioning-possible region when the communication quality is estimated to be at a minimum from said determined value of the origination characteristic of the one or more fixed originating terminals, said value of the reception characteristic of the receiving terminal, and said fluctuation factor when said communication quality is estimated to be at the minimum, wherein the positioning-possible region is a total area within which the receiving terminal can communicate with the one or more fixed originating terminals; and a number of fixed originating terminals obtaining means for obtaining a necessary number of fixed originating terminals from the positioning-possible region and a required positioning area, and an installation position determining means for determining an installation position of at least one additional originating terminal based on said positioning-possible region and said necessary number of the fixed originating terminals.

20. The positioning device according to claim 19, wherein the origination characteristic is an origination intensity of the one or more fixed originating terminals which enable the required positioning accuracy to be achieved when the communication quality is estimated to be at the maximum.

21. The positioning device according to claim 19, wherein the origination characteristic is an angle gain of the one or more fixed originating terminals which enable the required positioning accuracy to be achieved when the communication quality is estimated to be at the maximum.

22. The positioning device according to claim 19, wherein a factor causing the communication quality to fluctuate is noise.

23. The positioning device according to claim 19, wherein a factor causing the communication quality to fluctuate is one of a receiver sensitivity of the receiving terminal and an angle gain of the receiving terminal.

24. The positioning device according to claim 19, wherein a factor causing the communication quality to fluctuate is an inclination of the receiving terminal.

25. The positioning device according to claim 19, wherein a factor causing the communication quality to fluctuate is a height of the receiving terminal.

26. The positioning device according to claim 19, wherein a factor causing the communication quality to fluctuate is a delay.

27. The positioning device according to claim 19, wherein the installation position determining means determines the installation position of the at least one additional originating terminal so that the positioning-possible region covers a predetermined to-be-positioned region.

28. A device for positioning a receiving terminal in a positioning system in which a location of an originating terminal is determined based on a position of a receiving terminal that received information from the originating terminal, the device comprising:

a reception characteristic determining means for determining a value of a reception characteristic of the receiving terminal which enables a required positioning accuracy to be satisfied when a communication quality is estimated to be at a maximum, from a value of an origination characteristic of said originating terminal, a fluctuation factor of the communication quality when said communication quality is estimated to be at the maximum, and a required communication quality;

a position-possible region measuring means for measuring a positioning-possible region based on the value of the reception characteristic of the receiving terminal when the communication quality is estimated to be at a minimum from the determined value of the reception characteristic of the receiving terminal, said value of the origination characteristic of said originating terminal, and said fluctuation factor when said communication quality is estimated to be at the minimum, wherein the positioning-possible region is a region within which the receiving terminal can communicate with the originating terminal; and an obtaining a necessary number of fixed receiving terminals means for obtaining a necessary number of fixed receiving terminals from the positioning-possible region and a required positioning area, and an installation position determining means for determining an installation position of at least one fixed receiving terminal based on the positioning-possible region and said necessary number of receiving terminals.

29. The positioning device according to claim 28, wherein the reception characteristic is a receiver sensitivity of the receiving terminal which enables the required positioning accuracy to be satisfied when the communication quality is estimated to be at the maximum.

30. The positioning device according to claim 28, wherein the reception characteristic is an angle gain of the receiving terminal which enables the required positioning accuracy to be satisfied when the communication quality is estimated to be at the minimum.

31. The positioning device according to claim 28, wherein a factor causing the communication quality to fluctuate is noise.

32. The positioning device according to claim 28, wherein a factor causing the communication quality to fluctuate is one of an origination intensity of said originating terminal and an angle gain of said originating terminal.

33. The positioning device according to claim 28, wherein a factor causing the communication quality to fluctuate is an inclination of the originating terminal.

34. The positioning device according to claim 28, wherein a factor causing the communication quality to fluctuate is a height of the originating terminal.

35. The positioning device according to claim 28, wherein a factor causing the communication quality to fluctuate is a delay.

36. The positioning device according to claim 28, wherein the installation position determining means determines the installation position of the receiving terminal so that the positioning-possible region covers a predetermined to-be-positioned region.

37. A program, stored on a non-transitory computer-readable medium, the program for positioning originating terminals in a positioning system in which a location of a receiving terminal is determined based on a position of an originating terminal that transmitted information that was received at the receiving terminal, the program causing a computer to execute a method comprising:
    determining a value of an origination characteristic of one or more originating terminals which enables a required positioning accuracy to be achieved, when a communication quality is estimated to be at a maximum, from a value of a reception characteristic of said receiving terminal, a fluctuation factor of the communication quality when said communication quality is estimated to be at the maximum, and the required communication quality;
    measuring a positioning-possible region when the communication quality is estimated to be at a minimum from said determined value of the origination characteristic of the fixed originating terminal, said value of the reception characteristic of the receiving terminal, and said fluctuation factor when said communication quality is estimated to be at a minimum, wherein the positioning-possible region is a total area within which the receiving terminal can communicate with the one or more fixed originating terminals; and
    obtaining a necessary number of the fixed originating terminals from the positioning-possible region and the required positioning area, and determining an installation position of at least one fixed originating terminal based on said positioning-possible region and said necessary number of the fixed originating terminals.

38. A program, stored on a non-transitory computer-readable medium, the program for positioning a receiving terminal in a positioning system in which a location of an originating terminal is determined based on a position of a receiving terminal that received information from the originating terminal, the program causing a computer to execute a method comprising:
    determining a value of a reception characteristic of the receiving terminal which enables a required positioning accuracy to be satisfied when a communication quality is estimated to be at a maximum, from a value of an origination characteristic of said originating terminal, a fluctuation factor of the communication quality when said communication quality is estimated to be at the maximum, and a required communication quality;
    measuring a positioning-possible region based the a value of the reception characteristic of the receiving terminal when the communication quality is estimated to be at a minimum from the determined value of the reception characteristic of the receiving terminal, said value of the origination characteristic of said originating terminal, and said fluctuation factor when said communication quality is estimated to be at the minimum, wherein the positioning-possible region is a region within which the receiving terminal can communicate with the originating terminal; and
    obtaining a necessary number of fixed receiving terminals from the positioning-possible region and a required positioning area, and determining an installation position of at least one fixed receiving terminal based on the positioning-possible region and said necessary number of receiving terminals.

39. A method of positioning originating terminals, in a positioning system in which a location of a receiving terminal is determined based on a position of an originating terminal that transmitted information that was received at the receiving terminal, the method comprising:
    determining a value of an origination characteristic of one or more fixed originating terminals which enables a required positioning accuracy to be achieved, when a communication quality is estimated to be at a first value, from a value of a reception characteristic of said receiving terminal, a fluctuation factor of the communication quality when said communication quality is estimated to be at the first value, and the required communication quality; and
    measuring a positioning-possible region when the communication quality is estimated to be at a second value lower than the first value from said determined value of the origination characteristic of the fixed originating terminal, said value of the reception characteristic of the receiving terminal, and said fluctuation factor when said communication quality is estimated to be at the second value, wherein the positioning-possible region is a total area within which the receiving terminal can communicate with the one or more fixed originating terminals; and
    obtaining a necessary number of the fixed originating terminals from the positioning-possible region and the required positioning area, and determining an installation position of at least one fixed originating terminal based on said positioning-possible region and said necessary number of the fixed originating terminals.

40. A method of positioning receiving terminals in a positioning system in which a location of an originating terminal is determined based on a position of a receiving terminal that received information from the originating terminal, the method comprising:

determining a value of a reception characteristic of the receiving terminal which enables a required positioning accuracy to be satisfied when a communication quality is estimated to be a first value, from a value of an origination characteristic of said originating terminal, a fluctuation factor of the communication quality when said communication quality is estimated to be at the first value, and a required communication quality; and measuring a positioning-possible region based on the value of the reception characteristic of the receiving terminal when the communication quality is estimated to be a second value lower than the first value from the determined value of the reception characteristic of the receiving terminal, said value of the origination characteristic of said originating terminal, and said fluctuation factor when said communication quality is estimated to be at the second value, wherein the positioning-possible region is a region within which the receiving terminal can communicate with the originating terminal; and obtaining a necessary number of fixed receiving terminals from the positioning-possible region and a required positioning area, and determining an installation position of at least one fixed receiving terminal based on the positioning-possible region and said necessary number of receiving terminals.

41. A device for positioning originating terminals, in a positioning system in which a location of a receiving terminal is determined based on a position of an originating terminal that transmitted information that was received at the receiving terminal, the device comprising:

an origination characteristic determining means for determining a value of an origination characteristic of one or more fixed originating terminals which enable a required positioning accuracy to be achieved, when a communication quality is estimated to be at a first value, from a value of a reception characteristic of said receiving terminal, a fluctuation factor of the communication quality when said communication quality is estimated to be at the first value, and a required communication quality;

a position-possible region measuring means for measuring a positioning-possible region when the communication quality is estimated to be at a second value lower than the first value from said determined value of the origination characteristic of the one or more fixed originating terminals, said value of the reception characteristic of the receiving terminal, and said fluctuation factor when said communication quality is estimated to be at the second value, wherein the positioning-possible region is a total area within which the receiving terminal can communicate with the one or more fixed originating terminals; and a number of fixed originating terminals obtaining means for obtaining a necessary number of fixed originating terminals from the positioning-possible region and a required positioning area, and an installation position determining means for determining an installation position of at least one additional originating terminal based on said positioning-possible region and said necessary number of the fixed originating terminals.

42. A device for positioning a receiving terminal in a positioning system in which a location of an originating terminal is determined based on a position of a receiving terminal that received information from the originating terminal, the device comprising:

a reception characteristic determining means for determining a value of a reception characteristic of the receiving terminal which enables a required positioning accuracy to be satisfied when a communication quality is estimated to be at a first value from a value of an origination characteristic of said originating terminal, a fluctuation factor of the communication quality when said communication quality is estimated to be at the first value, and a required communication quality;

a position-possible region measuring means for measuring a positioning-possible region based the a value of the reception characteristic of the receiving terminal when the communication quality is estimated to be a second value lower than the first value from the determined value of the reception characteristic of the receiving terminal, said value of the origination characteristic of said originating terminal, and said fluctuation factor when said communication quality is estimated to be at the second value, wherein the positioning-possible region is a region within which the receiving terminal can communicate with the originating terminal; and an obtaining a necessary number of fixed receiving terminals means for obtaining a necessary number of fixed receiving terminals from the positioning-possible region and a required positioning area, and an installation position determining means for determining an installation position of at least one fixed receiving terminal based on the positioning-possible region and said necessary number of receiving terminals.

43. A program, stored on a non-transitory computer-readable medium, the program for positioning originating terminals in a positioning system in which a location of a receiving terminal is determined based on a position of an originating terminal that transmitted information that was received at the receiving terminal, the program causing a computer to execute a method comprising:

determining a value of an origination characteristic of one or more originating terminals which enables a required positioning accuracy to be achieved, when a communication quality is estimated to be a first value from a value of a reception characteristic of said receiving terminal, a fluctuation factor of the communication quality when said communication quality is estimated to be at the first value, and the required communication quality; and measuring a positioning-possible region when the communication quality is estimated to be at a second value lower than the first value from said determined value of the origination characteristic of the fixed originating terminal, said value of the reception characteristic of the receiving terminal, and said fluctuation factor when said communication quality is estimated to be at the second value, wherein the positioning-possible region is a total area within which the receiving terminal can communicate with the one or more fixed originating terminals; and obtaining a necessary number of the fixed originating terminals from the positioning-possible region and the required positioning area, and determining an installation position of at least one fixed originating terminal based on said positioning-possible region and said necessary number of the fixed originating terminals.

44. A program, stored on a non-transitory computer-readable medium, the program for positioning a receiving terminal in a positioning system in which a location of an originating terminal is determined based on a position of a receiving terminal that received information from the originating terminal, the program causing a computer to execute a method comprising:

determining a value of a reception characteristic of the receiving terminal which enables a required positioning accuracy to be satisfied when a communication quality is estimated to be a first value, from a value of an origination characteristic of said originating terminal, a fluctuation factor of the communication quality when said communication quality is estimated to be at the first value, and a required communication quality; and measuring a positioning-possible region based on the value of the reception characteristic of the receiving terminal when the communication quality is estimated to be a second value lower than the first value from the determined value of the reception characteristic of the receiving terminal, said value of the origination characteristic of said originating terminal, and said fluctuation factor when said communication quality is estimated to be at the second value, wherein the positioning-possible region is a region within which the receiving terminal can communicate with the originating terminal; and obtaining a necessary number of fixed receiving terminals from the positioning-possible region and a required positioning area, and determining an installation position of at least one fixed receiving terminal based on the positioning-possible region and said necessary number of receiving terminals.

45. The method of positioning originating terminals according to claim 1, the method further comprising:

judging whether said determined installation location is an optimized location by comparing the positioning-possible area calculated based on said determined installation position and said total area with said required positioning area;

when it is judged that said determined installation location is not an optimized location by said judgment, newly determining a value of the origination characteristic of said fixed originating terminal based on said required positioning area and said determined installation position; and determining said installation position of at least one fixed originating terminal again by employing this new value of the origination characteristic of the fixed originating terminal.

46. the method of positioning originating terminals according to claim 1, the method further comprising:

judging whether said determined installation location is an optimized location by comparing the positioning-possible area calculated based on said determined installation position and said total area with said required positioning area; and when it is judged that said determined installation location is not an optimized location by said judgment, modifying said determined based on said required positioning area, said determined installation position, and said total area.

* * * * *

UNITED STATES PATENT AND TRADEMARK OFFICE
CERTIFICATE OF CORRECTION

| | | |
|---|---|---|
| PATENT NO. | : 8,265,635 B2 | Page 1 of 1 |
| APPLICATION NO. | : 12/096731 | |
| DATED | : September 11, 2012 | |
| INVENTOR(S) | : Morisaki | |

It is certified that error appears in the above-identified patent and that said Letters Patent is hereby corrected as shown below:

On the Title Page, insert

Item -- [30]  Foreign Application Priority Data

Dec. 9, 2005   (JP)    2005-356109 --

Signed and Sealed this
Twenty-eighth Day of October, 2014

Michelle K. Lee
*Deputy Director of the United States Patent and Trademark Office*